United States Patent [19]

Ziegler et al.

[11] Patent Number: 4,783,736

[45] Date of Patent: Nov. 8, 1988

[54] DIGITAL COMPUTER WITH MULTISECTION CACHE

[75] Inventors: Michael L. Ziegler, Whitinsville; Robert L. Fredieu, Arlington, both of Mass.

[73] Assignee: Alliant Computer Systems Corporation, Littleton, Mass.

[21] Appl. No.: 757,853

[22] Filed: Jul. 22, 1985

[51] Int. Cl.$^4$ .............................................. G06F 9/00
[52] U.S. Cl. ...................................................... 364/200
[58] Field of Search ... 364/200 MS File, 900 MS File, 364/300 MS File

[56] References Cited

U.S. PATENT DOCUMENTS

| | | | |
|---|---|---|---|
| 4,030,431 | 1/1987 | Nishimura | 364/200 |
| 4,051,551 | 9/1977 | Lawrie et al. | 364/200 |
| 4,056,845 | 11/1977 | Churchill, Jr. | 364/200 |
| 4,097,920 | 6/1978 | Ozga | 364/200 |
| 4,169,284 | 9/1979 | Hogan et al. | 364/200 |
| 4,280,176 | 7/1981 | Tan | 364/200 |
| 4,317,168 | 2/1982 | Messina et al. | 364/200 |
| 4,344,134 | 8/1982 | Barnes | 364/200 |
| 4,365,292 | 12/1982 | Barnes et al. | 364/200 |
| 4,400,768 | 8/1983 | Tomlinson | 364/200 |
| 4,426,681 | 1/1984 | Bacot et al. | 364/200 |
| 4,445,174 | 4/1984 | Fletcher | 364/200 |
| 4,462,072 | 7/1984 | Tague et al. | 364/200 |
| 4,462,074 | 7/1984 | Linde | 364/200 |
| 4,463,423 | 7/1984 | Potash et al. | 364/300 |
| 4,466,061 | 8/1984 | DeSantis et al. | 364/200 |
| 4,468,736 | 8/1984 | DeSantis et al. | 364/200 |
| 4,484,262 | 11/1984 | Sullivan et al. | 364/200 |
| 4,527,238 | 7/1985 | Ryan et al. | 364/200 |
| 4,550,367 | 10/1985 | Hattori et al. | 364/200 |
| 4,564,900 | 1/1986 | Smitt | 364/200 |
| 4,564,903 | 1/1986 | Guyette et al. | 364/300 |
| 4,594,655 | 6/1986 | Hao et al. | 364/200 |
| 4,636,942 | 1/1987 | Chen et al. | 364/200 |
| 4,661,900 | 4/1987 | Chen et al. | 364/200 |

OTHER PUBLICATIONS

Yen et al., "Data Coherence Problem in a Multicache System", *IEEE Trans. on Comp.*, vol. C-34, No. 1, Jan. 1985, pp. 55-65.
Rau, "Program Behavior and the Performance of Interleaved Memories", *IEEE Trans. on Comp.*, vol. C-28, No. 3, Mar. 1979, pp. 191-199.
Yeh et al., "Shared Cache for Multiple-Stream Computer Systems", *IEEE Trans. on Comp.*, vol. c-32, No. 1, Jan. 1983, pp. 38-47.
Driscoll, G. C. et al., "Split Cache with Variable Interleave Boundary", *IBM Technical Disclosure Bulletin*, vol. 22, No. 11, Apr. 1980, pp. 5183-5186.
Yamour, J., "Odd/Even Interleave Cache with Optimal Hardware Array Cost, Cycle Time and Variable Data Port Width", *IBM Technical Disclosure Bulletin*, vol. 23, No. 7B, Dec. 1980, pp. 3461-3463.
Smith, Alan J., "Cache Memories", *ACM Computing Surveys*, vol. 14, No. 3, Sep. 1982, pp. 473-530.
Hoogendoorn, "Reduction of Memory Interference in Multiprocessor Systems", IEEE Proceedings of the 4th Annual Symposium on Computer Architecture, Mar. 1977.

*Primary Examiner*—Gareth D. Shaw
*Assistant Examiner*—Rebecca L. Adams

[57] ABSTRACT

A digital computer including a plurality of memory elements, the memory elements being interleaved (i.e., each is assigned memory addresses on the basis of a low order portion of the memory address), a plurality of processors connected in parallel, the processors each having means for initiating an access of data from any of the memory elements simultaneously with accesses of other processors, the memory elements each being capable of accepting an access from just one of the processors during a given cycle, and the memory elements being interleaved so that the memory access patterns generated at a stride of one and a stride of two each meet the conditions that (1) the pattern will tolerate being offset with respect to an identical pattern by a desired offset and any multiple of the offset (wherein tolerating means that no memory access conflicts arise, i.e., more than one processor simultaneously attempting to access the same memory element) and (2) the pattern includes sufficient conflicts at offsets other than the desired offset to force the processors to assume a relationship wherein the desired offset is achieved, so that the processor is able to access a different memory element simultaneously without creating access conflicts.

24 Claims, 21 Drawing Sheets

CSTART SEQUENCE

| Machine Cycle | Initiating CE | All CEs In Complex | | Other CEs In Complex |
|---|---|---|---|---|
| 1 | WRCGSP | | | IDLE |
| 2 | DOCSTART | LDGSP | | IDLE |
| 3 | WRCGFP<br>CSTARTO | CSTARTI<br>CSTARTI3<br>SETINLOOP<br>CLRNEXT<br>CLRCURR | [CGSP]<br>CLRSYNC<br>CLRPAST | IDLE |
| 4 | WRCGPC | CSTARTI1<br>LDGFP<br>RDYO<br>ADDCURR<br>ADDNEXT | [INLOOP]<br>ADDNUM<br>ADDCURRO | IDLE |
| 5 | WRCMAX | LDGPC | [CGFP]<br>[CNEXT]<br>[CCURR] | RDCGFP |
| 6 | NOP | LDMAX | [CGPC] | RDCGPC |
| 7 | RDCVSP | | [CMAX] | RDCVSP |
| 8 | RDCCURR | | | RDCCURR |

I     I     I     I     I    |ser|   I     I
       I     I     I     I     I    |ial|   I     I
Time   I     I     I     I     I    |   |   I     I
  0    I     I     I     I     I    |   |   I     I
      _I__  _I__  _I__  _I__  _I__  |_S_|  _I__  _I__
  1   | 0 | | 1 | | 2 | | 3 | | 4 | | 5 | | 6 | | 7 |
      |   | |   | |   | |   | |   | |   | |   | |   |
  2   |   | |   | |   | |   | |   | |   | |   | |   |
      |_R_| |_R_| |   | |_R_| |   | |_R_| |   | |_R_|
  3   | 8 | | 9 | |   | |10 | |   | |11 | |   | |12 |
      |   | |   | |_R_| |   | |_R_| |   | |_R_| |   |
  4   |   | |   | |13 | |   | |14 | |   | |15 | |   |
      |_R_| |   | |   | |_R_| |   | |   | |   | |_R_|
  5   |16 | |   | |   | |17 | |   | |   | |   | |18 |
      |   | |   | |_R_| |_R_| |   | |_R_| |_R_| |   |
  6   |   | |   | |19 | |20 | |   | | I | | I | |   |
      |   | |   | |   | |   | |_R_| |_R_| | I | |_R_|
  7   |   | |   | |   | | I | | I | | I | | I | | I |
      |_R_| |   | |_R_| | I | | I | | I | | I | | I |
  8   | I | |   | | I | | I | | I | | I | | I | | I |
      | I | |_R_| |_I_| | I | | I | | I | | I | | I |
  9   | I | | I | |ser| | I | | I | | I | | I | | I |
      | I | | I | |ial| | I | | I | | I | | I | | I |
      | I | | I | |   | | I | | I | | I | | I | | I |
      | I | | I | |   | | I | | I | | I | | I | | I |
      | I | | I | |   | | I | | I | | I | | I | | I |

Notes: I - Idle CE
       S - cstart instruction
       R - crepeat instruction
       0-20 - Iteration number
```

FIG 14

// # DIGITAL COMPUTER WITH MULTISECTION CACHE

TABLE OF CONTENTS

Background of the Invention
Summary of the Invention
Description of the Preferred Embodiment
  I. Drawings
  II. Summary
  III. Computational Elements
    A. Instructions
      1. Vector Instructions
      2. Processing States
      3. Address Spaces
    B. Data Types
      1. Integer Data
      2. Bit and Bit Field Data
      3. Floating Point Data
      4. Vector Data
    C. General Registers
    D. Control Registers
    E. Memory Management
  IV. Interactive Processors
  V. Concurrent Processing and the CCUs
    A. Concurrency Instructions
    B. CCU Registers
    C. CCU Status Register
    D. Concurrency Control Bus
    E. Communication Between the CEs and CCUs
    F. Initiating Concurrent Processing
      1. Waiting For Other CEs To Go Idle
      2. Loading Registers
      3. Clearing Synchronization and Iteration-Assignment Registers
      4. Waking Up Other CEs
      5. Assigning Iterations
      6. Reading Registers
      7. Timing
    G. Relative Delay Between CE and CCU
    H. Assigning New Iterations
    I. Synchronizing Dependencies
      1. The CAWAIT Instruction
      2. The Four-Bit Size of the Synchronization Registers
      3. The CADVANCE Instruction
    J. Concluding Concurrent Processing
      1. Executing CREPEAT in the Last Iteration
      2. Executing CQUIT
    K. Vector Concurrent Processing
    L. Nested Concurrent Loops
    M. Cactus Stack
  VI. Examples of Concurrent Processing
  VII. Backplane Switch
    A. Circuitry
    B. Operation
  VIII. Central Processing Cache
    A. Summary
    B. Data Paths
    C. Address Paths
    D. Handling Multiple Accesses
    E. Cache Interleaving
Claims

BACKGROUND OF THE INVENTION

This invention relates to digital computers capable of parallel processing. There has been little progress in applying parallel processing to the computationally intensive applications typically found in engineering and scientific applications, particularly to parallel processing of the same job (i.e., the same instructions and data).

In such applications, it is typical to find repetitive accesses to memory at fixed address intervals known as strides. Each new access initiated by a processor is for a memory location separated from the last access by the length of the stride. A stride of one means that the processor accesses every word (whose length may very) in sequence. A stride of two means that every other word is accessed. If interleaved memory elements are accessed by the processors, the stride determines a unique sequence of memory accesses known as the access pattern (e.g., for four memory elements, the access pattern might be ABCD).

Caches have long been used in digital computers, and have been applied to parallel processing, with one cache assigned to each processor. A cache is a high-speed memory containing copies of selected data from the main memory. Memory accesses from a processor come to the cache, which determines whether it currently has a copy of the accessed memory location. If not, a cache "miss" has occurred, and the cache customarily stops accepting new accesses while it performs a main memory access for the data needed by the processor.

SUMMARY OF THE INVENTION

We have discovered an excellent technique for interleaving the memory elements of a parallel-processing computer, one particularly adapted for use in processing computationally intensive applications involving memory accesses at fixed strides. It makes the memory elements (e.g., cache sections) highly accessible to the processors.

In general the invention features, in a first aspect, a plurality of memory elements (e.g., cache sections) connected to a plurality of parallel processors, with the memory elements so interleaved that the access pattern generated by said processors when accessing data at predetermined strides permits all of the processors to reach a phase relationship with the other processors in which each processor is able to access a different said memory element simultaneously without access conflicts arising. In preferred embodiments, the processors are adapted for concurrently processing the same instructions and data (e.g., different iterations of the same iterative construct); the interleaving is such that the access pattern generated by the processors for strides of one and two meets the conditions that (1) the pattern will tolerate being offset with respect to an identical pattern by an offset (or any multiple thereof) equal to the length of the pattern divided by the number of memory elements, and (2) the pattern includes at least one conflict at every offset other than the tolerable offset so that access conflicts force the processors to assume a phase relationship with each other wherein their accessing patterns are offset by the tolerable offset; there are four memory elements W,X,Y,Z and the interleaving produces an access pattern of WXXWYZZY (or, less preferably, WXXWYYZZ or WWXZYXZY) for a stride of one and WXYZ for a stride of two; or the interleaving produces an access pattern of WWXXXXWWYYZZZZYY for a stride of one, a pattern of WXXWYZZY for a stride of two, and a pattern of WXYZ for a stride of four; the interleaving for eight memory elements is ABCDDCBA- EFGHHGFE for a stride of one and ACDBEGHF for a stride of two; the memory elements choose among simultaneously contending processors on the basis of a fixed priority ranking.

In a second aspect, the invention features a global cache accessed by a plurality of parallel processors. In preferred embodiments, the processors are adapted for concurrently processing the same instructions and data (e.g., different iterations of the same iterative construct); the cache is divided into interleaved sections; blocks of data accessed from memory are divided between the cache sections; each of two cache sections drive a common memory address bus with the block address of the block being accessed and both sections concurrently read the block address from the common bus; separate buses connect each of the two cache sections to main memory, and each cache section's half of the data block is transferred over its memory bus; and the two cache sections share a common circuit board.

In another aspect, it is noted that in a parallel processing environment, particularly one dedicated to concurrently processing portions of the same job (i.e., same instructions and data), a cache may be usefully given the capability of simultaneously accepting current accesses while working on completion of pending accesses that it was unable to complete earlier (e.g., because a main memory access was required). This makes possible far greater memory bandwidth for each processor. In preferred embodiments, the block addresses for the pending accesses are stored along with a status code comprising a prescription of the steps necessary to complete the access; the stored block addresses for pending accesses are compared to the addresses of each new block of data received from main memory and the status code for each is redetermined based on the prior state of the code and the outcome of the address comparison; the block addresses of current accesses are compared to the addresses of main memory accesses still in progress (i.e., not yet available in the cache memory); the cache index of current accesses are compared to the cache indexes of main memory accesses in progress to determine whether a block of data accessed from memory, though not the data sought by the current access, is data that will be written into the cache memory location addressed by the current access; the cache is divided into a plurality of sections and is capable of concurrently accepting a plurality of accesses to different sections; the cache control logic is divided into quick-work logic for completing accesses capable of immediate completion, pending-status logic for initially determining the status code for a pending access and redetermining the status codes as conditions change, and access-completion logic for taking control of the data and address paths within the cache to complete a pending access when the status code indicates that it can be completed; logic is provided to assure that pending accesses from the same processor are completed in the order they are received, rather than the order in which they could best be completed; two cache sections split data blocks accessed from memory and share a main memory address bus, so as thereby to detect the addresses of blocks accessed by the other cache section. We incorporate by reference the copending application entitled "Digital Computer with Cache Capable of Concurrently Handling Multiple Accesses from Parallel Processors", filed on even date herewith.

Other features and advantages of the invention will be apparent from the description of a preferred embodiment and from the claims.

DESCRIPTION OF THE PREFERRED EMBODIMENT

I. Drawings

FIGS. 6–10 collectively are a block diagram of the CCU.

Figure 11A:
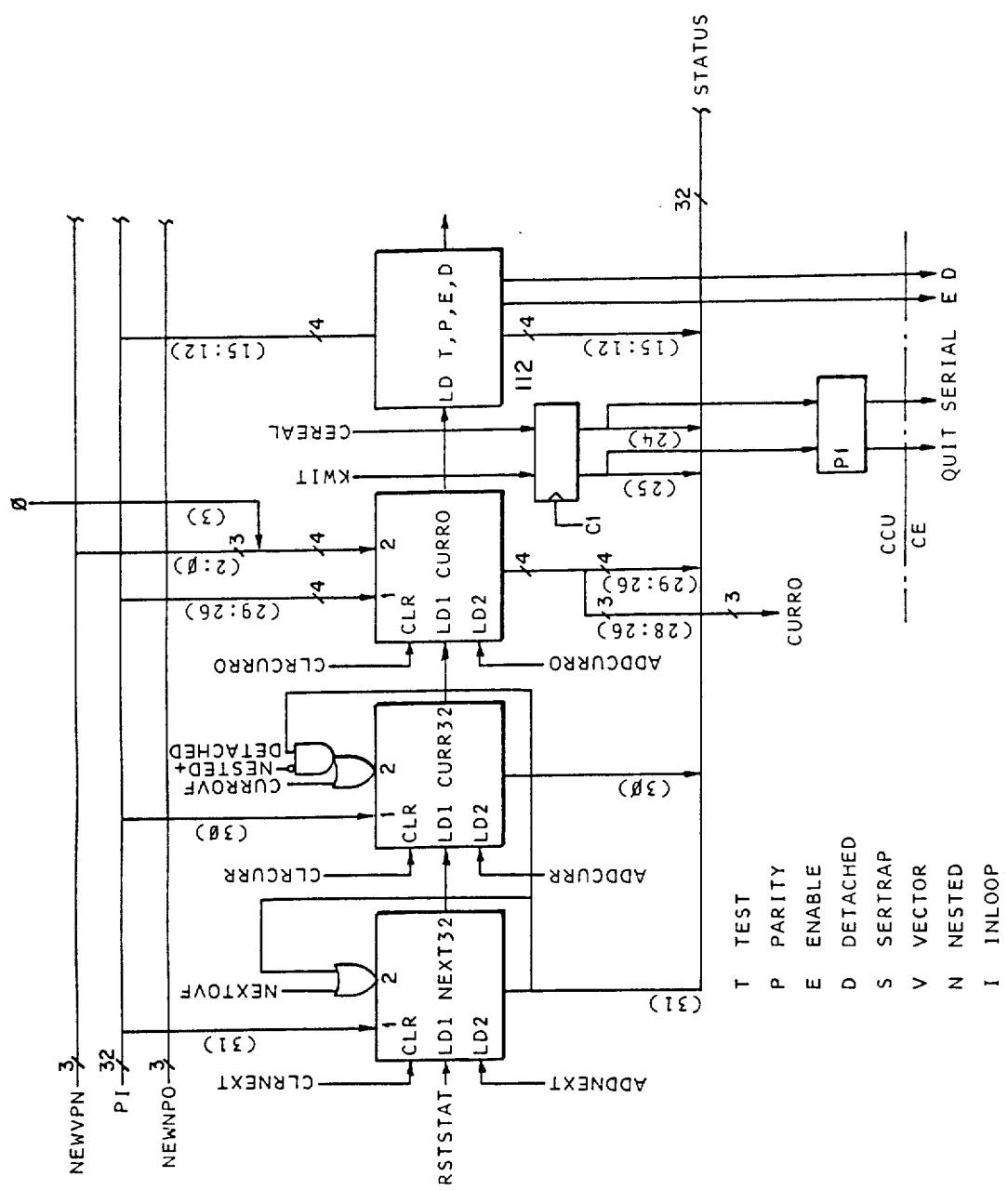
Figure 11B:
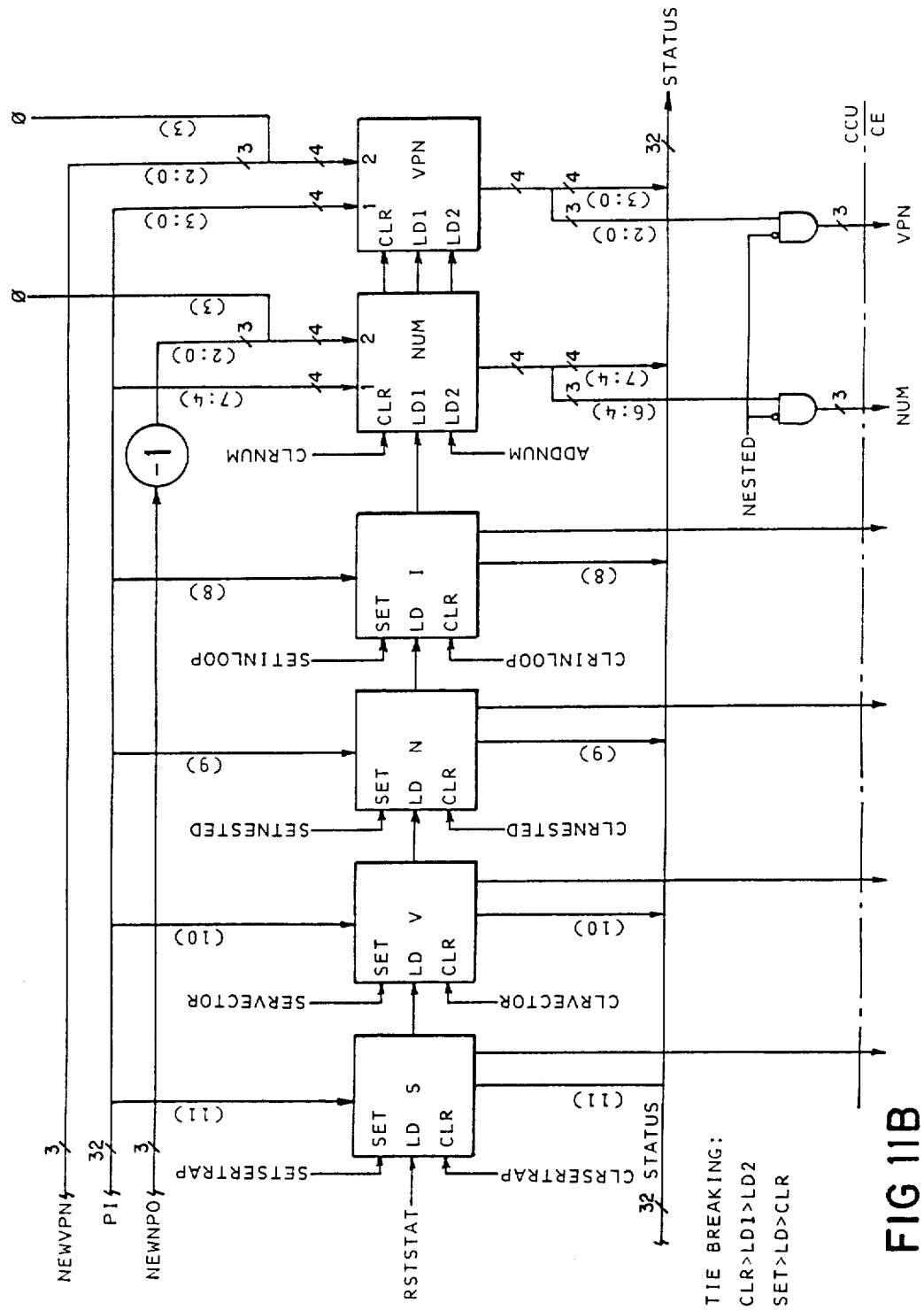

FIGS. 11A and 11B are two halves of a block diagram of the CCU status register (CSTAT).

Figure 12:
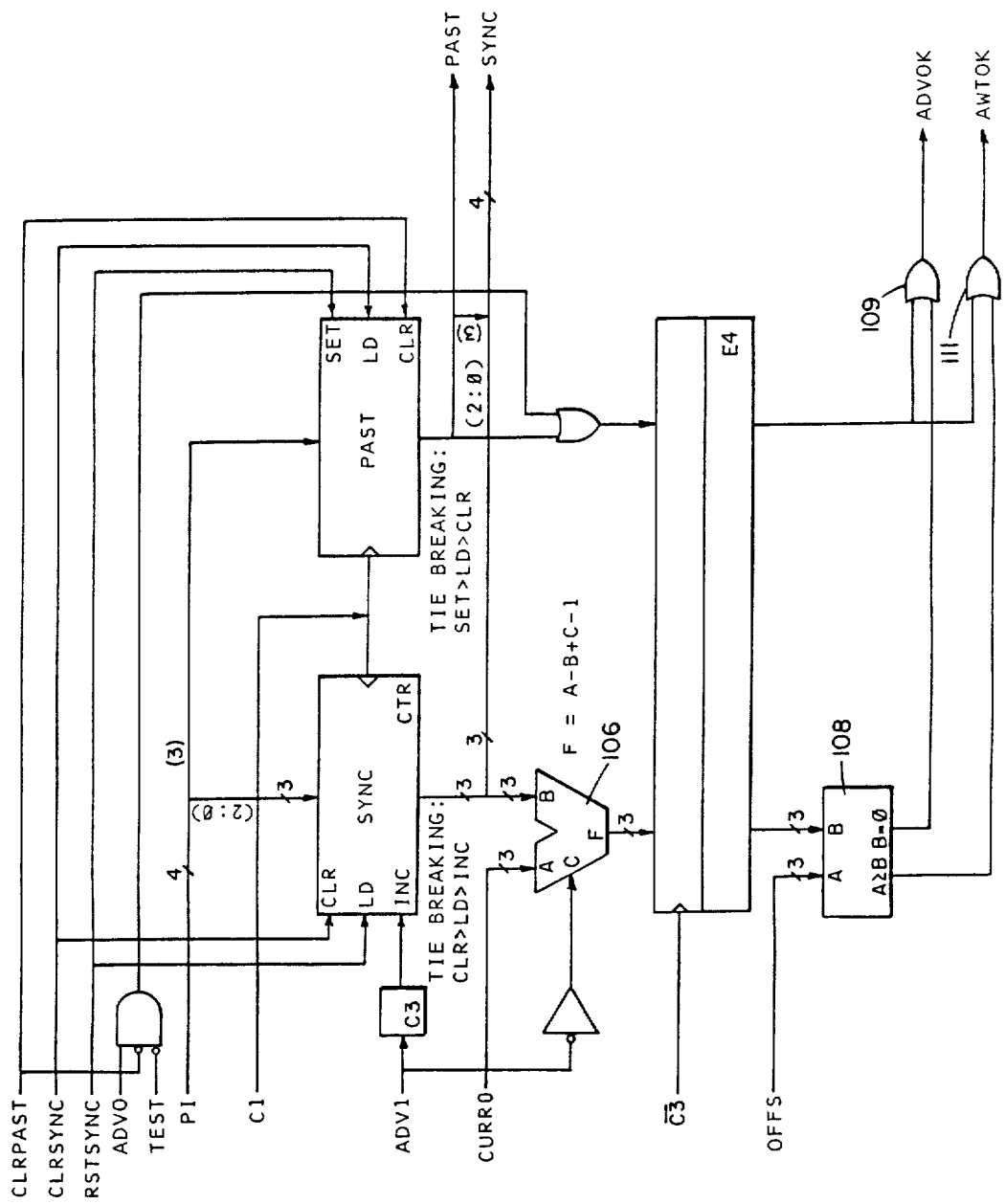

FIG. 12 is a block diagram of one of the eight 4-bit synchronization registers.

FIG. 13 is a timing diagram for the CSTART instruction.

FIG. 14 is a diagram illustrating an example of concurrent processing.

Figure 15:
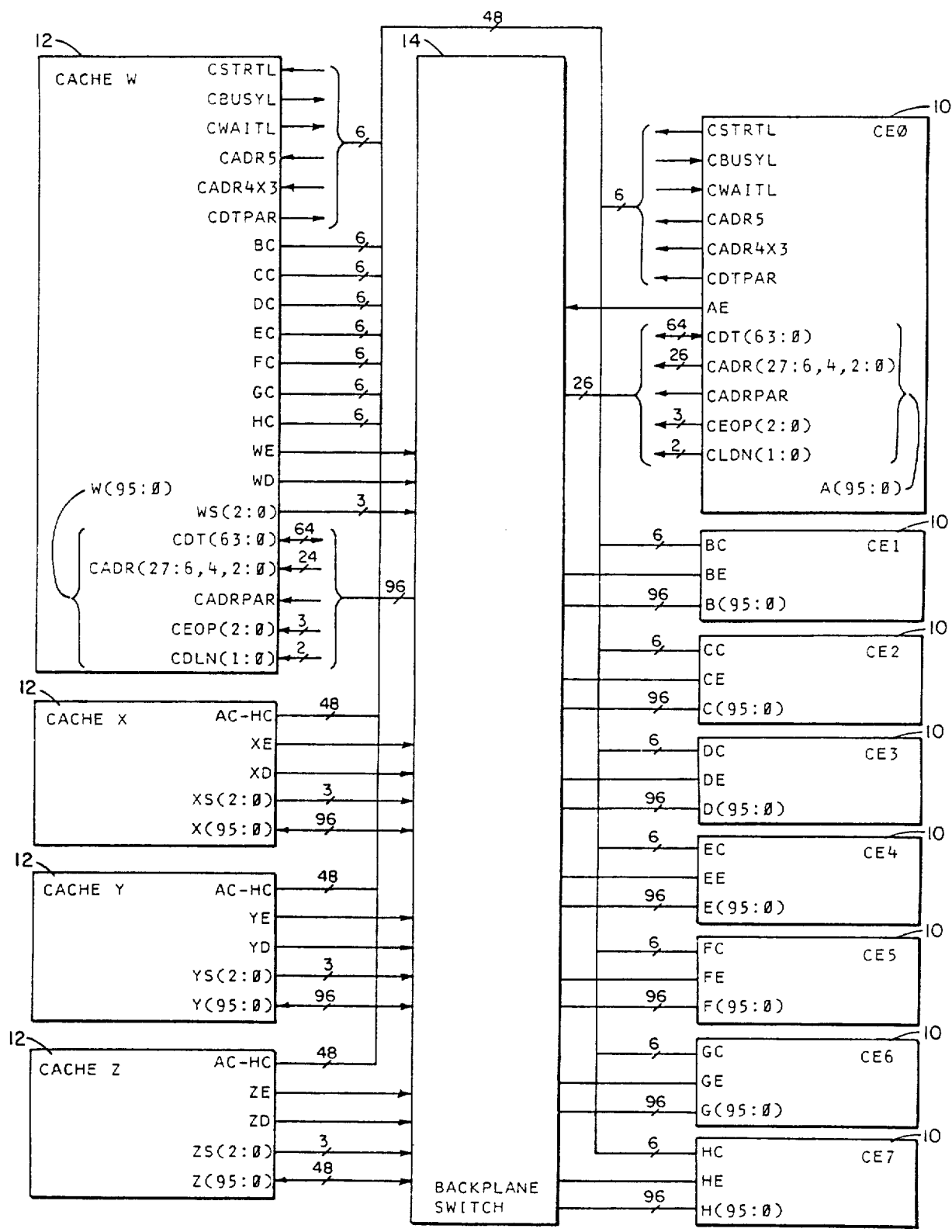

FIG. 15 is a block diagram showing the CEs, backplane switch, and cache quadrants, and the connections therebetween.

Figure 16:
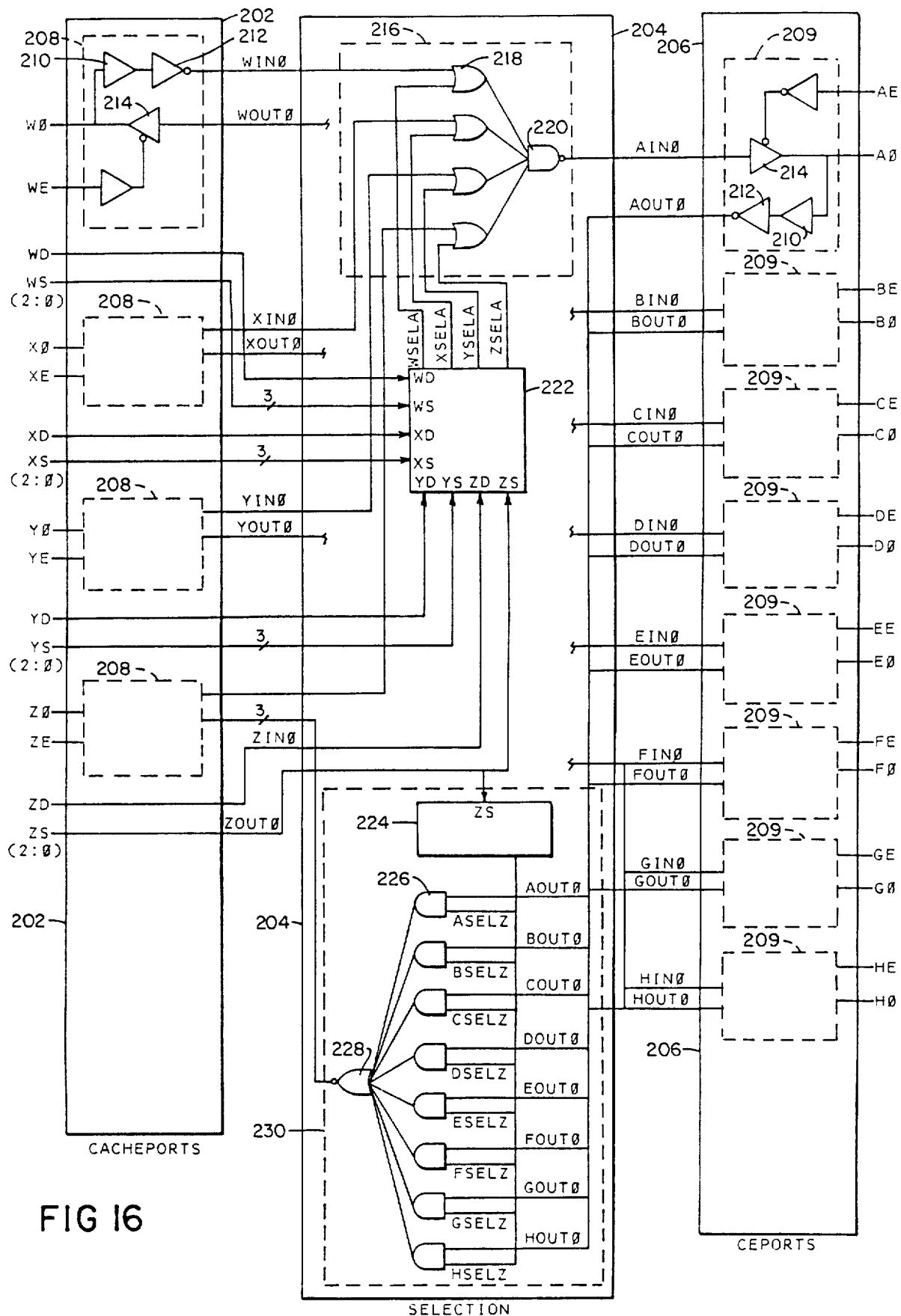

FIG. 16 is a block diagram of the backplane-switch logic simplified to show the logic for one bit of the ninety-six bits switched between the CEs and cache quadrants.

Figure 17:
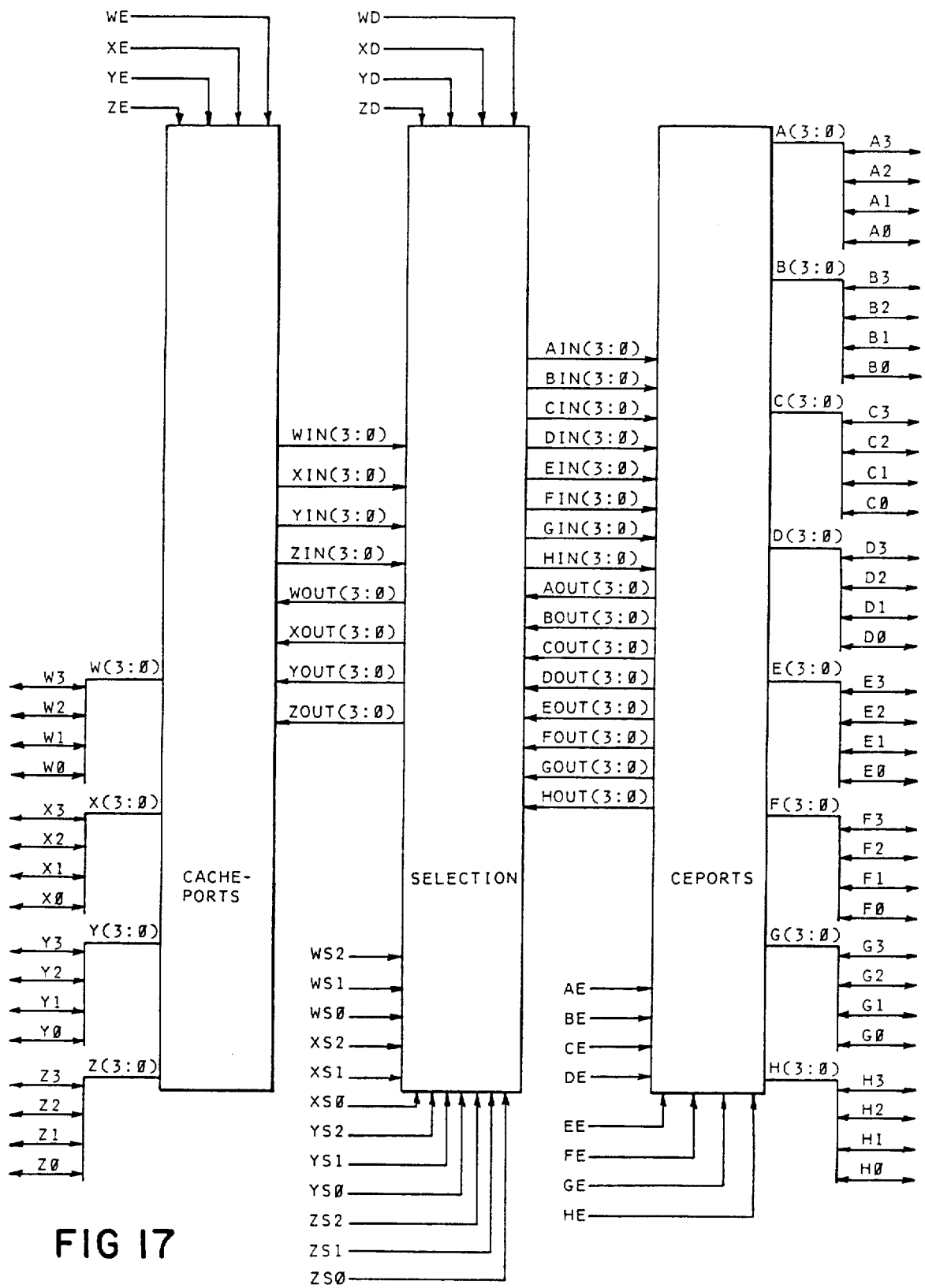

FIG. 17 is a block diagram showing one of twenty-four four-bit gate arrays forming the backplane switch.

Figure 18:
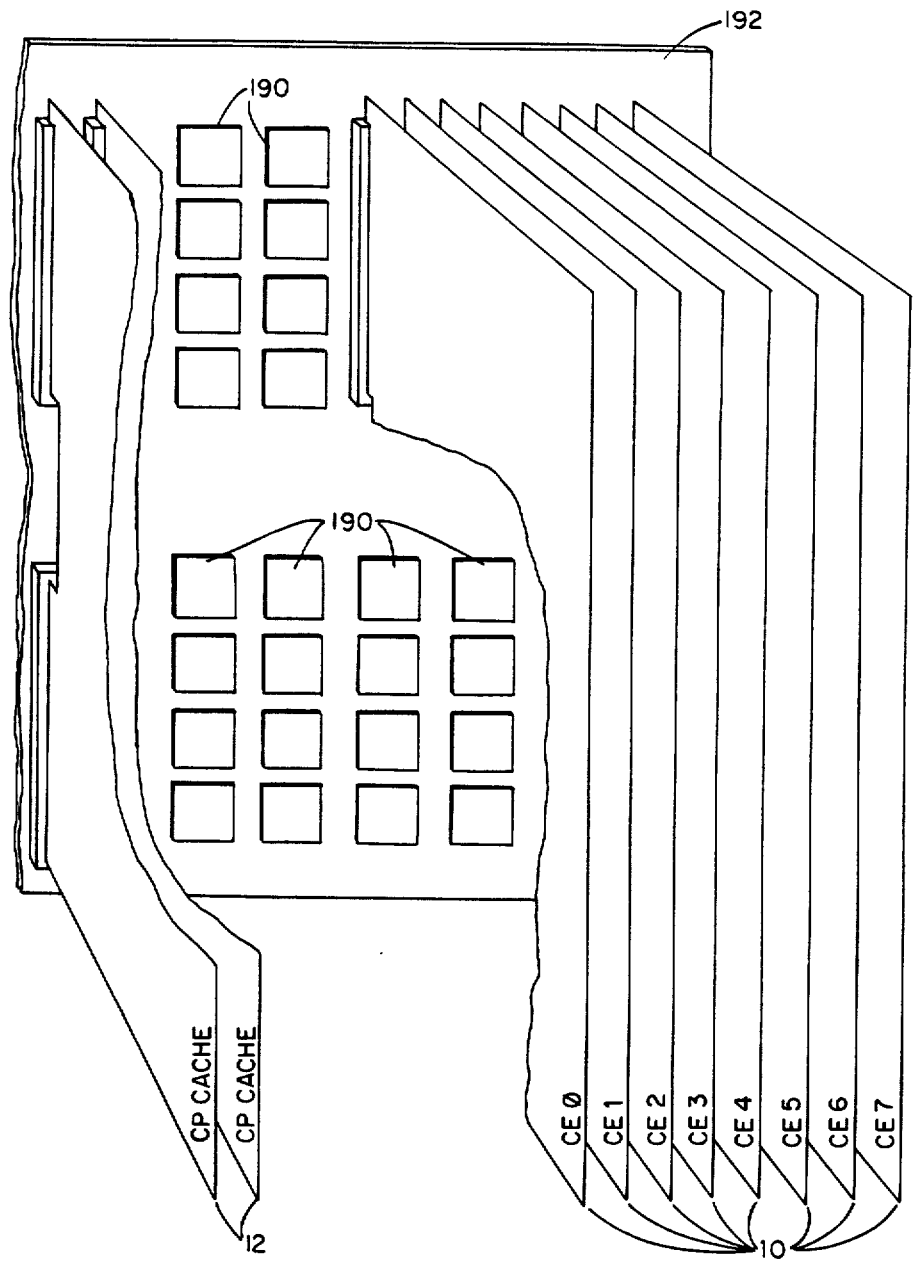

FIG. 18 is a perspective view, somewhat diagrammatic, of the circuit boards forming the CEs, cache quadrants, and backplane.

Figure 19:
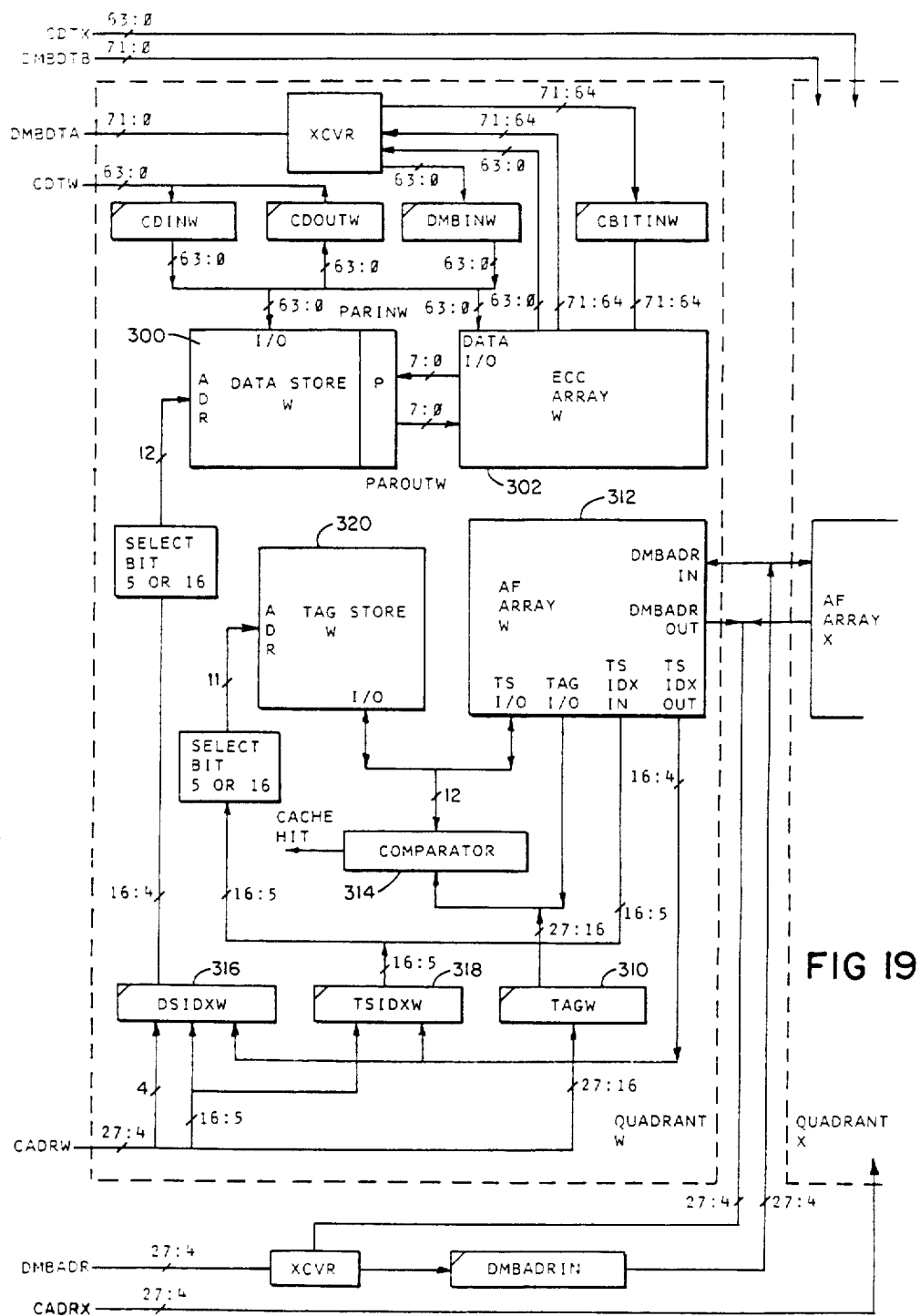

FIG. 19 is a block diagram showing the address and data paths in the cache quadrants.

Figure 20:
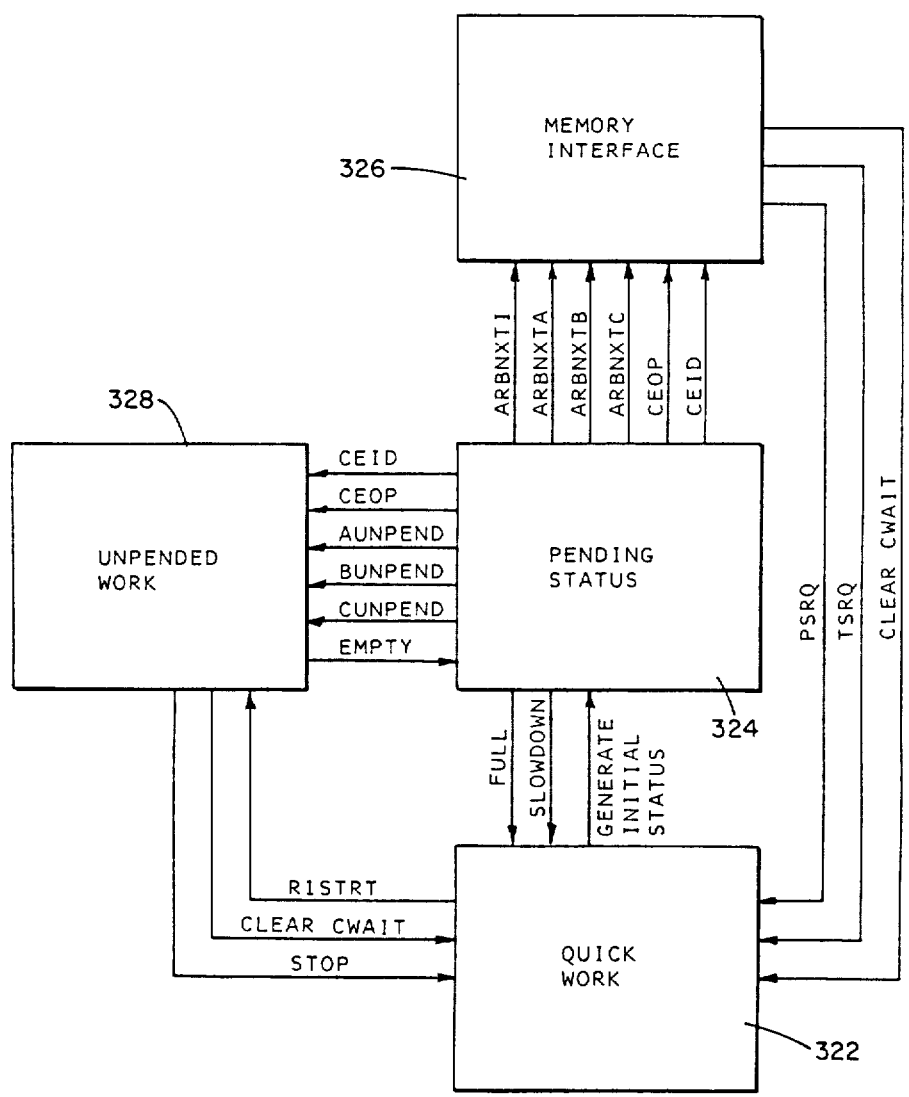

FIG. 20 is an overall block diagram of the control logic for the cache quadrants.

Figure 21:
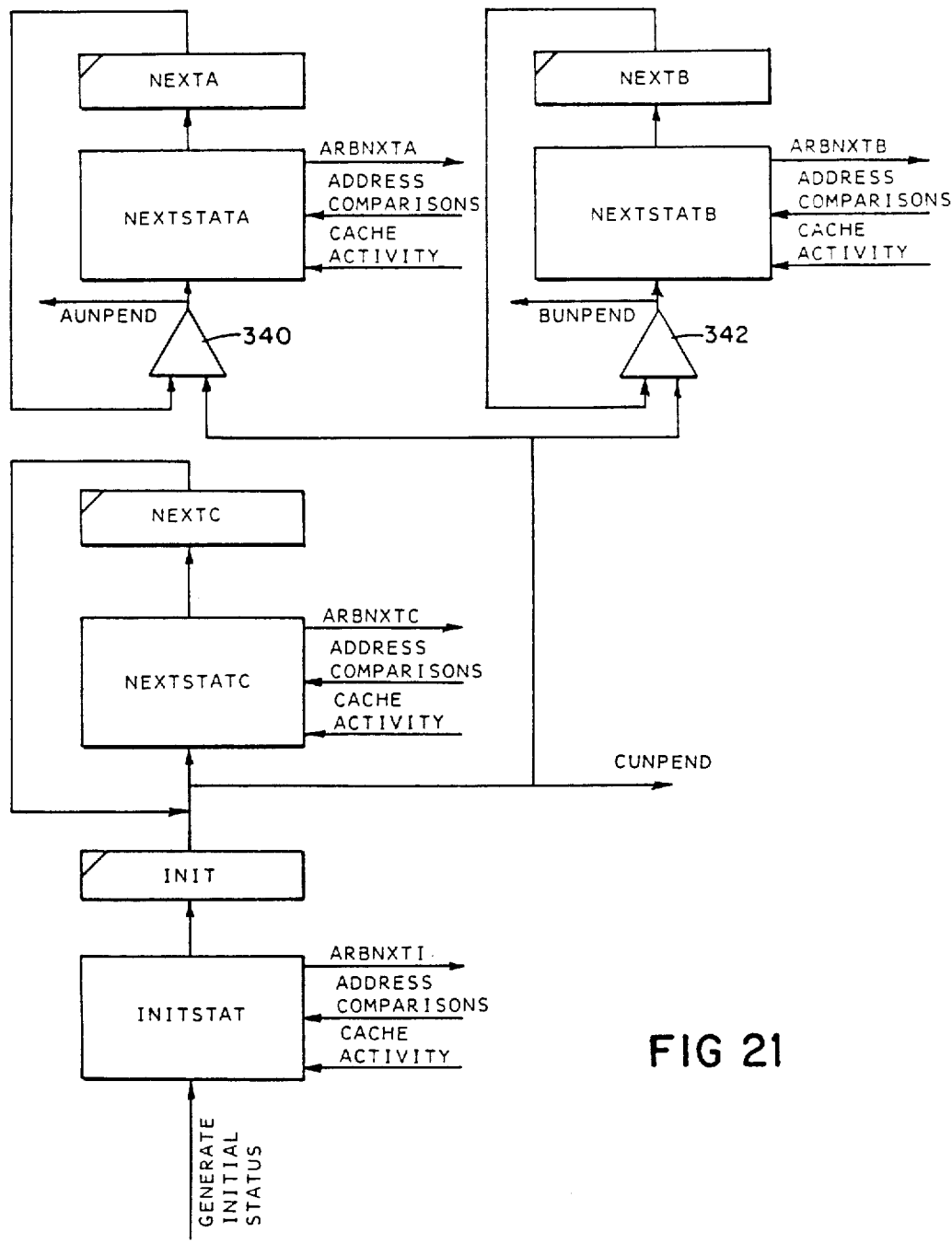

FIG. 21 is a block diagram of the pending-status logic in a cache quadrant.

II. Summary

Figure 1:
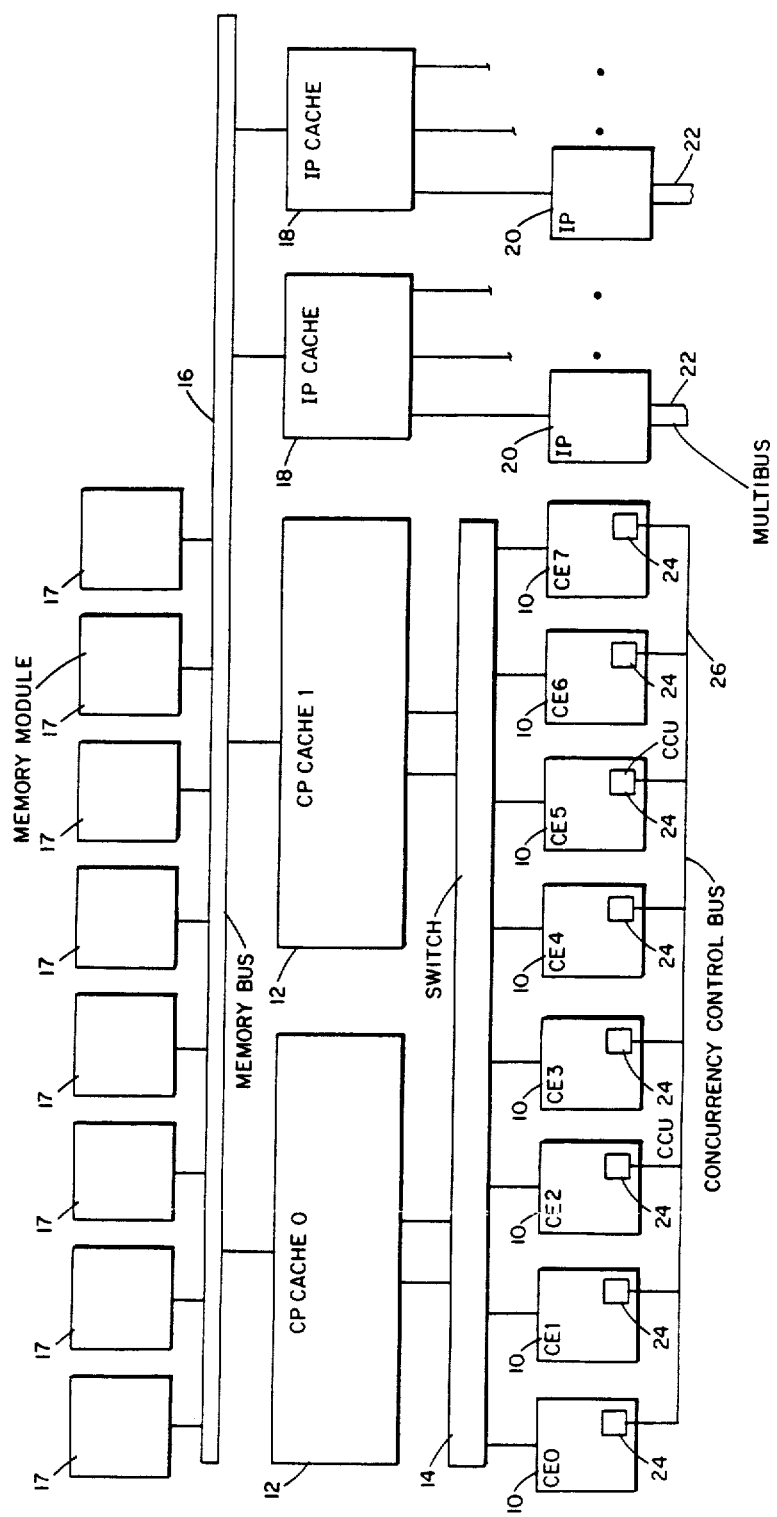
FIG. 1 is a system block diagram.

A system block diagram is shown in FIG. 1. Eight high-speed processors or computational elements (CEs) 10 are connected to two central processing cache boards 12 (each comprising two quadrants of a four-way interleaved central processing cache (CP cache)) by a switch 14 which resides on backplane 192 (FIG. 18) into which the CE and cache boards are plugged. The switch permits any four CEs to be concurrently accessing the four cache quadrants. The CEs each have a concurrency control unit (CCU) 24 for controlling concurrent processing. The CCUs communicate with other CCUs across a concurrency control bus 26. Memory bus 16 connects the cache quadrants to eight memory modules 17 (each 8 megabytes). Also connected to the memory bus are two interactive processor caches 18, each of which is connected to three interactive processors (IPs) 20. Each IP serves a multibus 22, to which peripheral devices (not shown) are connnected.

The system is a shared-global-memory, symmetric (i.e., not master-slave) multiprocessing computer particularly useful for general scientific and engineering computation. The CEs can execute vector, floating-point, and concurrency instructions, as well as integer and logical instructions. The CEs concurrently process different iterations of the same iterative construct (but they may also operate independently to provide a high-performance multi-tasking system). The IPs are moderate-speed interactive processors that can execute integer and logical operations only, and are used for handling input/output traffic, text editing, and similar operations. Data types supported include 8, 16, and 32 bit integer/logical data as well as IEEE standard 32 and 64 bit floating-point data on the CEs only. Memory is virtually addressed. CEs access global memory through cache boards 12, which the CEs communicate with via switch 14. Each CE has its own 16K byte virtually-addressed instruction cache. The IPs access global memory through interactive processor caches 18.

III. Computational Elements

The computational elements (CEs) are intended for high-speed computsations. The CEs are identical, and as few as one may be installed in a system. Any number of CEs may participate in concurrent processing. Those that do are said to be in the concurrency complex (hereinafter "the complex"). Those that do not are said to be detached (CCU status bit DETACHED is 1 to indicate such detached operation). CEs can be detached in the event that a job mix being executed on the system includes jobs that cannot make use of concurrent processing (e.g., compilation and debugging) as well as jobs that can (e.g., production jobs). A detached CE acts as if it were a system with only one CE present; it executes concurrency instructions as if it were a one-processor system.

Figure 3:
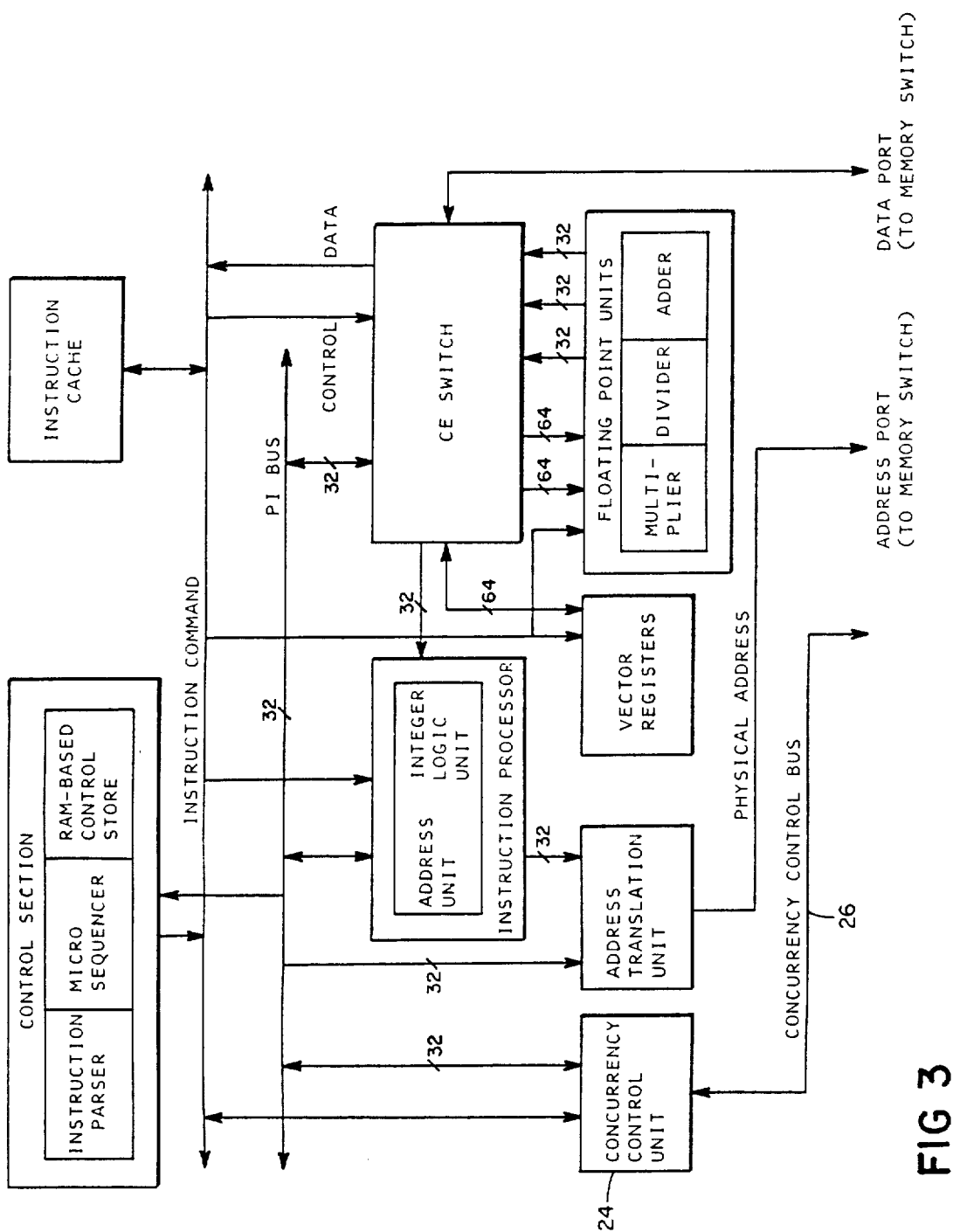
FIG. 3 is a block diagram of a high-speed processor or computational element (hereinafter a "CE").

A block diagram of a CE is shown in FIG. 3. A processor internal bus PIBUS (32 bits wide) is used to transfer data and addresses between the CCU 24, an address translation unit, an instruction processor (containing both an address unit and an integer logic unit and comprising a Motorola 68020 instruction set), and a CE switch, which serves as a conduit between the PIBUS, the vector registers, and the floating point units which include multipliers, dividers, and an adder). A control section (which includes an instruction parser, a microsequencer, and a RAM-based control store) provides instruction commands to the CCU, the instruction processor, the vector registers, an instruction cache, and the CE switch. The CE communicates with other CEs across the concurrency control bus 26, and with the CP caches 12 using the address and data ports connected to the memory switch 14.

A. Instructions

Each CE executes instructions stored in memory. Each is capable of interpreting and executing four categories of instructions: (1) base instructions, which implement data movement, logical, integer arithmetic, shift and rotate, bit manipulation, bit field, binary coded decimal, and program control operations; (2) floating point instructions, which implement arithmetic (including functions such as square root and sine), test, and move operations on floating point data; (3) vector instructions, which implement integer and floating point operations on up to 32 data elements at a time; and (4) concurrency instructions, which implement the parallel execution of instructions by multiple CEs. The processor contains several classes of registers (see below) for supporting instruction execution. An instruction consists of one or more whole words, where a word is 16 bits.

An instruction contains the information on the function and operands. Particular bits in the instruction define the function being requested of the processor; the number and location of the defining bits can vary depending on the instruction. The remaining bits of the instruction define the operand—the data to be acted upon. The data can be in memory, in registers within the processor, or in the instruction itself (immediate data); it can be specified as register numbers, values, and addresses.

Instruction execution normally occurs in the order in which the instructions appear in memory, from low addresses to high addresses. Instructions being executed in the normal sequence must immediately follow one another.

The processor controls the sequence of instruction execution by maintaining the memory address of the next instruction to be executed in a 32-bit register called the program counter (PC). During the execution of instructions that do not alter the normal sequence, the processor increments the PC so that it contains the address of the next sequential instruction in memory (that is, the address of the word immediately following the current instruction). For example, the PC would be incremented by 4 following execution of a 32 bit instruction. Instructions modify the contents of the PC to permit branching from the normal instruction sequence. Other instructions alter the normal sequence by loading a specified value into the PC.

Most of the base instructions and those vector instructions that produce scalar integer results alter special bits in the processor called integer condition codes. For example, subtracting two equal integer values sets the zero condition code, while subtracting a larger integer value from a smaller integer value sets the negative condition code. Some instructions contain a 4-bit condition code field whose value specifies a condition such as equal, less than, greater than, and so on. The condition is true if the condition codes are set in a certain way. For example, if the zero condition code is set, the equal condition is true; if the negative condition code is set and the overflow condition code is cleared, the less than condition is true; if the negative and overflow condition codes are set and the zero condition code is cleared, the greater than condition is true. The floating point instructions have separate floating point condition codes.

1. Vector Instructions

A vector instruction can operate on up to 32 elements of integer or floating point data at once. For example, a single vector add instruction can: add a scalar value to each element of a vector, add the corresponding elements of 2 vectors, or add the elements of a vector together (reducing the vector to a scalar value). Vector instructions require set-up work to specify the characteristics of the vectors. Vectors of length greater than 32 elements are processed in a loop. On each iteration of the loop, the length is decremented by 32. The final iteration may (and usually does) contain fewer than 32 elements. E.g., with a 72-element vector, the vector instructions would operate on 32-element vectors during the first 2 iterations and on an 8-element vector in the third and last iteration. The different iterations of such vector loops can be executed concurrently on a plurality of CEs.

2. Processing States

A CE operates in one of the three processing states: (1) normal, the state in which the processor executes instructions from memory as described in the preceding sections; (2) exception, the state initiated by external interrupts, bus exceptions, certain instructions, traps, and occurrences of certain conditions during instruction execution; (3) halted, the state caused by a serious failure requiring the processor to halt. The processor operates in one of two privilege states: user, in which execution of privileged instructions is inhibited, and supervisor, in which execution of nearly all instructions is permitted. The supervisor state can be either interrupt-supervisor state or master-supervisor state, to permit access to different system stacks. The processor enters interrupt-supervisor state when an exception occurs. Exception processing is the only method for entering supervisor state.

3. Address Spaces

Addresses specified in instructions are normally virtual (logical) and undergo a translation before being used. A virtual address can occur in one of several address spaces depending on the state of the machine and the nature of the data being accessed (for example, whether the processor is fetching an instruction or an operand): user data space (accesses of data in user privilege state); user program space (accesses of instructions in user privilege state); supervisor data space (accesses of data in supervisor privilege state); supervisor program space (accesses of instructions in supervisor privilege state); processor (CPU) space (accesses of instructions in any privilege state do not normally occur in processor space, which contains internal registers). The user and supervisor address spaces are references to external memory units. The processor address space is a read/access storage area internal to a CE.

B. Data Types

A CE supports integer, bit, bit field, binary coded decimal, and floating point data types. In addition, integer and floating point data can be accessed as vectors.

1. Integer Data

An integer data element can be a byte (8 bits), a word (16 bits, 2 bytes), or a longword (32 bits, 4 bytes). For signed arithmetic operations, the integer represents a positive or negative whole number. The most significant bit constitutes the sign of the number; it is cleared for a positive number, and set for a negative number. The remaining bits constitute the value of the number. Positive numbers are stored in binary notation. Negative numbers are stored in two's complement notation—the bits of the corresponding positive value are inverted and one is added to the result. For unsigned arithmetic operations, the integer represents an absolute whole number; all the bits constitute the value of the number; numbers are stored in binary notation. For logical operations, the integer is treated on a bit by bit basis.

2. Bit and Bit Field Data

Bit operations permit access of a bit by specifying its offset from the low order bit of a byte. Bit field operations permit access to a sequence of bits by specifying (a) the offset of the bit field from the low address bit of a byte and (b) the width of the bit field.

3. Floating Point Data

A floating point data element can be a longword (single precision) or a quadword (double precision). The least significant bit is always the high address bit of the data element and the bit numbers run from the high address bit to the low address bit within the data element. Representation of floating point data in memory follows the IEEE standards for single and double precision numbers, with some restrictions. The storage element consists of three parts: sign, exponent, and fractional part of mantissa.

4. Vector Data

A vector can be integer or floating point in type. The number of elements is called the vector length. The elements can be adjacent or can be separated by a constant stride. The stride is called the vector increment and is measured in multiples of the element size.

C. General Registers

Each CE contains data, address, floating point, and vector registers for general programming use. There are 8 data registers, named D0 through D7, which can be used for storing integer and bit field data; each register is 32 bits in size. There are 8 address registers, named A0 through A7, which can be used for storing word and longword integer data; each register is 32 bits in size. There are 8 floating point registers, named FP0 through FP7, which can be used for storing single and double precision floating point data; each register is 64 bits in size. There are 8 vector registers, named V0 through V7, which can be used for storing long integer and floating point data; each vector register is 64 bits by 32 elements (2048 bits total) in size; the data elements in one register must be of the same type and size.

D. Control Registers

In addition to the registers for general use, there are control registers. Most of these registers are modified implicitly during the execution of certain instructions, although some of the control registers can be manipulated directly.

The program counter (PC) is a 32-bit register that contains the address of the next instruction to be executed. The processor alters the contents of the PC as a part of normal instruction execution. Most instructions advance the PC to the memory address immediately following the instruction being executed, so that a sequential flow of instructions occurs. Some instructions permit jumping to a new instruction by loading a new address into the PC.

Address register 7 (A7) is treated as the user stack pointer (SP) if user mode is in effect, the master stack pointer if master supervisor mode is in effect, and the interrupt stack pointer if interrupt supervisor mode is in effect. The stacks are areas of memory that can be accessed on a last-in, first-out basis. Each stack is contiguous, running from high addresses to low addresses. The term system stack refers to any of the three stacks. The term supervisor stack refers to either the master stack or the interrupt stack. The stack pointer contains the address of the last word placed on the stack (the top of the stack). Storage is allocated on the stack by decrementing the stack pointer, and deallocated by incrementing the stack pointer. For example, to push the contents of A0 onto the system stack, the stack pointer (A7) is decremented by 4 (4 bytes), and A0 is stored at the address contained in the stack pointer.

A status register (16-bits) is provided. The low-order 8 bits contain the condition codes and the integer overflow bit. Instructions that operate on integer, bit, and bit field data (the base instructions) typically affect the condition codes. Vector instructions that produce scalar integer results also affect the condition codes. Condition codes include negative condition code (set if an instruction produces a negative result), zero condition code (set if an instruction produces a result of 0), overflow condition code (set if an instruction produces a result that overflows the size of the destination operand), carry condition code (set if an instruction generates a carry or a borrow), and extend condition code (set the same as the carry condition code).

Floating point operations (including vector operations on floating point operands) use a floating point status register, a 32-bit register that contains floating point condition codes and exception codes; and a floating point control register, a 32-bit register that contains exception trap enable codes and floating point mode codes.

Vector instructions reserve three data registers as control registers for specifying the length, increment, and offset of the vector instruction being processed. These registers are loaded prior to a vector insruction.

The control registers for concurrency operations are discussed in a subsequent section.

Each CE also has several internal processor registers.

E. Memory Management

The memory management mechanism permits each program using the processor to address a very large amount of virtual memory (e.g., $2^{32}$ bytes) starting at address 0. The processor (as a part of normal instruction execution) translates a program's virtual references to physical memory addresses using tables provided by software (for example, an operating system). If a virtual reference does not have a corresponding physical memory address, the processor can change to exception processing and transfer control to the memory management exception vector routine, permitting software to validate the virtual reference (for example, by reading the referenced instruction or data into memory from secondary storage). In this way, a program can use more space than a machine has physical memory, and many programs can work on one machine as if each program occupied memory alone. Virtual addresses for each program can be mapped to separate physical memory addresses for private, protected environments and to the same physical memory addresses as other programs to share code and data. In addition, the memory management mechanism permits areas of memory to be flagged as read-only.

Memory management supports four virtual address spaces: user data (accesses of data in user privilege state), user program (accesses of instructions in user privilege state), supervisor data (accesses of data in supervisor privilege state), and supervisor program (accesses of instructions in supervisor privilege state). The initial memory addressed by each program can be divided into 1024 segments, each segment containing 1024 pages, and each page containing 4096 bytes. Virtual addresses can be flagged as read-only on a per space, per segment, and per page basis.

Physical memory consists of $2^{28}$ addressable bytes numbered consecutively from address 0. Memory management divides physical memory into a series of pages each 4096 bytes in size.

A virtual address (32 bits in size) is divided into segment (10 bits), page (10 bits), and byte (12 bits) numbers. A physical address (28 bits in size) is divided into physical page (16 bits) and byte (12 bits) numbers. The low order 12 bits of a virtual address map directly to the low order 12 bits of a physical address; no translation takes place. The high order 20 bits of a virtual address (the segment and page numbers) point to a physical page through tables supplied by software, including segment and page tables. The processor constructs a physical address by determining the physical page number from the tables and the high order 20 bits of the virtual address. The 12 low order bits of the virtual address are then added to the physical page number yielding a complete physical memory address.

A CE caches the most recently used segment and page tables in an internal page translation buffer as translations are made. A CE first attempts to determine the physical page number associated with a virtual address from the page tables in the translation buffer. If the translation buffer does not contain the necessary page table, the CE attempts to locate the page table in memory from the segment tables in the translation buffer. If the translation buffer contains the necessary segment tables, the CE then examines the page table in memory to determine the physical page number. If the translation buffer does not contain the necessary segment table, the processor must examine the tables in memory to determine the physical page number.

IV. Interactive Processors

The interactive processors (IPs) are oriented toward input/output and operating systems duties. Each IP has the same base instructions and supporting registers as the CEs, but not its floating point, vector, or concurrency registers and instructions. An IP can access system registers, system devices, and input/output devices. Memory is accessed through an interactive processor cache (IPC), with up to three IPs being served by a single IPC. An IP is connected to peripheral devices through a multibus, and can transfer data between a peripheral device and system memory by way of the multibus and its IPC. An IP has asynchronous communications channels for console and diagnostic devices. A console IP is used to start the system, using the code read from its power-up EPROM. The operating system is also booted from EPROMs.

Figure 2:
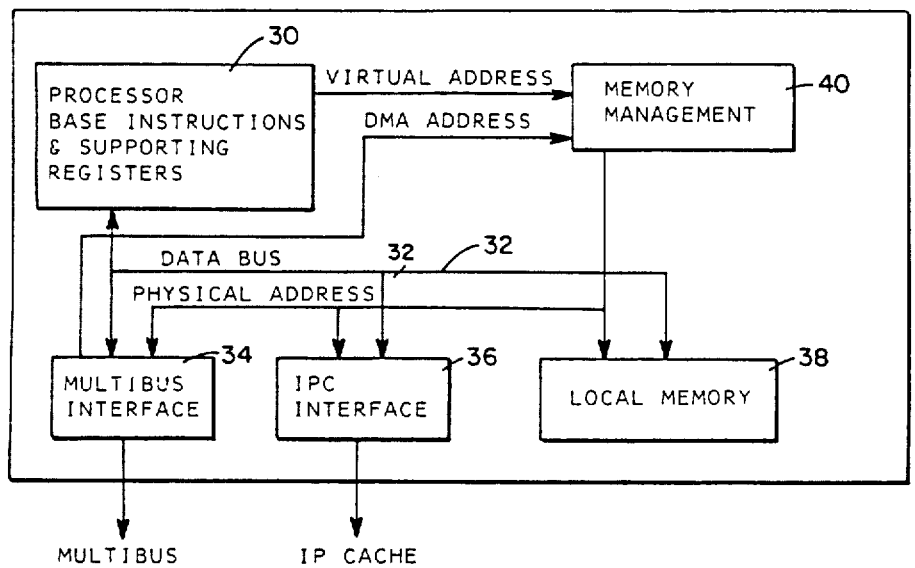
FIG. 2 is a block diagram of an interactive processor.

FIG. 2 is a block diagram of an IP. Processor 30 is connected by data bus 32 to multibus interface 34, IPC interface 36, and local memory 38. Virtual addresses supplied by processor 30 are translated by memory management 40. The local memory includes a power-up EPROM, boot EPROMs, registers, timers, a local 512K RAM, an EEPROM (providing additional registers), and registers for accessing DUART (dual universal asynchronous receiver/transmitter) channels.

Memory management is accomplished using two caches—a supervisor map and a user address translation unit (ATU)—and logic for translating virtual memory addresses (32 bits) to physical addresses (28 bits). The ATU is divided into a program section and a data section. Physical addresses are one of four types: global memory (28 bits defining an address in the main memory accessible by way of the IP cache), multibus (20 bits), local memory (28 bits), and IPC device (28 bits specifying a device, register, or storage area on the IPC).

V. Concurrent Processing and the CCUs

Figure 5:
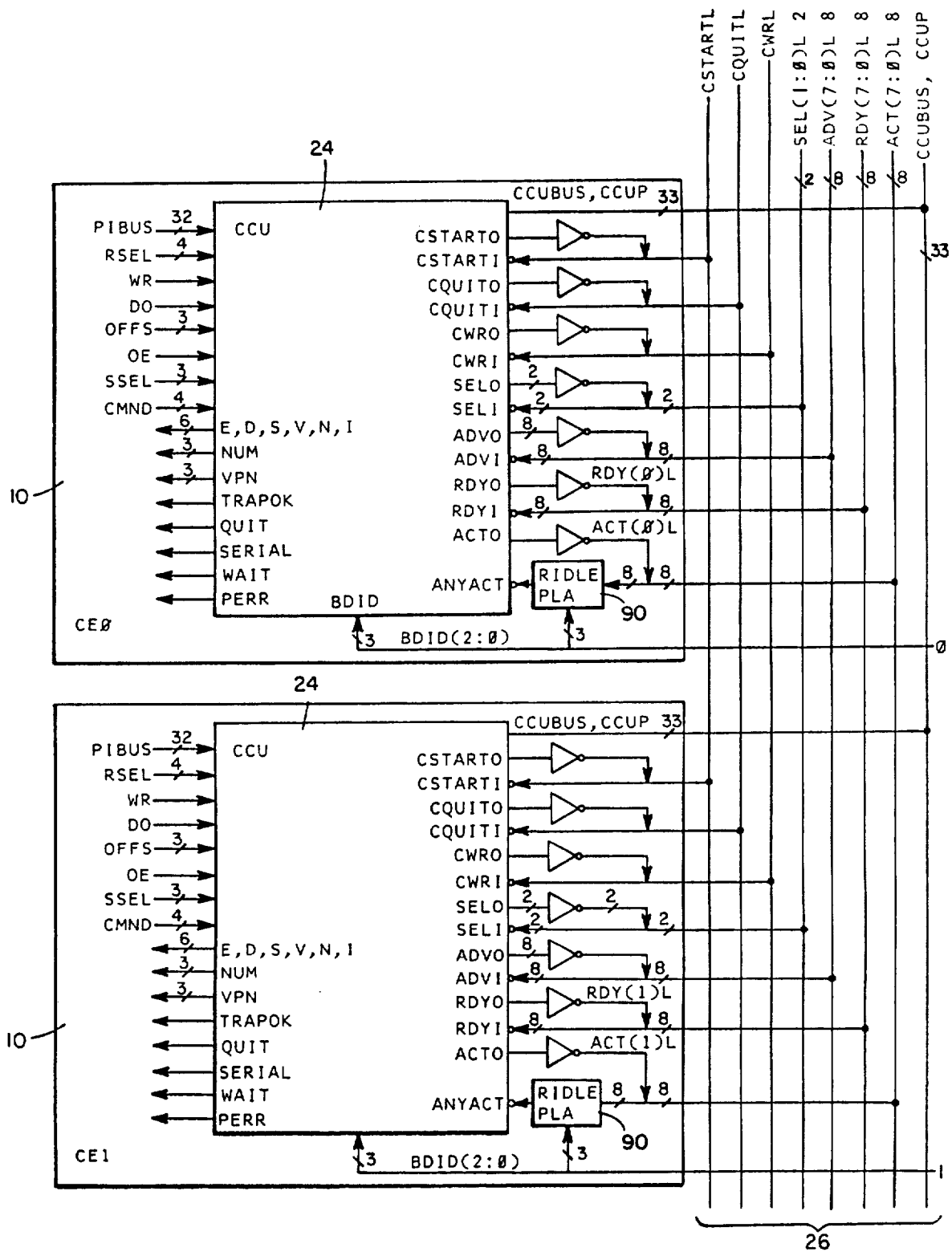
FIG. 5 is a block diagram showing the concurrency control bus that connects concurrency control units (hereinafter "CCUs") and showing the connections between each CCU and its CE (only two CEs and CCUs are shown).

Referring to FIGS. 1 and 5, each CE 10 includes a CCU 24 that communicates with other CCUs across a concurrency control bus 26. The CCU provides hardware support for initiating concurrent processing, assigning iterations, synchronizing dependencies, and terminating concurrent processing. The CCU and CCU bus are shown in FIGS. 5–12. Appendix B comprises the Boolean equations for five logic arrays of the CCU (CONTROL, DECODER, WAIT, PIDEC, RIDLE).

A. Concurrency Instructions

Concurrent processing is controlled using the following twenty concurrency instructions:

| | Loop Control Instructions |
|---|---|
| CADVANCE | Advance synchronization register. |
| CAWAIT | Await synchronization register advance. |
| CIDLE | Do nothing. |
| CQUIT | Exit concurrent loop. |
| CSTART | Start concurrent loop. |
| CSTARTST | Start concurrent loop and serialize traps. |
| CVECTOR | Start vector concurrent loop. |
| CVECTORST | Start vector concurrent loop and serialize traps. |
| CREPEAT | Branch to top of concurrent loop if more iterations. |
| | Save, Restore, and Move Instructions |
| CMOVE FROM | Move CCU status register contents to a specified address. |
| CMOVE TO | Load CCU status register from a specified address. |
| CNEST | Save contents of CCURR, CMAX, CGSP, and CSTAT registers. |
| CUNNEST | Restore contents of CCURR, CMAX, CGSP, and CSTAT registers. |
| CRESTORE | Restore contents of all ten CCU registers. |
| CSAVE | Save contents of all ten CCU registers. |
| | Vector Concurrency Instructions |
| VIH | Calculate the increment of a vector for horizontal concurrent vector operations. |
| VLH | Calculate the length of a vector for horizontal concurrent operations. |
| VLV | Calculate the length of a vector for vertical concurrent operations. |
| VOH | Calculate the offset of a vector for horizontal concurrent operations. |
| VOV | Calculate the offset of a vector for vertical concurrent operations. |

A detailed description of the functions performed by each of the first fifteen instructions is given in Appendix A, using a pseudocode that is explained in the appendix. The last five, the vector concurrency instructions, are described in the section on vector concurrent processing.

B. CCU Registers

There are ten 32-bit registers in each CCU:

CMAX (maximum iteration): The register contains the maximum iteration count for a concurrent loop in progress. This value is the same across all CEs in the concurrency complex.

CNEXT (next outer iteration): The register contains the low-order portion of the number of the next iteration for a concurrent loop in progress. The complete number is 33 bits with the high-order bit (CNEXT32) being stored in the CCU status register. The value is the same across all CEs in the complex.

CCURR (current iteration): The register contains the low-order portion of the number of the current iteration of a concurrent loop. The complete number is 33 bits with the high-order bit being stored in the CCU status register. This value is unique to each CE in the complex.

CCSP (unique ("cactus") stack pointer): The register holds the address of the base of a stack for storing local variables during concurrent loop execution. This value is unique to each CE in the complex.

CGSP (global stack pointer): The register is used to broadcast the stack pointer to other CEs prior to starting a concurrent loop.

CGPC (global program counter): The register is used to broadcast the program counter to other CEs prior to starting a concurrent loop.

CGFP (global frame pointer): The register is used to broadcast the frame pointer to other CEs prior to starting a concurrent loop.

CIPC (idle instruction address): The register is used to hold the address of the idle instruction, the instruction continuously executed by CEs in the complex when they are not needed.

CSYNC (synchronization registers): The register is the collective contents of the eight 4-bit synchronization registers, which are used to synchronize dependencies within a concurrent loop, and one of which may also be used to serialize traps.

Figure 4:
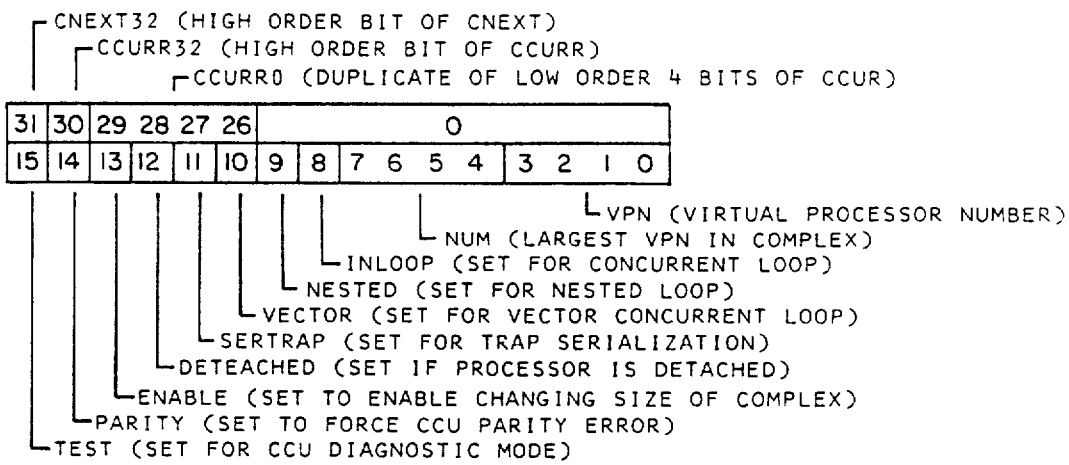
FIG. 4 is a diagram showing the structure of the concurrency status register (CSTAT).

CSTAT (the CCU status register): The register contains a variety of single-bit and multi-bit fields, as shown in FIG. 4.

C. CCU Status Register

The various fields of the CCU status register (CSTAT) are:

VPN (virtual processor number): VPN is the rank of a CE among N CEs in the complex, using a continguous numbering from 0 to N-1. There is not a one-to-one correspondence between the physical number of a CE and its VPN, as a CE may be absent, broken, or not taking part in concurrent processing. The VPN of each CE within the concurrency complex is computed during the CSTART sequence.

NUM (the number of CEs in the concurrency complex): NUM is a number from 0 to 7 expressing the total number of CEs in the complex (0 meaning one CE in the complex). NUM equals the highest VPN in the complex. NUM is computed during the CSTART sequence.

INLOOP: The INLOOP status bit indicates whether a CE is processing a concurrent loop. INLOOP is globally set to 1 (in all CCUs in the complex) during the CSTART sequence, and is used to wake up other CEs in the complex. It is cleared when a CE goes idle or resumes serial processing.

NESTED: The NESTED status bit indicates that its CE is executing a nested concurrent loop. NESTED is locally set to 1 when a CNEST instruction is encountered after concurrent processing is underway.

SERTRAP: The SERTRAP status bit is globally set to 1 when either a CSTARTST or CVECTORST is encountered, so that that traps become serialized.

ENABLE: The ENABLE bit can be used by the CE (with a CSAVE and CRESTORE operation) to leave a flag that a request to change the number of CEs in the complex has been made. Logic in the CE could inspect INLOOP and ENABLE, and if the bits were 0 and 1, respectively, inform the operating system so that a change in the complex size could be made while no concurrent processing was underway.

DETACHED: The DETACHED status bit specifies whether a CE is a member of the concurrency complex (a 1 indicates that it is not).

VECTOR: The VECTOR status bit is set to indicate that it is a vector-concurrent loop that is being executed.

PARITY: The PARITY status bit is set to force a CCU data bus parity error (by asserting PERR).

TEST: The TEST status bit can be used for diagnostic purposes.

CCURRO: These four bits are a zero followed by a duplicate of the low-order three bits of the current iteration number (CCURR).

CCURR32: This is the highest order bit of CCURR.

CNEXT32: This is the highest order bit of CNEXT.

D. Concurrency Control Bus

As shown in FIG. 5, the CCUs communicate with other CCUs across a concurrency control bus 26 consisting of 29 control lines and one 33-bit data bus (CCUBUS). The CCUBUS is bidirectional, and includes an additional parity bit CCUP. The control lines include three eight-bit groups of lines: advance lines ADV, ready lines RDY, and active lines ACT. Each advance line corresponds to one of eight synchronization registers. Each ready and active line corresponds to one of the eight CEs. The notation (FIG. 5) "(7:0)" following each of these groups of eight lies indicates that the lines are denoted "0" through "7". Every CCU receives as inputs all eight ready and active lines, and can place an output on its own line within each group. Outputs are denoted by the suffix "O"; inputs by the suffix "I" (e.g., there are eight ready input lines RDYI(7:0) and one ready output line RDYO at each CCU). The remaining five control lines comprise two select lines SEL(1:0), a CSTART line, a CQUIT line, and a write line CWR, all of which can be read and written by each CCU. The same "O" and "I" suffixes, meaning output and input, respectively, are used for signals on these lines.

The physical identity of each CE and its CCU is established where the CE is plugged into the backplane. A different board identity signal BDID (varying from 0 to 7) is supplied to each CE connector, from which it is routed to the CCU.

E. Communication Between the CEs and CCUs

Each CCU communicates with its CE across the CE's 32-bit data bus (PIBUS) and several control lines (FIG. 5). Control signals supplied to the CCU by the CE include a register select signal RSEL (4 bits), a write signal WR, a command signal DO, the iteration offset OFFS (3 bits; an argument of the AWAIT instruction), a read (or output enable) signal OE, a synchronizer select signal SSEL (3 bits; an argument of the AWAIT and ADVANCE instructions), and an instruction identifier signal CMND (4 bits). Control and status signals supplied to the CE from the CCU include six status bits from the CSTATUS register (ENABLE, DETACHED, SERTRAP, VECTOR, NESTED, INLOOP), the number of CEs in the complex NUM (3 bits), the CE's virtual number VPN (3 bits), and the signals TRAPOK, SERIAL, QUIT, WAIT, and PERR (each 1 bit). Several clocks C1, C3, P1, P3, E4 are passed to the CCU from the CE.

F. Initiating Concurrent Processing

Prior to concurrent processing only one of the CEs in the concurrency complex is active; the others are ordinarily idle. Concurrent processing is initiated when the active CE executes a CSTART (or CSTARTST, CVECTOR, CVECTORST) instruction. Microcode in the active CE supplies a multicycle sequence of instructions to the CE's CCU, instructions that (1) wake up the other CEs in the complex, (2) pass information (maximum iteration, global stack pointer, global frame pointer, and program counter) to its own CCU and, via the CCU bus, to other CCUs and CEs in the complex, (3) cause each CCU to arbitrate for an iteration to be executed by its CE, and (4) read from the CCU the assigned iteration number and a unique ("cactus") stack pointer for use during concurrent processing.

1. Waiting For Other CEs To Go Idle

Figure 6:
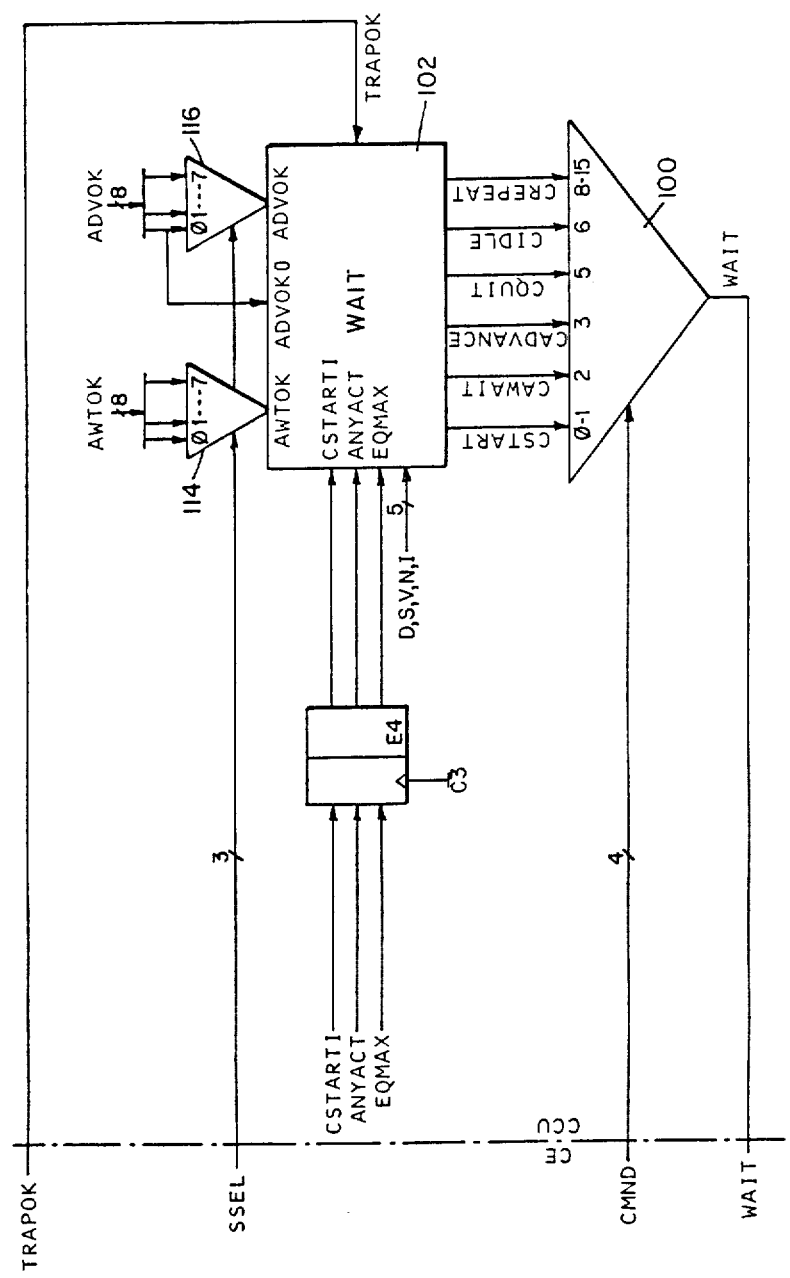

Before the active CE begins this CSTART sequence, it checks to be sure that all other CEs in the complex are in the idle state. The CE establishes the idle status of the other CEs by inspecting the WAIT line, which emanates from multiplexer 100 (FIG. 6). The multiplexer is supplied with a four-bit instruction identifier CMND that indicates which of six instructions for which waiting may be required (CSTART, CWAIT, CADVANCE, CQUIT, CIDLE, CREPEAT) is currently being executed by the CE. The multiplexer uses the CMND signal to place the appropriate output of the WAIT logic array 102 on the WAIT line. The WAIT logic array has an output for each of the six instructions for which waiting may be required; each output is asserted whenever, based on several inputs, the WAIT logic array determines that the CE should delay further processing if it encounters the instruction. In the case of CSTART, a wait condition is imposed unless the ANYACT signal goes low, indicating that no other CEs in the complex are active. ANYACT is asserted by RIDLE logic array 90 if any active line ACT, other than the CCU's own ACT line, is asserted. An active line is asserted whenever a CE is not detached and not executing the CIDLE instruction. (The wait condition is also not imposed if the DETACHED or NESTED status bits are set, as in either case the loop following the CSTART instruction will not be executed concurrently.)

2. Loading Registers

After the wait condition imposed on executing CSTART is lifted, the CE's microcode begins a multicycle sequence of instructions to the CCU. Its first step is to write the global stack pointer (GSP, contained in a CE register) into the CGSP register (FIG. 9) of all CCUs in the complex (i.e., GSP is "globally" written into the CGSP registers). That is accomplished by the CE placing the contents of the A7 register on the PIBUS (FIG. 8), asserting the write line WR (FIG. 7), and placing the appropriate four-bit code on the RSEL lines. The RSEL and WR lines are fed to DECODER logic array 124 (FIG. 7), causing two events to occur: (1) CWRO is asserted, connecting the PIBUS to the CCUBUS, so that GSP is available at all CCUs in the complex; and (2) the code for the CGSP register is asserted on the SEL lines, instructing all the CCUs to read the contents of the CCUBUS into their CGSP registers. The SEL code together with assertion of CWRO cause each CCU's CONTROL logic array to assert LDGSP, which, in turn, causes the CGSP register to read from the CCUBUS. The CCUBUS, rather than the PIBUS, is read into the CGSP register, because the RESTORE signal controlling multiplexer 120 (FIG. 9) is low (RESTORE is high during a state restore operation, when the saved state is read back into the local registers using the PIBUS).

A similar procedure is followed to store GPC, GFP, and MAX in the CGPC, CGFP, and CMAX registers, respectively, of all CCUs in the complex. (The last step, storing MAX, is not performed if it is a CVECTOR or CVECTORST that has been executed, because in those cases, only one iteration is performed by each processor in the complex.)

3. Clearing Synchronization and Iteration-Assignment Registers

Figure 7:
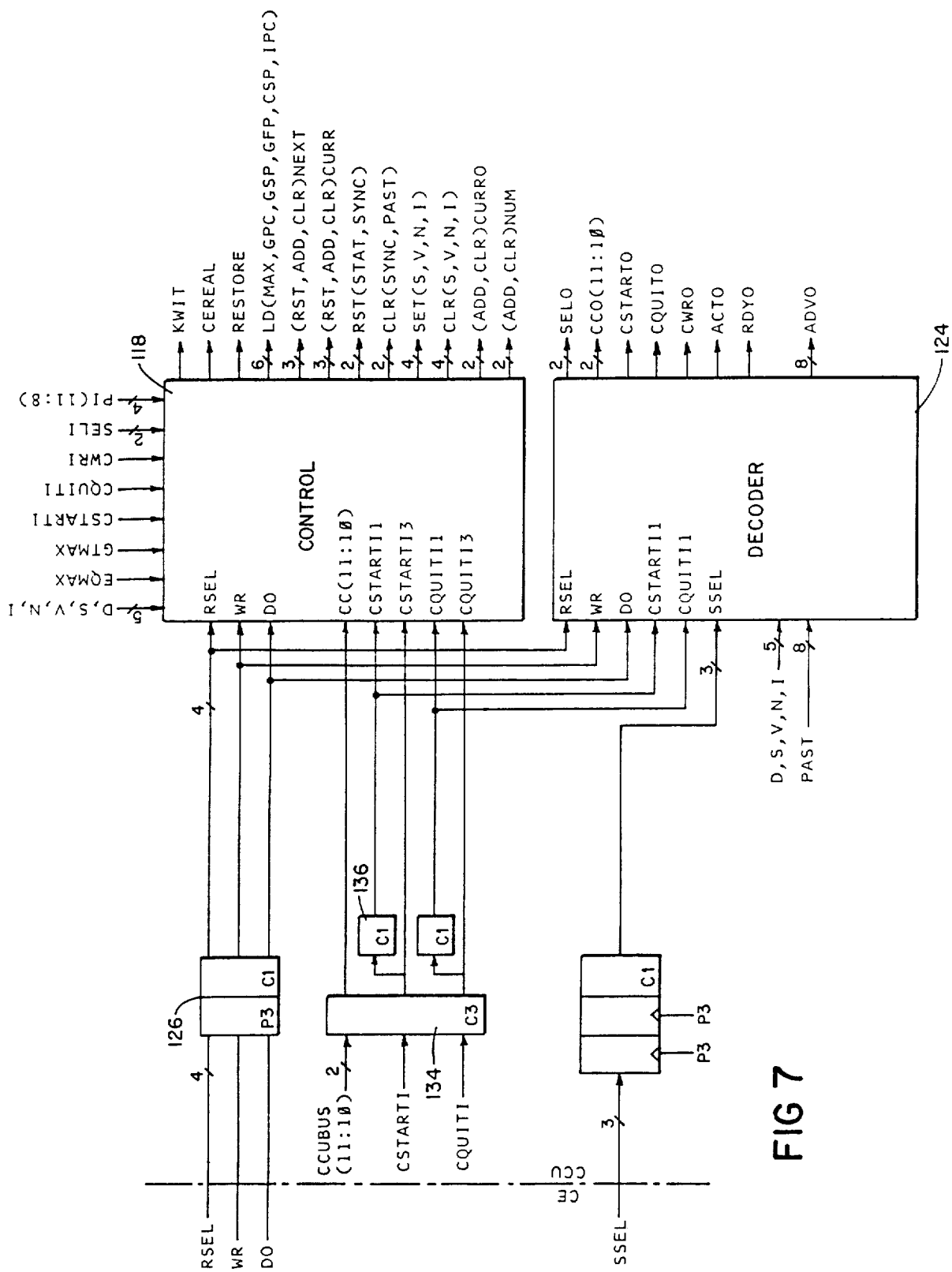
Figure 8:
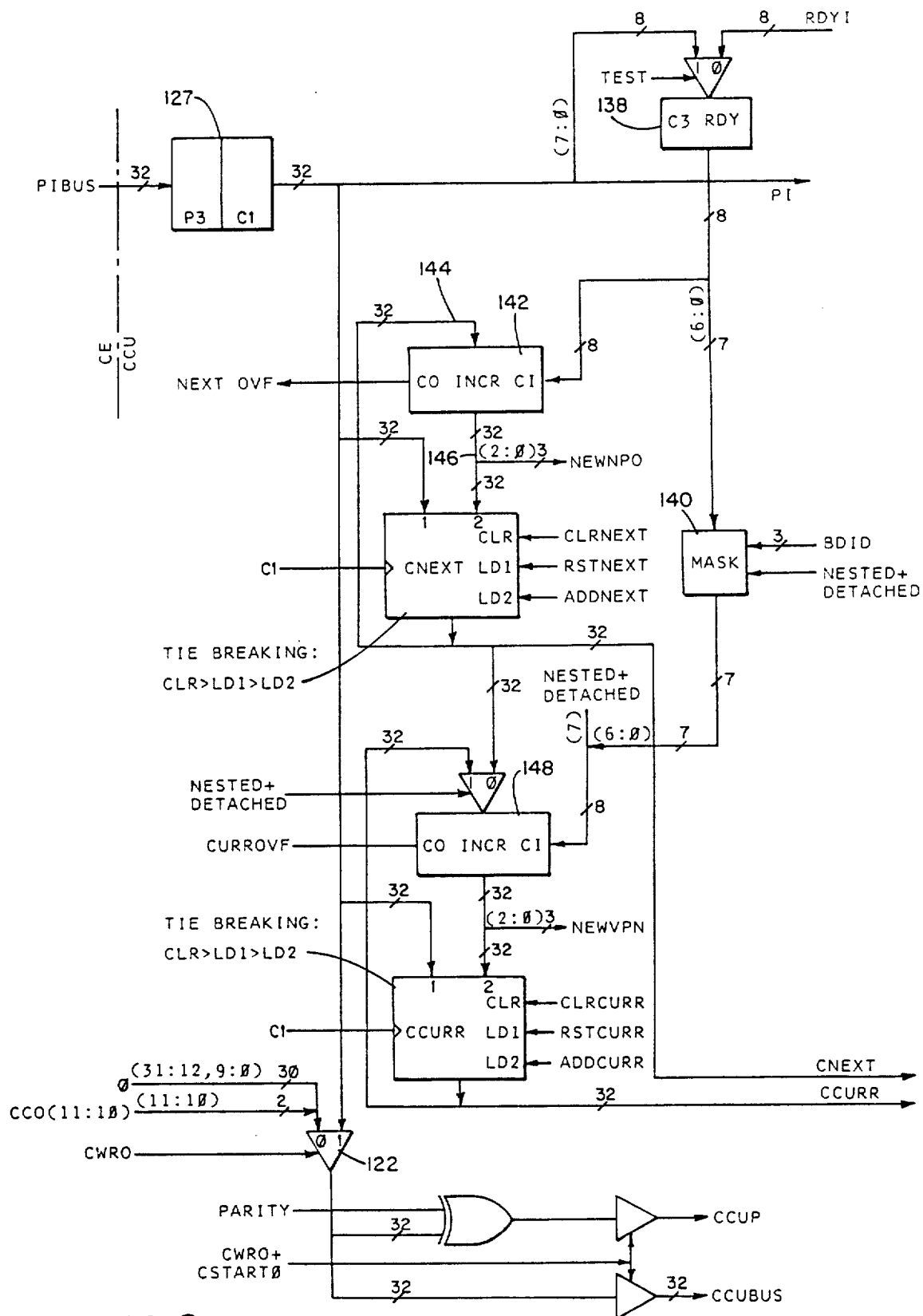

A further action taken upon execution of a CSTART (or CSTARTST, CVECTOR, CVECTORST) instruction is clearing the synchronization registers CS0 to CS7, the current iteration register CCURR, and the next iteration register CNEXT, in all CCUs in the complex. The CE executing the CSTART asserts a DO CSTART instruction to its CCU, by asserting DO and placing the code for CSTART on the RSEL lines (FIG. 7). The DECODER logic array responds by asserting CSTART0 on the CSTART line of the CCU bus. The CONTROL logic arrays in each CCU in the complex respond by asserting CLRSYNC, CLRPAST, CLRCURR, and CLRNEXT, which, in turn, cause the corresponding registers to be cleared. CSTARTI, CSTARTI1, and CSTARTI3 (the latter two being delayed versions of CSTARTI) cause the CONTROL and DECODER logic arrays to assert the various signals required during the CSTART sequence.

4. Waking Up Other CEs

In the same cycle as these clearing operations are performed, SETINLOOP is asserted by the CONTROL logic array (FIG. 7) in each CCU in the complex. SETINLOOP causes the INLOOP status bits of the CSTAT register in each CCU in the complex to be set. That, in turn, causes the other CEs in the complex, all of which are constantly inspecting the INLOOP bit, to wake up and to begin their portion of the CSTART sequence.

5. Assigning Iterations

In the machine cycle following the register clearing operations, the CCUs assign iterations for their CEs to execute following completion of the CSTART sequence. CSTART0 asserted on the CSTART line of the CCU bus causes CSTARTI1 to be asserted in each CCU in the complex in the following cycle (CSTARTI, the signal read from the CSTART line, is delayed one cycle by latches 134, 136, and emerges as CSTARTI1). The DECODER logic array 124 in each CCU in the complex responds to the assertion of CSTARTI1 by asserting RDY0, which is tied to that CCU's RDY line, one of the eight on the CCU bus. As there is a one-to-one correspondence between an asserted ready line and a CCU bidding for an iteration, the total number of CEs bidding for an iteration, or what is the same thing, the number of CEs in the complex, is simply the total number of asserted ready lines. That total is generated by incrementer 142; it totals the number of asserted lines, increments the 32-bit contents of line 144 by the total number of lines, and places the sum on line 146. The CNEXT register was cleared in the prior cycle so that the input line 144 to the incrementer is zero, meaning that its output on line 146 is simply the total number of CEs in the complex. Accordingly, the first three bits of the output are channeled off as NEWNPO (new NUM plus one) and loaded (after being decremented by 1) into the NUM field of the CSTAT register (ADDNUM having been asserted by the CONTROL logic array). The output of incrementer 142 also represents the number of the next iteration to be processed by the first CE to complete the first iteration assigned to it, and thus it is loaded into the CNEXT register via port 2 (ADDNEXT having been asserted by the CONTROL logic array).

Iteration assignment is also achieved using the ready lines. MASK logic array 140 screens the ready lines, using BDID, the CCU's physical address, and zeroes its own ready line and any lines corresponding to a physical address higher than its own (as RDY7, the highest ready line, would always be masked, it is not supplied to the MASK logic array). The total number of asserted ready lines emerging from MASK is the number of the iteration assigned to that CCU (iteration numbering begins with zero). For example, if three CCUs are in the complex, and one inspects the CCU with the highest physical address, one would find that the number of asserted ready lines emerging from MASK is two, which is the highest iteration to be initially assigned. The CCU with the next highest physical address will have one asserted ready line emerge from MASK, and be assigned iteration 1. The third, and final, CCU will have zero asserted ready lines emerge from MASK, and be assigned iteration 0.

The manner in which this number of emerging asserted ready lines is translated into an iteration assignment is as follows. Incrementer 148 adds the number of asserted ready lines emerging from MASK to the previous contents of the CNEXT register (i.e., before it was incremented by the total number of asserted ready lines), and the sum is loaded into the CCURR register via port 2 (ADDCURR having been asserted by the CONTROL logic array). The CCURR register, therefore, receives the value of the current iteration to be processed by its CE.

6. Reading Registers

The final set of operations performed during the CSTART sequence is reading from the CCUs the contents of certain registers whose value was determined earlier in the CSTART sequence. The initiating CE reads the cactus stack pointer (CSP) from the CCSP register and the current iteration from the CCURR register. The other CEs in the complex read those two registers, and also the CGFP and CGPC registers. The contents of the CGFP and CCSP registers are required in order that every CE in the complex have the necessary state information to begin concurrent processing. The GFP is used to access global variables during loop execution. The contents of the CGPC register is read by the other CEs in order that they have the program counter value needed for resumption of serial processing. GPC is the address of the instruction at the top of the concurrent loop (i.e., immediately after the CSTART instruction). Reading registers from the CCU is accomplished by the CE asserting the output enable line OE and the RSEL code corresponding to the desired register.

Following those register read operations, the CEs in the complex begin execution of the instructions within the concurrent loop. As they are all executing the same instructions, the CEs execute the initial instructions of the loop roughly in phase with one another, although the initiating CE may get slightly ahead of the others because of the higher probability that the others will suffer cache misses (e.g., instruction cache misses arising because the other CEs' were in the idle state). The phase relationship of the CEs changes substantially, however, when the first CAWAIT instruction is encountered (see synchronization discussion below).

7. Timing

The timing of the actions taking place following CSTART is shown graphically in FIG. 13. The notational scheme can be explained using examples. WRCGSP in the first machine cycle means that the initiating CE (the one executing the CSTART) has asserted the global write into the CGSP registers. The indication [GSP] in the third machine cycle indicates that the stack pointer has become valid for the first time in that cycle (they were loaded at the third quarter of the previous cycle, in which LDGSP was asserted). Similarly, the indication [INLOOP] in the fourth cycle indicates that the 1 loaded into the INLOOP bit of the status register in the third cycle upon assertion of SETINLOOP has become valid.

It can be seen that the DO CSTART instruction is asserted in the second machine cycle, after just one of the four write operations has begun. This timing permits the multi-cycle operations following DO CSTART to occur in parallel with the write operations.

G. Relative Delay Between CE and CCU

Delay latches 126, 127 delay execution of instructions given the CCU by the CE. The first half of the latch is clocked by the CE's P3 clock, high during the third quarter of the CE's cycle. The second half of the latch is clocked by the CCU's C1 clock, high during the first quarter of the CCU's cycle. The result is a variable delay of either one or one-half machine cycle, depending on the relative phase of the CE and CCU. The CCUs are always in phase with one another, as they are all driven by the same clock. The CEs, on the other hand, though driven by clocks synchronized with the CCU clock, can (as the result, for example, of cache misses) become one-half cycle out of phase with respect to the CCUs and other CEs. There is a full cycle of delay through latches 126, 127 when a CE and its CCU are in phase, and one-half cycle of delay when the devices are out of phase.

To make the difference in relative phase of the CCU and CE transparent to the CE, so that the delay between assertion of a signal by the CE and response by the CCU always appears the same, an additional variable delay of either zero or one-half cycle is added to some of the signals sent back to the CE. The 32-bit lines carrying the contents of four of the ten CCU registers to multiplexer 130 are delayed in this manner. These four (CCURR, CNEXT, CS0-CS7, and CSTAT) are edge triggered by CCU clock C1 and their outputs pass though a latch clocked by P1 before reaching the multiplexer, resulting in the multiplexer output on the PIBUS being delayed by an additional one-half cycle when the CE and CCU clocks are out of phase. The remaining six registers are loaded at CCU clock C3, and reach the multiplexer with a delay that is variable by one-half cycle. This variation is accomodated by the CE waiting the worst case delay at all times.

H. Assigning New Iterations

When a CE executing a concurrent loop reaches the CREPEAT instruction, which is placed after the last instruction within the loop, two actions are taken: (1) the displacement specified in the instruction is added to the program counter (this is done wholly within the CE) and (2) a new iteration is assigned using the ready lines RDY and CCURR and CNEXT registers.

The iteration assignment procedure is initiated by the CE asserting the DO CREPEAT instruction using its RSEL and DO lines (FIG. 7). That CE's own CCU responds by asserting its own ready line RDY. Other CEs simultaneously executing a CREPEAT instruction may also assert their own RDY line. The total number of asserted ready lines is used to update the CNEXT and CCURR registers in the same manner as described for the CSTART instruction. ADDNEXT is always asserted during concurrent execution to cause the contents of CNEXT to be incremented by the number of RDY lines asserted (even at times when a CCU is not asserting its own ready line). MASK zeroes all ready lines except those of CCUs of lower physical number than itself. CCURR is set equal to the prior contents of CNEXT plus the number of RDY lines emerging from MASK. In the case of a single RDY line being asserted, CNEXT is incremented by one, and CCURR is set equal to CNEXT.

To obtain the newly assigned iteration, the CE asserts a READ CCURR instruction by asserting the read line OE (FIG. 9) and placing the code for CCURR on its RSEL lines. That causes the contents of CCURR to pass through multiplexer 130, and be placed onto the PIBUS. The CE then begins execution of the new iteration of the concurrent loop.

Figure 9:
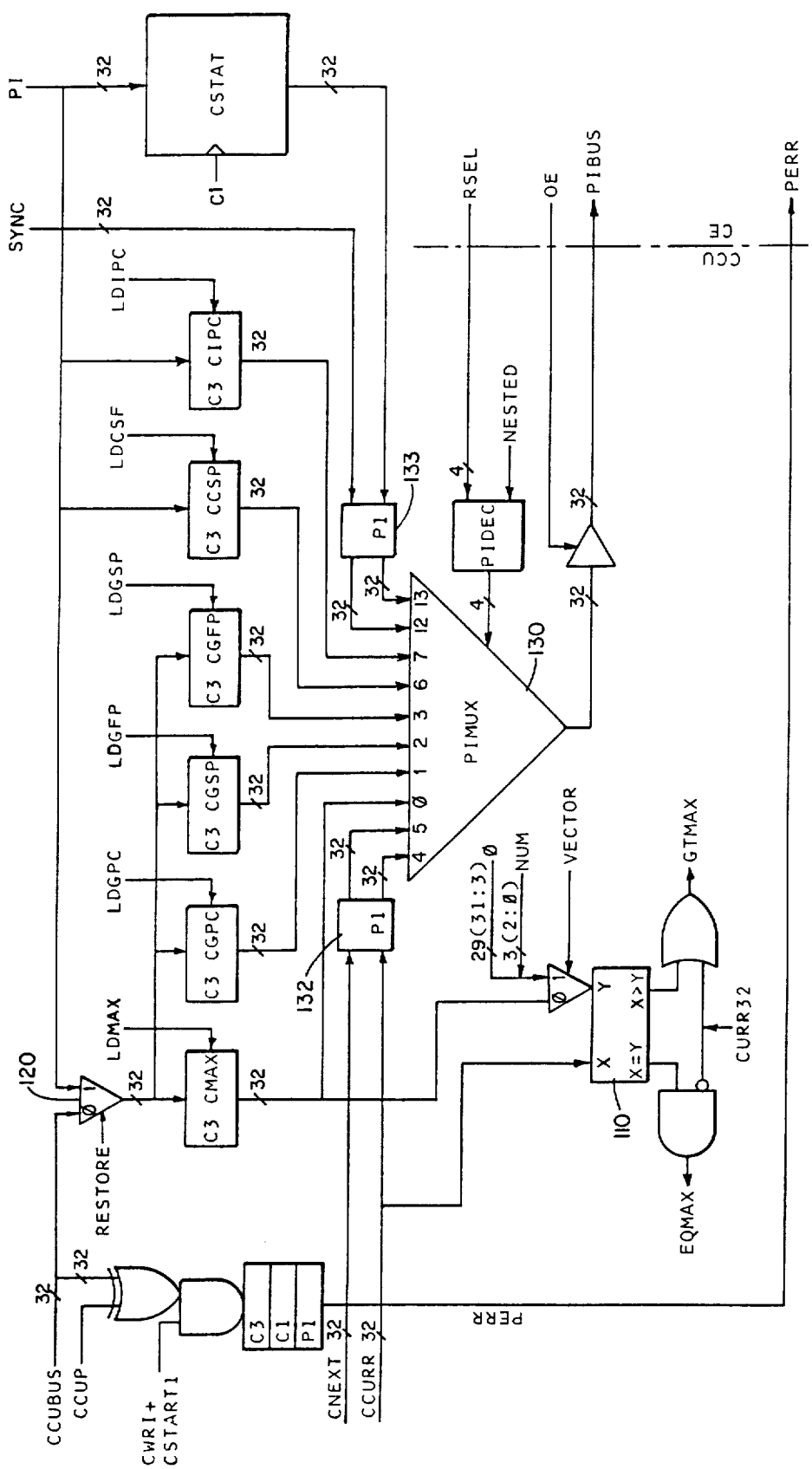

Although the CE has begun execution of a new iteration, it will be brought to a halt if the CCU determines shortly thereafter that the new iteration exceeds the maximum iteration stored in the CMAX register. The contents of CCURR are compared to the contents of CMAX at comparator 110 (FIG. 9). If the maximum iteration has been exceeded, GTMAX is asserted, causing CONTROL logic array 118 (FIG. 7) to assert KWIT and, in turn, latch 112 (FIG. 11A) in the CSTAT register to assert QUIT. The CE, constantly checking for the occurence of QUIT, responds to its assertion by going idle (it reads the contents of the CIPC register from its CCU, and places the contents in its program counter).

The same comparison of CCURR to CMAX also establishes whether the new iteration is the last iteration; if it is, actions are taken to cause the CE assigned the new iteration to be the one to continue serial processing when it again reaches CREPEAT. Comparator 110 asserts EQMAX if CCURR equals CMAX. Assertion of EQMAX will cause CONTROL logic array 118 (FIG. 7) to assert CLRINLOOP the next time that a DO CREPEAT instruction is received from the CE. EQMAX asserts CEREAL, which causes SERIAL to be asserted, preventing the CE from branching back on the next CREPEAT.

The CURR32 input to the gates generating EQMAX and GTMAX is needed in the event that the number of iterations stored in CCURR exceeds its maximum capacity of $2^{32}$ (approximately 4 billion) of the register. In that event, CURROVF (FIG. 8) is asserted by incrementer 148 and the CURR32 bit of the CSTAT register is set to 1 (FIG. 11A). When CURR32 is 1, GTMAX is set to 1 and EQMAX to 0. That immediately halts concurrent processing of the affected CE. To avoid this result, it may be preferable to adapt the software running on the system to assure that the number of iterations of a concurrently executed loop does not exceed the capacity of the 32-bit CCURR register.

I. Synchronizing Dependencies

The presence, within a concurrently executed loop, of an instruction that cannot properly be executed until another instruction (often the same instruction) is executed in a prior iteration creates what is called a dependency, and execution of the first instruction must be synchronized with execution of the second instruction in the prior iteration. Synchronization is accomplished using two instructions, CAWAIT and CADVANCE. A CAWAIT instruction is placed before the first instruction, and a CADVANCE after the second instruction. In the event that the same instruction is both the first and second instruction, the CAWAIT is placed before the instruction, and the CADVANCE is placed after it. Each pair of CAWAIT and CADVANCE instructions is ordinarily keyed to one of the eight synchronization registers CS0 to CS7. The fact that there are only eight synchronization registers does not, however, limit the number of dependencies that can be handled. If more than eight dependencies are present in the same iterative construct, groups of dependencies may be bracketed by pairs of CAWAIT and CADVANCE instructions, each group thereby being handled by a single synchronization register.

1. The CAWAIT Instruction

The CAWAIT instruction has two arguments: the number (SSEL) of the synchronization register (CS1–CS7) assigned to this dependency and the offset (OFFS) from the current iteration to the prior iteration (an offset of zero means the immediately prior iteration). Execution of a CAWAIT causes the CE to delay further processing until the WAIT output of the CCU's WAIT logic array goes low (FIG. 6). The CE places the number of the synchronization register specified in the AWAIT instruction on the SSEL lines. That selects the corresponding AWTOK line at multiplexer 114. When the AWTOK line is asserted during execution of the CAWAIT instruction, WAIT array 102 and multiplexer 100 (selecting the CAWAIT line in response to recognition of the code for CAWAIT on the CMND lines) cause the WAIT line to go low, allowing the CE to process the instruction following the CAWAIT instruction.

Figure 10:
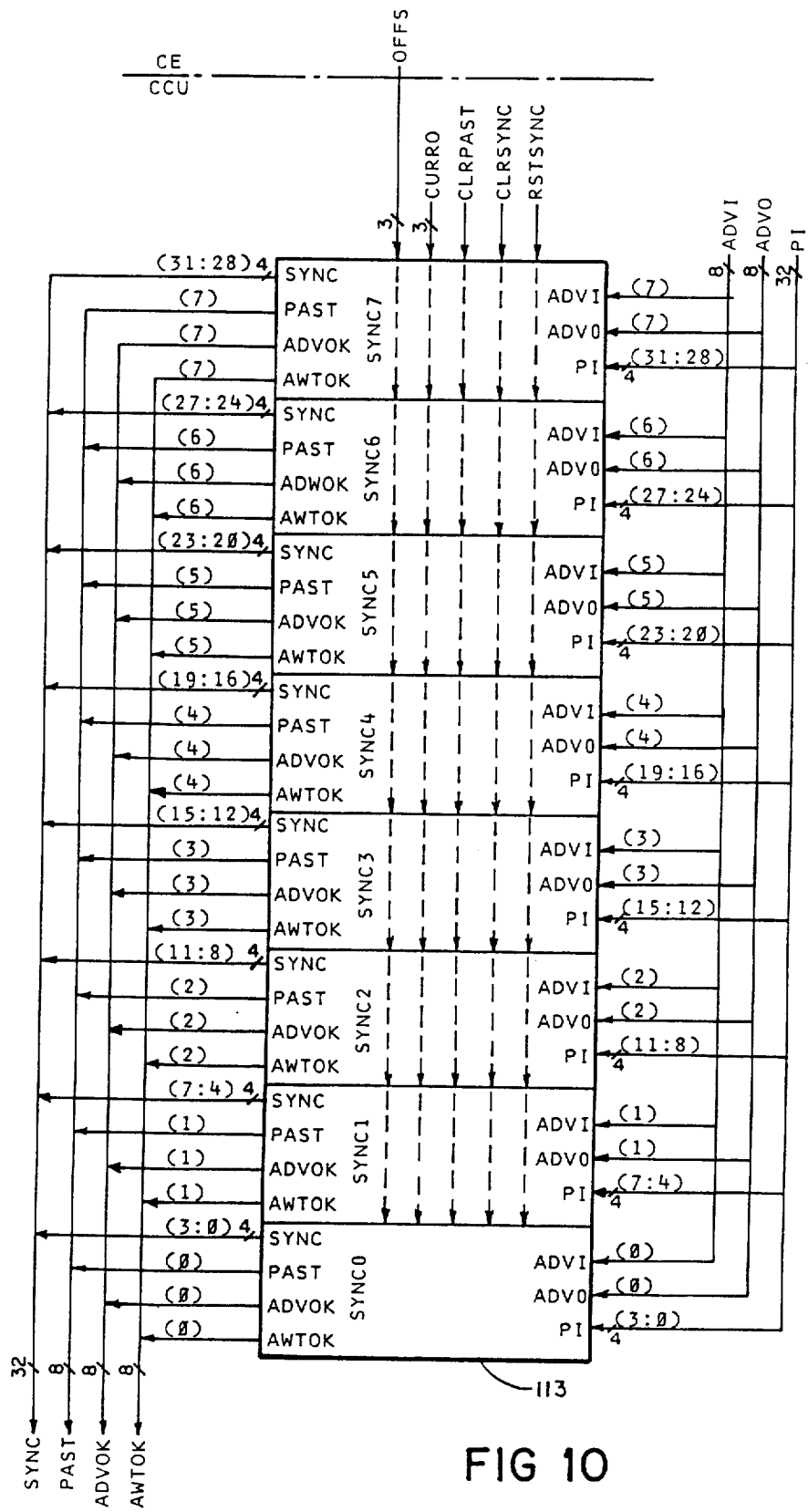

The AWTOK lines are controlled by synchronization registers CS0–CS7 (FIGS. 10, 12). An AWTOK line (the assertion of which acts as a go-ahead signal to a CE executing an AWAIT instruction) is asserted when its respective synchronization register is advanced to a number representing the prior iteration in which the second instruction (see above) is to have been executed. Specifically, the AWTOK is asserted when the first three bits of its synchronization register, the contents of 3-bit register SYNC in FIG. 12, is equal to (or greater than) the least significant three bits of the current iteration, the CURRO field of the status register, reduced by the offset OFFS plus 1. Set forth as an equation, AWTOK is asserted when $$SYNC \geq CURRO - OFFS.$$

This test is carried out by forming the difference CURRO−SYNC using circuit 106, and comparing the output of that circuit to the offset OFFS at comparator 108.

Circuit 106 actually forms the expression $$CURRO - SYNC + C - 1$$

The "C−1" term in the expression is there as the result of supplying an inverted copy of the ADVI signal to the comparator, in order to save a machine cycle of time in this synchronization procedure. The ADVI input, which is asserted as a consequence of execution of the CADVANCE instruction (see discussion below), increments the SYNC register, but the incremented value is not available until the machine cycle following assertion of ADVI. To make the effect of ADVI felt in the same cycle it is asserted, it is supplied through an inverter to circuit 106. In that cycle, C equals 0, and the output F of the circuit is thereby set to $$CURRO - (SYNC + 1).$$

which is the value it will have after SYNC is incremented. In the next cycle when ADVI will be low (making C equal to 1) and SYNC will have already been incremented by 1, the same output will be produced.

2. The Four-Bit Size of the Synchronization Registers

Even though iterations as high as $2^{32}$ are permitted, it is possible to limit the size of each synchronization register to four bits, a three bit SYNC register and a single bit PAST register. The reason this is possible is that the CEs are never more than seven iterations away from one another. This is because of the ADVANCE instruction's built-in await, which causes a CE to wait until the immediately prior iteration has executed its CADVANCE (see discussion below). Accordingly, only three bits are needed to keep track of how far the current iteration is from the prior iteration responsible for the dependency. These three bits are stored in the SYNC register (FIG. 12). The three bits can be thought of as the least three significant bits of a virtual 32-bit synchronization register containing the number of the lowest iteration to have not executed its CADVANCE. Put another way, it is the least three significant bits of the iteration that has not yet cleared the dependent region (for once an iteration executes its CADVANCE no later iteration is dependent on it).

The single bit PAST register is provided to keep track of whether the SYNC register has been advanced past the current iteration CURRO. If that occurs, PAST is locally set to 1. PAST is actually set to 1 when the ADVANCE instruction is executed by its associated CE. PAST is cleared at the end of the iteration, when CREPEAT is executed. Unlike the 3-bit SYNC registers, which are simultaneously altered in all CCUs so as to be identical across the concurrency complex, the PAST bit is set locally.

3. The CADVANCE Instruction

The other synchronization instruction, CADVANCE, is responsible for incrementing the synchronization register. CADVANCE has one argument, the synchronization register to be advanced. When a CE executes a CADVANCE, it initially waits until its CCU determines that the immediately preceding iteration has executed its CADVANCE. Then it causes the specified synchronization register to be advanced by one.

The CADVANCE instruction has what amounts to a built-in CAWAIT with zero offset; it causes the CE to wait until the CADVANCE instruction has been executed in the immediately preceding iteration. This is accomplished using the ADVOK lines. The synchronization register specified in the CADVANCE instruction is placed on the SSEL lines, thereby selecting the corresponding ADVOK line at multiplexer 116 (ADVOK0 also bypassed the multiplexer because of its use in serializing traps; see discussion below). When the selected ADVOK line is asserted, the effect is to set the WAIT line to low, signalling the CE to resume processing. The ADVOK line is asserted when comparator 108 (FIG. 12) senses its B input is zero, an event that occurs when SYNC=CURRO (i.e., when the synchronization register has been incremented to this iteration).

After the WAIT line goes low, the CE asserts the DO CADVANCE instruction using the DO and RSEL lines. The DECODER logic array responds by asserting ADVO on the ADV line for the specified synchronization register (there are eight ADV lines, one for each register). The ADVO assertion has a local effect and a global effect. Locally, the assertion of ADVO sets PAST to 1 (because the fact that CADVANCE has been executed means that the synchronization register has been incremented past the current outermost iteration number). Globally, the asserted ADVO line is received as ADVI, and causes the respective SYNC register to be incremented by one in all CCUs in the complex. It is possible to provide just eight ADV lines because only one CE can possibly assert any one ADV line during the same cycle.

The fact that CADVANCE sets the PAST bit to 1 assures that further CAWAIT and CADVANCE instructions for the same dependency encountered in the same iteration will be ignored (branching within a concurrent loop may make such further occurrences possible). To accomplish this, all eight PAST bits are brought to the DECODER logic array where the DO CADVANCE instruction is decoded. If the PAST bit for the dependency specified in the CADVANCE instruction is set to 1, ADVO is not asserted. Also, the fact that PAST is set to 1 means the WAIT line is immediately set to low when either a CAWAIT or CADVANCE is encountered, because both the AWTOK and ADVOK lines are automatically asserted by OR gates 109, 111 (FIG. 12).

J. Concluding Concurrent Processing

Concurrent processing is concluded by execution of one of two instructions: CREPEAT or CQUIT.

1. Executing CREPEAT in the Last Iteration

As discussed previously, execution of CREPEAT will conclude concurrent processing if the iteration being processed is the maximum iteration (CURR equals MAX), as in that event EQMAX will have been asserted at the start of the iteration. Assertion of EQMAX has the immediate effect, even before the conclusion of that iteration, of asserting SERIAL (CEREAL is asserted by the CONTROL logic, causing latch 112 in the CSTAT register (FIG. 11A) to assert SERIAL). The assertion of SERIAL gives the CE advance warning that concurrent processing will end with the next CREPEAT. The CE executing CREPEAT is made to wait by the WAIT logic array until the rest of the CEs have put themselves into the idle state (by fetching iteration numbers that exceed the contents of CMAX). The WAIT logic array senses the idle state of the other CEs by looking at the ANYACT line. When the CREPEAT is actually executed, the assertion of the DO CREPEAT instruction by the CE concludes concurrent processing in this CE. The CONTROL logic array, sensing both EQMAX and DO CREPEAT, asserts CLRINLOOP, CLRVECTOR, and CLRSERTRAP, thereby clearing the INLOOP, VECTOR, and SERTRAP status bits.

2. Executing CQUIT

When a loop includes an instruction to branch out of the loop prior to completion of the prescribed number of iterations, a CQUIT instruction is inserted at the address to which the code may branch. A premature branch from a loop creates a potential problem for concurrently executed loops, because it is possible that the branch may be taken in an iteration preceding iterations for which instructions have already been executed by other CEs. As these further iterations would never have been processed if processing had been serial, there is the possibility that concurrent processing will change the result. There are at least three ways that such a change of result could occur: (1) data is stored into global memory in the subequent iterations changing the result of an operation outside the loop; (2) a subsequent iteration is first to execute a CQUIT; and (3) a trap is taken in the subsequent iterations (e.g., a divide by zero that would not have occurred had processing been serial).

Preventing the first potential difficulty—store operations that should not have occurred—must be handled by the software. One approach is to use the cactus stack for all store operations until there remains no possibility of a CQUIT being executed in a prior iteration, and to then transfer the private copies from the cactus stack to global memory.

The second difficulty—out of order CQUITS—is handled using the CAWAIT instruction. A zero offset CAWAIT on the CS0 synchronization register is inserted just before the CQUIT instruction (the branch from the loop is made to the CAWAIT). Also, the CSTARTST instruction (CSTART with serialized traps) is used instead of the CSTART instruction (and the CVECTORST instead of the CVECTOR), to cause automatic incrementing of the CS0 register by the CREPEAT instruction. These steps ensure that CQUITS are executed in order.

The third difficulty—unintended traps—is handled also by using the CSTARTST or CVECTORST instructions (instead of the CSTART or CEVECTOR) instructions. These instructions differ from the others only in that they cause the SERTRAP status bit to be set during the CSTART sequence. When the SERTRAP bit is set, a CE encountering a trap waits before proceeding further until TRAPOK is asserted, telling it that the trap may be taken because no lower iteration capable of branching out of the loop is still executing.

TRAPOK is controlled by synchronization register CS0. If the iteration contained in CS0 equals the current iteration CURRO, a condition measured by comparators 106, 108 (FIG. 12), ADVOK0 is asserted. Register CS0 is advanced by CREPEAT (the very last instruction in a loop) if SERTRAP is 1, and thus the register contains the three least significant bits of the lowest iteration to have been completed. ADVOK0 is fed directly into WAIT logic array 102 (FIG. 6), which responds by asserting TRAPOK. TRAPOK is also asserted by WAIT if SERTRAP is zero, as that means trap serialization has not been specified. (TRAPOK is also asserted if DETACHED is set to 1, as that means there is no concurrent processing.)

K. Vector Concurrent Processing

The CEs in the concurrency complex can be used not only for concurrently processing iterative constructs such as DO loops but also for concurrently processing portions of a vector operation. For example, if a vector multiply operation is required, and the vector length is 100, a concurrency complex of three CEs (e.g., CE0, CE1, CE2) can divide the vector so that two CEs perform 34 of the vector operations and the third CE performs 32 of the operations. All of the operations performed by each CE are done in a single "iteration". The division of the vector between CEs can be done vertically or horizontally. In a vertical division, the first 34 vector elements of the example are processed by the first CE, the next 34 by the second CE, and the final 32 by the third CE. In a horizontal division, the first CE performs operations on vector elements 1, 4, 7, and so on; the second CE, on elements 2, 5, 8, and so on; the third CE, on elements 3, 6, 9, and so on. Which type of division is best is a software matter, and is typically determined by a compiler.

Five vector concurrency instructions are used by the CEs to calculate the parameters needed for the CEs to perform the concurrent processing of a vector operation. The parameters are calculated by each CE using the NUM and VPN fields provided by its CCU, and then stored in a CE data register. In the calculations, the CE sets NUM and VPN to zero if either NESTED or DETACHED is asserted by the CCU.

In a horizontal division of the vector, three parameters are calculated: length, offset, and increment.

Length is the number of vector elements to be operated on by each CE. It is calculated using the VLH instruction, according to the formula:

Length=CEIL[(N−VPN)/(NUM+1)]

where N is the total number of vector elements and CEIL means that the result is rounded up to the next highest integer if not already an integer (VPN and NUM are set to zero in the calculation if NESTED or DETACHED are 1). In the example, CE0 is given a length of 34, and CE1 and CE2 are given lengths of 33. (In the actual implemenation, the calculation is done as follows: VPN is subtracted from N and one of two operations are performed. If NUM is 0, 1, 3, or 7 (meaning the number of CEs is a power of two), NUM is added to (N−VPN) and the result is shifted right by 0, 1, 2, 3 bits (according to the power of two). If NUM is 2, 4, 5, or 6, the (N−VPN) term is multiplied by ⅜, 2/5, 2/6 or 2/7, respectively (where each fraction is rounded toward zero before use), the result is shifted right one bit, the fraction is truncated, and 1 is added to the result.)

Increment is the spacing or stride between the vector elements to be operated on by the CE. It is calculated using the VIH instruction, according to the formula:

Increment=VINCR(NUM+1)

where VINCR is the increment of the original vector. In the example, where VINCR is 1, all CEs are given an increment of 3. (In the actual implementation, the multiplication is done by shifting and adding.)

Offset is the location in the vector where the CE is to begin. It is aalculated using the VOH instruction, according to the formula:

Offset=VINCR(VPN)

where VINCR is the increment of the original vector. In the example, CE0 is given an offset of 0, CE1 an offset of 1, and CE2 an offset of 2. (In the actual implementation, the multiplication is done by shifting and adding.)

When the vector division is vertical, only the first two of these three parameters need be calculated, as increment is one for all CEs.

Length is calculated using the VLV instruction, according to the formula:

Length=MIN[CEIL[N/(NUM+1)],
N−VPN(CEIL[N/(NUM+1)]]

where CEIL is the same function described above and MIN is the minimum of the two parameters within the brackets. In the example, CE0 and CE1 are given lengths of 34, and CE2 a length of 32. (In the actual implementation, the CEIL[N/(NUM+1)]term is formed using the same methods used for the combined division-and-CEIL operation in the VLH instruction. The multiplication by VPN is done by shifting and adding. The minimum is found by comparing the two quantities, and choosing the smaller of the two.)

Offset is calculated using the VOV instruction, according to the formula:

Offset=CEIL[N/(NUM+1)](VPN)

In the example, CE0 is given an offset of 0, CE1 an offset of 34, and CE2 an offset of 68. (In the actual implementation, the calculation is performed using the same method as for the second term of the VLV equation.

Actual concurrent processing is begun when a CVECTOR (or CVECTORST) instruction is executed at the start of the vector "loop", i.e., before the first of the vector operations to be processed concurrently. The parameter calculation instructions (e.g., VLH, VOH, VIH) follow the CVECTOR instruction.

The sequence of CCU instructions initiated by a CVECTOR instruction is largely identical to that initiated by a CSTART. The difference is that the VECTOR status bit is set to 1 in all CCUs in the complex during the third machine cycle, at the same time as INLOOP is set to 1. The fact that it is a CVECTOR instruction, rather than a CSTAR, is communicated to the other CEs using two bits of the CCUBUS, referred to as CC(ll:l0). These two bits provide a code that the CCUs use to distinguish between th four types of instructions that initiate concurrent processing (CSTART, CSTARTST, CVECTOR, and CVECTORST). The two bits are only used during the DO CSTART instruction in the second machine cycle, a time when the CCUBUS is not being used.

Vector concurrent processing is concluded using a CREPEAT instruction following the last vector operation in the "loop". As there is only one "iteration" following a CVECTOR instruction, a mechanism is needed to force an end to concurrent processing upon execution of the first CREPEAT. This is provided by multiplexer 105 (FIG. 9), which supplies to the Y input of comparator 110 a 32-bit number containing all zeroes except for NUM in the least three significant bits (this instead of the contents of CMAX, as in the CSTART case). This causes the gate following comparator 110 to assert GTMAX at the start of the second "iteration", thereby setting INLOOP to 0 to prevent continued execution of that second "iteration". CCURR is set to a number in excess of NUM by assertion of the RDY lines following completion of the first "iteration".

L. Nested Concurrent Loops

The system accommodates subroutine calls within concurrently-executed loops, including subroutines that themselves call for concurrent execution of a loop. The latter occurs because subroutines can be com iled independently of the program calling them, making it impossible to know at compile time whether a particular subroutine will be called from within a concurrently-executed loop.

A concurrent loop within another concurrent loop is known as a nested concurrent loop, and is not executed concurrently. Provision is made for executing nested loops serially on the same processor that encounters them. It is possible to have a series of nested loops, each within the other. In all cases, however, only the outermost loop is executed concurrently. All inner loops, whether or not they contain instructions for concurrent execution, are executed serially on the same processor.

The NESTED and INLOOP status bits are used to keep track of whether it is the outermost or a nested concurrent loop that is being executed. INLOOP is set to "1" when the first CSTART is encountered during execution, signifying the start of an outermost concurrent loop. NESTED is set to "1" when a CNEST is encountered after INLOOP has already been set to "1".

At the beginning of a nested loop, the CCU clears the the current iteration register (CCURR). Subsequent iterations of the nested loop are assigned by adding 1 to the value of CCURR at the end of each iteration (assertion of the NESTED status bit alters the operation of the logic incrementing CCURR).

In order that trap serialization (see earlier discussion) may continue even during execution of a nested loop, the least three significant bits of the current iteration of the outermost loop are saved as CURRO in the CSTAT register (when NESTED is asserted, CURRO is frozen at the value it had during the last iteration of the outermost loop; ADDCURRO is not asserted by the CONTROL logic array upon execution of a CREPEAT in a nested loop). The three bits of CURRO are compared to the contents of synchronization register CS0, and TRAPOK is asserted, all in the same manner as if the processor were executing an outermost concurrent loop. Thus, if a trap is encountered during execution of a nest loop, and the SERTRAP bit is set, indicating serialization of traps, the CE waits until TRAPOK is asserted.

The values of four registers CCURR, CMAX, CGSP, CSTAT) must be saved at the time a nested concurrent loop begins in order for the CE to properly continue processing at the conclusion of that nested loop. A CNEST instruction causes the four values to be saved (at a memory location specified by the operand), and must be placed before the CSTART of any concurrent loop that could possibly be executed as a nested loop (one CNEST placed before the first CSTART may suffice for a series of such concurrent loops). A CUNNEST instruction causes the four values to be written (from the memory location specified in the operand, ordinarily the same location as specified in the previous CNEST instruction) into the corresponding registers, and must follow the CQUIT or CREPEAT instruction of the nested loop (or the last of a series of nested loops). Ordinarily, different memory locations are specified by each pair of CNEST and CUNNEST instructions, so that loops may be nested within one another.

The values of CCURR and CMAX are saved because those registers will be used during execution of the nested loop, and the values will be needed when processing of the outermost loop resumes.

The value of CGSP is saved for a similar reason. The global stack pointer must be preserved so tat it can be supplied to the CE that resumes serial processing. It is saved prior to execution of a nested loop because the CSTART sequence, which is the same for a nested loop as for an outermost loop, causes the current value of the CE's stack pointer to be written into the CGSP register. In the case of an outermost concurrent loop, that current value of the stack pointer is preserved in the CGSP register, and a private stack is assigned to the CE later in the CSTART sequence (see next section), by having the CE read the value of the CCSP register. But in the case of a nested loop, the current value of the CE's stack pointer does not need to be preserved, and must be given back to the CE, as the nested loop will be processed on the private stack assigned to that CE for the outermost loop. This is accomplished by causing the CE to read from CGSP when NESTED is set, and from CCSP when NESTED is not set (this in the function of the PIDEC logic array shown in FIG. 9).

The contents of the CSTAT register are saved in order to preserve the state of NESTED prior to execution of the nested loop. This is necessary for proper handling of a series of nested loops, each within another. Each time a CUNNEST instruction is executed, signifying the completion of one level of nesting, the prior value of NESTED is restored to the CCU, so that the CCU will be able to determine whether it has returned to the outermost loop (in which case NESTED will be restored to 0) or to a higher level nested loop (in which case NESTED will remain set to 1).

During execution of a nested loop, the value stored in the CNEXT register continues to be updated when other CEs assert their ready lines (which will only occur when a CE bids for a new iteration in an outermost concurrent loop). But the contents of CNEXT are not used during execution of the nested loop, as all iterations of a nested loop are executed by the same CE that initiated the loop. A new iteration assignment is made upon execution of a CREPEAT in the nested loop simply by incrementing the contents of CCURR by one. (This is accomplished as follows: The multiplexer at the input to incrementer 148 (FIG. 8) feeds the output of CCURR, rather than the output of CNEXT, to the incrementer when NESTED is asserted; MASK logic array 140 masks all of the ready lines when NESTED is asserted, so that only one line (the line driven by NESTED itself) is asserted at the input to incrementer 148.)

A further change brought about by setting the NESTED bit is that the VPN and NUM outputs from the CSTAT rgister are set to zero (FIG. 11B), so that the computations made upon execution of the five vector concurrency instructions (e.g., VLH, VOH, VIH) result in vector instructions being executed serially (all vector elements processed on the CE executing the instructions).

M. Cactus Stack

Each CE in the concurrency complex is assigned a private stack (collectively referred to as the cactus stack), for storing data unique to a single iteration of a concurrent loop. Such unique data is of two types: subroutine arguments (and return addresses) and temporary variables. The cactus stack is created during the CSTART sequence. The CE executing the CSTART instruction builds the cactus stack by causing its global stack pointer (GSP) to be written into the CGSP registers of all the CEs in the complex, and by causing all of the same CEs to read from their CCUs a virtual stack pointer (CVSP), which in the case of an outermost concurrent loop (NESTED not set) is the contents of the cactus stack register CCSP. The actual addresses assigned as cactus stack pointers are unique to each CE, and are established by the operating system, which writes the addresses into the CCSP register using a CSAVE and CRESTORE instruction prior to concurrent processing. The virtual stack pointer is read by asserting the appropriate RSEL code and the output enable bit OE (FIG. 9). If NESTED is not set, the PIDEC logic array selects the contents of CCSP. If NESTED is set, it selects the contents of CGSP (which, in a nested loop, contains the current value of the stack pointer on the CE's cactus stack).

VI. Examples of Concurrent Processing

FIG. 14 illustrates several characteristics of concurrent execution. Initially execution is serial; that is, only one CE is executing instructions, and the remaining CEs are idle. Here the active CE is CE5, but could be any CE. Concurrent execution begins when the active CE executes a CSTART instruction. Each of the CEs is given an iteration number, starting with iteration 0. The CSTART instruction specifies the maximum iteration, here 20.

When a CE finishes an iteration, it executes a CREPEAT instruction to begin the next iteration, if there is one. An iteration is assigned to a CE as soon as it asks for one. Note that iterations can be different lengths if they include conditional code.

If there are no more iterations to execute when the CREPEAT instruction is executed, one of two things happens. If the CE was executing an iteration other than the last one, it simply becomes idle. This is the case for CE0 after it finishes iteration 16. If, on the other hand, the CE was executing the last iteration, it waits for all the other CEs to become idle before continuing serial execution. This is the case for CE2 after it finishes iteration 20.

This code would take 50 time units to execute on a single CE. With concurrent execution it takes 8 time units. The speed up is 50/8 = 6.25. Typically N CEs will speed up code by a factor somewhat less than N when the number of iterations is not a multiple of N or when the iterations take different times to execute. The speed up approaches the number of CEs, however, as the number of iterations increases.

Giving a CE an iteration means that at the start of an iteration the iteration number CURR is placed in register D7 of the CE which is to execute the iteration. The first iteration for any CE is the virtual processor number VPN of the CE.

A CE learns what code it is to execute during the CSTART sequence following execution of a CSTART by one CE. Using the CCUs and the CCUBUS, all CEs are started with a program counter equal to the address of the instruction after the CSTART instruction. The CREPEAT instruction is a conditional branch instruction. If there is another iteration, the CE takes the branch and is given a new iteration. If there is not another iteration, the CE falls through or becomes idle, depending on whether it was executing the last iteration or not. Table 1 shows a concurrent loop:

TABLE 1

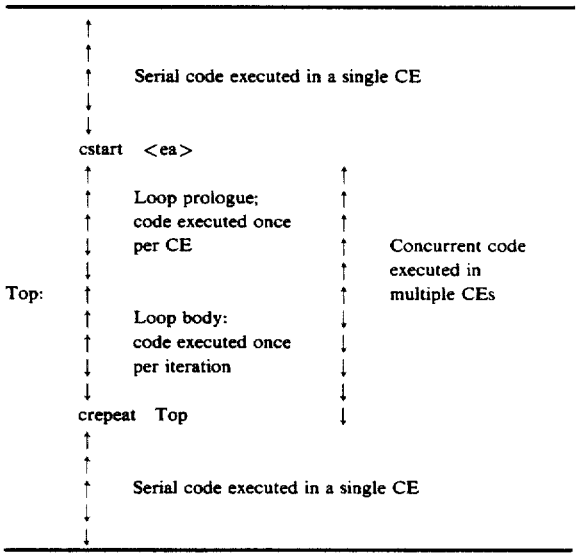

The loop prologue, code executed once per CE, can load registers and perform other operations which need not be executed on every iteration. Table 2 presents a simple Fortran loop:

TABLE 2

| Fortran code: | DO 1 I=1,N |  |  |
|---|---|---|---|
|  | 1 A(I) = I+J |  |  |
| Code: | Serial code |  |  |
|  | movl | N,d2 | Start concurrent |
|  | subl | #1,d2 | execution. |
|  | cstart | d2 | N iterations |
|  | movl | J,d6 | Load J (Once per CE) |
| Top: | movl | d7,d1 | iteration count |
|  | addq | #1,d1 | +I = 1 → d1 |
|  | addl | d6,d1 | 1 + J → d1 |
|  | movl | d1,A:1[d7:1:4] | (d1) → A(I) |
|  | crepeat | Top | Branch if more iterations |
|  | Serial code |  |  |

The loops of Tables 1 and 2 have independent iterations; that is, the iterations may be done in any order without changing the results. The more difficult case is a loop with iterations that depend on each other and that must, therefore, be synchronized to give correct results. Table 3 shows a dependency that requires synchronization.

TABLE 3

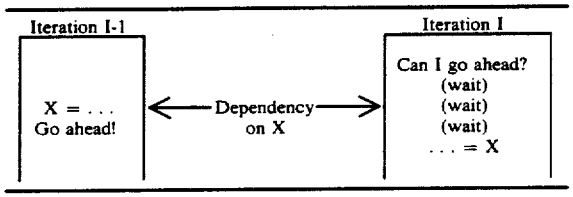

Here a value stored in one iteration is loaded by the next iteration. To get the right result the load must happen after the store. Before iteration I may load X, it must wait until iteration I−1 has stored X. To synchronize this dependency, two instructions need to be inserted in the code. A "Can I go ahead?" instruction called CAWAIT and a "Go ahead!" instruction called CADVANCE. An example is shown in Table 4:

TABLE 4

| Fortran: | DO 1 I=1,N | | |
|---|---|---|---|
| | ... | | |
| | X = X + exp | | |
| | 1 CONTINUE | | |
| Code: | movl | N,d2 | Start concurrent |
| | subl | #1,d2 | execution, |
| | cstart | d2 | N iterations |
| Top: | ... | | |
| | Code to put exp in fp1 | | |
| | cawait | cs1,#0 | Can I go ahead? |
| | fadds | X, fp1 | X + exp |
| | fmoves | fp1,X | → X |
| | cadvance | cs1 | go ahead! |
| | crepeat | Top | |

The CAWAIT instruction causes the CE that executes it to wait until the CE executing the previous iteration has performed a CADVANCE. Then X can safely be fetched from memory. After X is stored the CADVANCE instruction signals the CE excuting the next iteration that it can proceed.

The CS1 in the CAWAIT and CADVANCE instructions is one of the eight synchronization registers CS0-CS7. Each can be used to synchronize a different dependency in a loop. In the unlikely event that a loop has more dependencies than there are synchronization registers, two dependencies can be combined with a CAWAIT before the first and a CADVANCE after the second. The 0 in the CAWAIT instruction is an offset in the range 0–7. Normally a dependency will be from one iteration to the next and an offset of zero will be used. Sometimes, however, the dependency will span two or more iterations, as in the example of Table 5:

TABLE 5

| Fortran: | DO 1 I=1,N | | |
|---|---|---|---|
| | ... | | |
| | A(I) = A(I−3) + exp | | |
| | 1 CONTINUE | | |
| Code: | movl | N,d2 | Start concurrent |
| | subl | #1,d2 | execution, |
| | cstart | d2 | N iterations |
| Top: | ... | | |
| | Code to put exp in fp1 | | |
| | cawait | cs1,#2 | Wait for iteration I−3 |
| | fadds | A−12:1[d7:1:4], fp1 | A(I−3) + exp |
| | fmoves | fp1,A:1[d7:1:4] | → A(I) |
| | cadvance | cs1 | Go ahead! |
| | crepeat | Top | |

Four of the concurrency instructions have been discussed so far. The fifth instruction, CQUIT, implements loop exit prior to the last iteration. An example is given in Table 6:

TABLE 6

| Fortran: | DO 1 I=1,12 | | |
|---|---|---|---|
| | 1 IF (A(I).EQ.X)GO TO 2 | | |
| | ... | | |
| | 2 J=I | | |
| | ... | | |
| Code: | cstartst | #11 | Start concurrent execution |
| | fmoves | X,fp1 | Load register - once per CE |
| Top: | fcmps | A:1[d7:1:4],fp1 | A(I) = X ? |
| | fbeq | Two_A | If so, branch |
| | crepeat | Top | Next iteration |
| | ... | | |
| Two_A: | cawait | cst,#0 | Wait for lower iterations |
| | cquit | | Exit concurrency |
| | addql | #1,d7 | Iteration count + 1 |
| | movl | d7,I | = I |
| Two: | movl | I,J | J = I |

Table 7 illustrates how the code of Table 6 is executed on a four CE concurrency complex when X=1 and A=[0, 2, 4, 6, 8, 7, 5, 3, 1, 2, 1, 9]. For simplicity, it is assumed that each instruction takes one unit of time.

TABLE 7

| | CE: | | | |
|---|---|---|---|---|
| Time | 0 | 1 | 2 | 3 |
| 1 | -cstartst | (idle) | (idle) | (idle) |
| 2 | 0fmoves | 1fmoves | 2fmoves | 3fmoves |
| 3 | 0fcmps | 1fcmps | 2fcmps | 3fcmps |
| 4 | 0fbeq (0≠1) | 1fbeq (2≠1) | 2fbeq (4≠1) | 3fbeq (6≠1) |
| 5 | 0crepeat | 1crepeat | 2crepeat | 3crepeat |
| 6 | 4fcmps | 5fcmps | 6fcmps | 7fcmps |
| 7 | 4fbeq (8≠1) | 5fbeq (7≠1) | 6fbeq (5≠1) | 7fbeq (3≠1) |
| 8 | 4crepeat | 5crepeat | 6crepeat | 7crepeat |
| 9 | 8fcmps | 9fcmps | 10fcmps | 11fcmps |
| 10 | 8beq (1=1) | 9fbeq (2≠1) | 10fbeq (1=1) | 12fbeq (9≠1) |
| 11 | 8cawait | 9crepeat | 10cawait | 11crepeat |
| 12 | 8cquit | (idle) | (idle) | (idle) |
| 13 | -addql | (idle) | (idle) | (idle) |
| 14 | -movl | (idle) | (idle) | (idle) |
| 15 | -movl | (idle) | (idle) | (idle) |

The iteration number and the mnemonic executed by each CE is listed at each time step. The first thing to notice is that since each iteration is identical, the CREPEAT instructions occur on the same cycle and do not have to wait. The next thing to notice is that iterations are started even though it is not known if a previous iteration will be the last. Iterations 9, 10, and 11 were started even though 8 is the last actual iteration. Starting the later iterations is not harmful so long as they do nothing to change the result. In the example, all they do is fetch and test, and thus no problem can occur. A problem could result, however, if store operations are carried out in these surplus iterations.

It is necessary to make sure that the correct iteration performs the CQUIT. CE2 must not be allowed to think that iteration 10 is the last one just because A(11)=X. To assure that the correct iteration executes the CQUIT, the loop is started with a CSTARTST instruction, which causes the CREPEAT instruction to perform a CADVANCE on synchronization counter CS0, which is also called CST (see below). Also, prior to the CQUIT instruction a CAWAIT CS0 instruction is inserted. This guarantees that the earliest iteration will exit, even if a later iteration tries to exit earlier.

Software should be written so as not to store results if it is not certain whether an earlier iteration will execute a CQUIT. That is why, in the example, the storing of the loop index was done after the CQUIT instruction.

Another side effect of beginning iterations even though a CQUIT may be executed in an earlier iteration is that a trap, e.g., a divide by zero or a page fault, may be encountered in these iterations. An example is given in Table 8:

TABLE 8

|      | cstartst N        |                    |
|------|-------------------|--------------------|
|      | ...               |                    |
| Top: | ...               |                    |
|      | If ... Then cquit | On iteration 10    |
|      | ...               |                    |
|      | A = B/C           | C = 0 on iteration 11 |
|      | ...               |                    |
|      | crepeat Top       |                    |

The divide by zero trap in iteration 11 should not be allowed to happen before the CQUIT in iteration 10. To accomplish this, the CSTARTST variant of CSTART is again used (the "ST" suffix standing for serialize traps). Trap serialization is only necessary in concurrent loops with a CQUIT instruction. CSTARTST loops implicitly use synchronization counter CS0 (which is also called CST as a reminder that it is used to serialize traps). The use of the CSTARTST instruction makes advance of CST implicit in the CREPEAT instruction and forces an implied AWAIT on CST when a trap is encountered (until TRAPOK is asserted).

A CQUIT may be used without a CAWAIT CS0, #0 preceding it. This is called a preemptive CQUIT. Any processor executing a preemptive CQUIT will stop the concurrent loop, even if it is not the one executing the lowest iteration. This is valuable in certain search programs to end searching when any CE has found the object of the search.

A concurrent loop may be used around a call to a subroutine whether or not the subroutine itself contains a concurrent loop. In other words, concurrent loops may be nested; however, the inner loop(s) each execute serially on a single CE. For this reason, a single subroutine would not normally contain nested concurrent loops within it. The code in Table 9 is used for a routine that contains a concurrent loop and may be called from either a concurrent loop or from serial code:

TABLE 9

| Calling routine: | | Called routine: | |
|---|---|---|---|
|   |   | S:   |   |
|   | cstart N1 | cnest | —(sp) |
|   | ... | ... | |
| T1: | ... | cstart | N2 |
|   | jsr S | ... | |
|   | ... | T2: | ... |
|   | crepeat T1 | ... | |
|   | ... | crepeat T2 | |
|   | jsr S | ... | |
|   | ... | more concurrent loops | |
|   |   | ... | |
|   |   | cstart | Nn |
|   |   | ... | |
|   |   | Tn: | ... |
|   |   | ... | |
|   |   | crepeat Tn | |
|   |   | ... | |
|   |   | cunnest | (sp)+ |
|   |   | ... | |
|   |   | rts | |

Note that the instructions CNEST and CUNNEST are used at the beginning and end of a subroutine that has one or more concurrent loops. These are needed to save and restore the current and final iteration for the outer loop. In the example of Table 9, the first subroutine call (jsr) in the calling routine appears within a concurrent loop, meaning that each execution of a concurrent loop within the subroutine is performed serially by the CE that called the subroutine. The second (jsr) appears outside the concurrent loop, and thus the concurrent loops in the subroutine are executed concurrently on multiple CEs.

VII. Backplane Switch

The CEs are connected to the cache quadrants by backplane switch 14, as shown in FIG. 15.

A. Circuitry

Forty-eight control lines 200 extend across the backplane directly from the CEs to the cache quadrants, without passing through the backplane switch. Six control lines are connected to each CE, for a total of forty-eight control lines, all of which are connected to each quadrant. The six control lines for each CE are: CSTRTL, CBUSYL, CWAITL, CADR5, CADR4X3, and CDTPAR. Collectively, the six control lines are denoted AC for CE0, BC for CE1, CC for CE2, and so on. CBUSYL, CWAITL, and CDTPAR are implemented as open-collector signals.

Ninety-six lines extend to the backplane switch from each CE and each cache quadrant: sixty-four bidirectional data lines CDT(63:0), twenty-six address lines CADR(27:6,4,2:0), an address parity line CADRPAR, three CE operation lines CEOP(2:0), and two data-length lines CDLN(1:0). Each CE and cache quadrant also provides the backplane switch with enable lines, e.g., AE and WE, for enabling data and addresses to be read from the ninety-six bidirectional lines connected to the switch. The cache quadrants provide the backplane switch with direction signals WD, XD, YD, ZD, which define the direction of data being transferred through the switch, and two sets of three-bit CE selection signals WS(2:0), XS(2:0), YS(2:0), ZS(2:0), which specify the CE to which, or from which, a transfer is being made. Only one set of selection signals is shown in the drawings, but separate 3-bit selection signals are provided for addresses and data.

The backplane switch consists of twenty-four identical four-line switches 190, which together provide the capability of switching ninety-six lines between the CEs and cache quadrants. The switches 190 physically reside on backplane 192 (FIG. 18), into which the CE boards and cache boards are plugged. Each four-line switch is implemented using a single CMOS gate array (e.g., Fujitsu 2600).

A block diagram of one four-line switch 190 is shown in FIG. 17. Four of the ninety-six lines passing through backplane 14 are connected to each four-line switch 190, for each cache quadrant and CE (e.g., W3, W2, W1, W0 for quadrant W, and A3, A2, A1, A0 for CE0). The enable lines (e.g., WE and AE), direction lines (e.g., WD), and CE selection lines (e.g., WS2, WS1, WS0) are also connected to the four-line switch.

Each four-line switch has three functional sections: a cache-ports section 202, selection section 204, and a CE-ports section 206.

The cache and CE-ports sections serve to divide the four bidirectional lines from each cache quadrant and CE into eight unidirectional lines, four going toward the CE (the "IN" lines) and four coming from the CE (the "OUT" lines). For example, the four bidirectional lines A(3:0) from CE0 are divided into four lines AIN(3:0) going to the CE and four lines AOUT(3:0) coming from the CE. The logic 208, 209 used for this function is shown in FIG. 16 for one of the four-lines from each cache quadrant and CE. Each line (e.g., W0) entering the switch (sixteen from the cache quadrants and thirty two from the CEs) passes through buffer gate 210 and inverter 212, and each line leaving the switch passes through three-state gate 214, enabled when the corresponding enable line is low (cache ports) or high (CE ports). For example, on the cache side, bidirectional line W0 passes through gates 210, 212 and emerges as WIN0; in the opposite direction, WOUT0 passes through three-state gate 214 when enable line WE is low. On the CE side, bidirectional line A0 passes through gates 210, 212 and emerges as AOUT0, and AIN0 passes through three-state gate 214 when enable line AE is high. Gates 210, 212, 214 are provided for each of the cache ports and CE ports connected to the backplane switch.

The selection section 204 of the switch serves to connect selected cache output lines (e.g., WIN0) to selected CE input lines (e.g., AIN0) when the transfer is to the CE, and to connect selected CE output lines (e.g., AOUT0) to selected cache input lines (e.g., WOUT0), when the transfer is from the CE. The selections are controlled by the cache, using the direction lines (e.g., WD) and the three-bit CE selection lines (e.g., WS(2:0)).

Data transferred from a cache port to a CE port is selected at the CE port by a four-bit-wide selector 216 consisting of four OR gates 218 driving a NAND gate 220 (FIG. 16). The OR gates select one of four cache output signals WIN0, XIN0, YIN0, ZIN0 under control of four selection signals WSELA, XSELA, YSELA, ZSELA, which are generated by decoding the CE selection signals WS, XS, YX, ZS at decoder 222. When a selection signal is low, its corresponding cache output signal is selected (e.g., WSELA set low, causes WIN0 to be connected to AIN0). Proper operation of the selector requires that no two cache ports access the same CE port at the same time; this is assured by the CE-cache protocol (see below). For clarity, only one selector 216 and decoder 222 are shown in FIG. 16. A total of thirty two, one for each of the four lines connected to each CE, are provided in each four-line switch.

Data transferred from a CE port to a cache port is selected at the cache port by an eight-to-one multiplexer 230 consisting of decoder 224, which converts a three-bit CE selection signal (e.g., ZS) to eight selections signals (e.g., ASELZ to HSELZ), and gates 226, 228, which use the eight selection signals to connect one of the eight CE output signals (AOUT0 to HOUT0) to a cache port (e.g., ZOUT0). The CE-cache protocol (see below) assures that only one cache quadrant (W, X, Y, or Z) ever accesses the same CE at any one time. Only one multiplexer 230 is shown in FIG. 4. A total of sixteen, one for each of the four lines connected to each cache quadrant, are provided in each four-line switch.

B. Operation

A CE initiates a cache operation by asserting its CSTRTL and supplying the two address bits CADR5 and CADR4X3 specifying which of the four interleaved quadrants of the cache are involved in the operation. CADR5 is the fifth least significant bit of the memory address involved in the operation being initiated by the CE. CADR4X3 is the exclusive-OR combination of the third and fourth bits of the memory address. The reason that these two bits are combined in addressing the cache quadrants has to do with the way in which the cache quadrants are interleaved (see discussion of cache). If only two cache quadrants are in use (e.g., if only four CEs are in use), only address bit CADR4X3 is used to address a particular quadrant, and CADR5 is saved by the addressed cache quadrant for use with the remainder of the address transferred through the backplane switch.

As many as eight CEs may simultaneously bid for access to any of the four cache quadrants. Access conflicts are resolved by the cache quadrants. In the same 85 nanosecond cycle as the CSTRTL is asserted (the first cycle), the cache quadrant addressed resolves which of the contending CEs has priority (on the basis of the CE's physical location in the backplane, e.g., CE0 has priority over all other CEs), and in the second 85 nanosecond period, asserts CBUSYL to all but the highest-priority CE of those that are requesting access to that quadrant. CEs receiving the CBUSYL maintain their assertions of CSTRTL in subsequent cycles (only if they continue to desire access to that quadrant). The cache quadrant maintains assertion of CBUSYL in subsequent cycles until it is able to accept an address from the CE in question or until the CE removes CSTRTL. When CBUSYL is removed, the address transfer takes place in the same cycle. A CE must remove its CSTRTL in the cycle following transfer of an address, or the cache quadrant will interpret its presence as a new cache access request. A cache access may be aborted by a CE by its removing the CSTRTL assertion in the second cycle—the cycle in which the address transfer is to tak place.

Also in the second cycle, the cache quadrant instructs the backplane switch to transfer the address CADR(27:6,4,2:0), operation code CEOP, and data length code CEDLN from the selected CE. The cache quadrant accomplishes this by asserting the code for the selected CE on its CE selection lines (e.g., WS). As the address lines through the backplane switch are unidirectional (CE to cache quadrant), the direction lines (e.g., WD) and enable lines (e.g., WE) for the eight address gates of the switch are hardwired in the appropriate state. The cache quadrant combines the twenty-six bits of address CEADR(27:0,4,2:0) transferred through the switch with the two bits CADR5 and CADR4X3 used in addressing the cache quadrant, to generate the full memory address.

In the third cycle, if the CEOP code shows that the CE is requesting a read operation, the cache quadrant inspects its tag store to determine whether the addressed quadword (data transfers are in 64 bit quadwords) is present in its data store while simultaneously reading from the data store the data at the location at which the data to be read would be found if present. During the same cycle, the cache quadrant prepares to set up the backplane switch to transfer data back to the selected CE (by asse ting the CE selection lines for the CDT lines of the switch, and changing the state of the direction line, e.g., WD).

In the fourth cycle, if the tag-store lookup is successful, and there is no other condition that precludes it (e.g., a resource conflict), data are transferred through the backplane switch to the selected CE. If the look-up is unsuccessful (i.e., a "cache miss" has occurred), the cache quadrant asserts the CWAITL line for the selected CE, instructing the CE to wait until the removal of the CWAITL assertion before reading data from the backplane switch. CWAITL remains asserted until the cache quadrant is prepared to transfer the requested data. The transfer occurs during the first cycle in which CWAITL is not asserted.

If the CEOP code specifies a write operation, the tag-store lookup operation occurs in the third cycle (but a data store read is not performed), and the backplane switch is configured to transfer data from the CE to the cache on the CDT lines. If the lookup is successful, the data transfer occurs in the fourth cycle, and the write into the data store in the fifth cycle. If the lookup is unsuccessful, CWAITL is asserted, instructing the CE to hold the data on its CDT lines until the CWAITL assertion is removed.

The data transfer to or from a CE can be overlapped with a second CSTRTL assertion and address transfer from the same CE. Such overlapped accesses raise the possibility that a cache start will be accepted (CBUSYL not returned) by one cache quadrant before the data transfer for a previous operation has been completed by the same or another quadrant. In such a case the one or two quadrants involved must work together to assure that the data is transferred in the expected order and that the CWAITL signal is asserted unambiguously. This is accomplished by assuring that CWAITL is asserted only by the first quadrant to accept a cache start, until such time as the data transfer for that quadrant is complete. The data transfer for the later operation is delayed until at least two cycles after the earlier data transfer (rather than two cycles after the address transfer as in the ordinary case). If the quadrant controlling the later transfer wishes to delay the transfer further, it may then do so by asserting CWAITL. In this case, there will be exactly two cycles of delay from the end of one assertion of CWAITL to the start of the next assertion. Once CWAITL is under the control of the cache quadrant performing the later transfer, the timing of the data transfer will be the same as for the ordinary case. The cache quadrants are able to detect for which CEs the CWAITL line has been asserted as the CWAITL lines for all CEs can be read by all cache quadrants.

Data parity bit CDTPAR, which is based on the entire 64 bits of data transferred across the CDT lines, is sent in the cycle following the data transfer. Address parity bit CADRPAR is transferred with the address during the second cycle.

There are three basic operations specified by the CEOP code: READ, WRITE, and TEST AND SET (TAS). The first two are straightforward, and have already been discussed. The TAS operation performs an atomic test and set of a bit in memory. The operation is performed by reading the addressed byte from the cache and transferring it back to the CE (as part of an eight-byte quadword transfer) while also writing the addressed byte back to memory with bit 7 set to one. It is guaranteed that no other processor, anywhere in the system, can access the data between the read and writeback portions of the operation.

The CEOP code may also be used to pass a crossprocessor interrupt message to other processors via the backplane switch, cache, and memory bus. Additional interrupt control lines (not shown) may be provided for use by the cache to signal a CE of the occurrence and nature of such interrupts.

In addition to the read, write, and TAS operations specified by the CEOP code, a write-continuation operation may be specified (to perform the second half of a mis-aligned write that crosses a quadword boundary).

The data-length bits CDLN(1:0) are transferred with an address to instruct the cache quadrant as to the number of bytes following the address that are to be modified by a write operation.

VIII. Central Processing Cache

A. Summary

The system has a global central processing cache that serves up to eight CEs. The cache is divided into four interleaved quadrants (denoted W,X,Y,Z), two of which reside on each of two CP cache boards 12. Each cache quadrant can ordinarily complete one quadword (64-bit) read or write access in each 85 nanosecond cycle, resulting in a total peak throughput in the vicinity of 375 megabytes per second.

The block size of the cache (the smallest amount of data moved between the cache and memory) is 32 bytes. The data of each block is interleaved between two quadrants W,X on the same cache board so that for any 32-byte block quadwords 0 and 3 (quadwords are 8-byte words) are contained in quadrant W and quadwords 1 and 2 in quadrant X. Contiguous 32-byte blocks are interleaved between cache boards so that quadwords 4 and 7 are located in quadrant Y and quadwords 5 and 6 in quadrant Z. The interleaving is accomplished by the use of CADR5 to select the cache board and CADR4X3 to select the quadrant within the board.

The cache quadrants use a write-back cache protocol, meaning that both read and write operations are handled by the cache. Data which has been modified in the cache will not be written back into main memory until the data is required elsewhere in the system, or until the cache block in which it is contained is needed for other data, and blocks that have not been modified during their stay in the cache are not written back into memory when replaced.

Each cache quadrant contains 32 kilobytes of data storage, and the entire four-quadrant cache 128 kilobytes. The data stores of the quadrants are direct mapped, meaning that for any given location in main memory, there will be a single location in the cache which may contain a copy of the data from that main memory location.

B. Data Paths

The data paths for each cache quadrant are shown in FIG. 19 (which shows quadrant W and a portion of quadrant X). A 64-bit data bus CDIO(63:0) connects the I/O lines of data store 300 with ECC gate array 302 (implemented as two gate arrays), CE interface data input register CDIN, CE interface data output register CDOUT, and main memory bus input register DMBIN. Data store 300 is implemented using sixteen 4K×4 MOS static RAMs plus eight 4K×1 MOS RAMs for parity. The output enable signals of the parts driving the CDIO bus are gated with timing signals generated by a delay line to minimize the possibility of bus fighting during transitions from one bus source to another. The W suffixes in FIG. 19 indicate the parts belonging to quadrant W; identical parts are present in quadrant X.

The DMBIN register receives data from one of the main memory data buses and supplies it simultaneously to the data store, ECC array, and CDOUT register.

The CDIN register receives data on the CDT bus from a CE via the backplane switch and supplies it simultaneously to the data store and ECC array (for parity checking and generation). The CWAITL signal is used to delay acceptance of the data from the CE until the data store is able to accept it.

The CDOUT register receives data from the data store, ECC array, and DMBIN register and supplies it to a CE via the backplane switch. The clock for this register can be stopped (by a HLDCDOUT signal) to hold the data for an extra cycle during the checking of the ECC check bits, or during the transition from write data to read data on the CDT bus.

The read or write to the parity portion of the data store 300 occurs one cycle after the corresponding read or write to the data portion. This is done to remove the time spent in generating parity bits from the critical timing path.

The ECC gate array in each quadrant performs error correction checking and generation functions for the main memory interface, and parrty check and generation for the data store and the CE interface. The ECC array also provides the data path for data written from the cache back to main memory and assists in the execution of the TEST AND SET operation.

Each block of data to be written back to main memory from the cache is read from the data store into the ECC array one quadword (64 bits) at a time. In the cycle after receiving the data, the ECC array checks the byte parity of the data and generates check bits to be written along with the data into main memory. The combined 72 bits of data and check bits are then stored in a write-back file. The write-back file holds two quadwords for transfer to main memory. The other two words of a given cache block are handled by the ECC array for the other cache quadrant on the board. When the data from the write-back file is subsequently driven onto the main memory data bus, the ECC arrays for the two quadrants alternate in driving the data onto their respective data buses.

There are two 72-bit main memory buses, DMBTA and DMBTB. Cache quadrants on the same cache board are assigned to different buses. DMBTA is assigned to the W and Y quadrants; DMBTB is assigned to the X and Z quadrants. Thus, the DMBTA bus always transfers quadwords 0 and 3 of a given data block, and the DMBTB bus transfers quadwords 1 and 2. The use of two parallel buses increases the bandwidth of the memory bus by permitting two data block transfers to be in progress simultaneously. Dividing accessed data blocks between cache quadrants provides an advantageous prefetch of data. Each memory bus is driven by an ECC array no more frequently than every other 85 nanosecond cycle, and the ECC array begins to drive the data in the cycle prior to the one in which the data will be placed on the memory bus.

In addition to serving as the data path for write back to memory, the ECC array also reads in any other data placed on the CDIO bus and performs parity or ECC operations on that data. For example, when data is read from the data store to the CDOUT register, the ECC arrays check for correct data store parity and generate the appropriate bus parity for the transfer to the CE. Similarly, when data is transferred from the CE to the cache, the ECC array checks for correct bus parity and generates the appropriate data store parity.

When data is transferred from the DMBIN register to the data store, the ECC array generates the correct data store parity and checks for ECC error. If an ECC error is found, the ECC array supplies the corrected data to the data store (and to the CE data output register if appropriate) in the third cycle following the initial transfer of the erroneous data on the CDIO bus.

The ECC gate array also plays a role in the execution of the TEST AND SET (TAS) operation. When a TAS operation is specified by the CEOP code transferred from the CE, the ECC arrays read in the data supplied by the data store and check its parity as usual. Two cycles later, the ECC array returns the same data to the bus, but with the most significant bit of each byte set to 1. In the following cycle the ECC array supplies the parity bits for the new data so that the appropriate data store parity bit can be updated.

C. Address Paths

The address paths for each cache quadrant are shown in FIG. 19. The cache quadrants receive a 28-bit physical byte address from the CEs. The significance of the various parts of the address is shown in Table 10:

TABLE 10

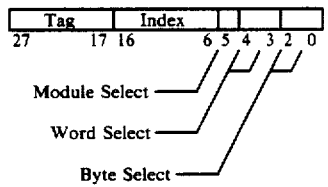

The three least significant bits of the address (bits 0 through 2) indicate the desired byte within the specified quadword. These bits are treated by the cache as control information rather than as part of the address; they are used along with the data length code CDLN specified by the CE to determine which bytes should be modified by a write or TAS operation.

The next two bits (bits 3 and 4) of the address specify the desired quadword within the cache block. Because quadwords 0 and 3 are located in one quadrant and quadwords 1 and 2 are located in the other, the CE-supplied CADR4X3 signal, which is the Exclusive OR of bits 3 and 4, is used to determine which cache quadrant on a CP cache board contains the desired data. The CE also supplies a normal address bit 4 so that the selected cache quadrant can determine which of its two wors is required.

Bit 5 of the address (supplied as CADR5 by the requesting CE) indicates which of the two CP cache boards in a four-way interleaved system contains the desired block of data.

The next 11 bits of the address (bits 6 through 16) form the cache index. These bits are used to address the tag store and (along with address bit 4) to address the data store of the selected cache quadrant. In effect, the index bits along with the bits which select the cache quadrant are used to specify the one location within the CP cache which could be occupied by the data from the addressed main memory location.

The remaining bits of the address (bits 17 through 27) form the cache tag. These bits indicate which one of the many possible blocks from main memory which could be contained in the addressed cache block is actually required by the CE. When the cache is accessed, these bits are compared with the contents of the tag store entry for the addressed block to determine if the desired data is in fact contained in the cache.

When a single CP cache board is used by itself as a two-way interleaved cache, the address is interpreted in accordance with Table 11:

TABLE 11

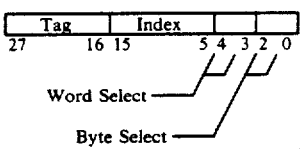

The function of bits 0 through 4 does not change. Bit 5, however, is no longer needed as a board-select bit and is shifted into the index. To make room for bit 5 in the index, bit 16 is shifted into the tag, which becomes one bit wider.

Each cache quadrant has three address input registers which are clocked in each (85 ns) cycle. The TAG register 310 is a simple 12 bit register which receives CADR(27:16) from the backplane switch and supplies those twelve bit to the address flow gate array 312 (the "AF array", implemented as two gate arrays) and to tag comparator 314. The DSIDX and TSIDX registers 316, 318 are used to hold two copies of the index portion of the address, one for the data store and the other for the tag store. The TSIDX register 318 accepts bits 5 through 16 of the address from either the CE via the backplane switch or from the AF array and feeds those bits to the AF array and the tag store 320. The DSIDX register 316 receives the same address bits, along with address bit 4, from the same two sources, and uses them to address the data store. Bits 4 and 6–16 of the address received from the CE are supplied from the backplane switch, while bit 5 is supplied by a flipflop in which it has been saved from its transfer as CADR5 in the previous cycle. The DSIDX register 316 also receives bit 4 of the address CADR(4) from the backplane switch.

Although the two index registers 316, 318 receive essentially the same data from the same two sources, their input select lines are independently controlled so that the TSIDX register can be accepting an address from the CE at the same time that the DSIDX register is accepting a different address from the address flow gate array In order to be able to work correctly in either the single or the dual-board configuration, the two index registers always receive both bit 5 and bit 16 of the address, while the tag register always receives a full 12 bit tag, including bit 16. The inclusion of an extra bit in the tag comparison for a two board cache will not affect its operation, as a bit which is included in both the index and the tag will always compare successfully. For the two index registers, it is necessary to select either bit 5 or bit 16 of the address, depending upon the configuration.

Tag store 320 consists of two banks of four 1K×4 fast static MOS RAMs which provide 2048 15-bit tag entries. Twelve bits of each tag store entry contain the tag itself. An additional bit is used for the VALID control flag, and the final two bits are used as tag parity bits. The VALID control flag is used to indicate whether or not the data store location associated with a given tag store entry contains any valid data. The flag is set at the completion of a cache miss resolution, and reset whenever the cache block will be in an indeterminate state (i.e., when one, but not both words of a new block have been written).

A separate pair of 4K×1 fast static RAMs is used to keep two copies of the tag entry's MODIFIED control flag. The use of separate and independently controlled RAMs allows the modified bit to be set or cleared at the same time that the rest of the tag entry is being read. Two copies are kept to provide a separate parity check for this bit. The MODIFIED control flag is used to keep track of whether or not the data contained in the corresponding data store location has been modified. This flag is set when data contained in the cache, but currently unmodified, is written for the first time. The MODIFIED flag is reset when data which is currently in the cache and modified is being read into the writeback file in the ECC array. The MODIFIED flag is also reset whenever the VALID flag is reset.

Each cache quadrant checks each address submitted to it by a CE in order to determine if the requested data is already present in the cache. The check is performed by selecting the index portion of CADR as input to the TSIDX register 318 and applying the data read from the tag store 320 to one side of identity comparator 314 while applying the tag portion of CADR (contained in the tag register) to the other side of the comparator. The result of this comparison is gated with the VALID flag read from the tag store to generate a Cache Hit (or Cache Miss) indication.

When the address submitted for tag comparison is for a write or TAS operation, the tag comparison includes a check to verify that the MODIFIED flag is already set. If the MODIFIED flag is not yet set, the cache quadrant must set it to keep track of the fact that the data has been modified, so that the quadrant will know to write back to memory the block containing that data.

The MODIFIED flag will also be checked when the tag check indicates a cache miss. If the MODIFIED and VALID flags are both set when a miss is detected, the cache will cause the data contained in the data store to be written back to memory when it is replaced by the new data.

A significant portion of the address paths for a cache quadrant is contained in the AF array 312. The paths in the AF array can be divided into two halves. One half receives the addresses from the TAG register and the tag store index register TSIDX and is able to hold three of these addresses for operations which may be pending. The addresses from this half of the array can be driven onto the main memory address bus DMBADR to initiate reads for cache miss resolutions, and can be used to address the data store for the completion of an access that has been delayed for some reason. The paths in this half of the array are also used to delay the data store index used for write operations from the corresponding access of the tag store. The second half of the AF array reads addresses from the main memory address bus DMBADR, and holds other addresses for memory-related activity in progress. Addresses are placed on the DMBADR bus by the array itself to initiate main memory reads, and the addresses are read by the AF arrays for both quadrants, and saved so that they may be used in the completion of the operation.

Addresses placed on the bus by the AF array for the other cache quadrant of the same board are similarly taken into a quadrant's own AF array and used to update the data and tag stores as appropriate to the action initiated by the other quadrant. The AF arrays are also responsible for generating the parity bits for a new tag entry, and for checking parity whenever a tag entry is read from the tag store.

When a write-back is required as part of a miss resolution, the miss address taken into the AF array from the main memory bus is used to read the old data from the appropriate data store block into the write-back file. The AF array for the quadrant which initiated the miss resolution also reads in the old tag from the tag store at this time. This old tag is concatenated with the index portion of the miss address to form the main memory address needed for initiating the write-back operation.

In addition to their several address registers and latches, the AF arrays also include a number of identity comparators for determining when two operations which are pending or in progress involve either the same data block (i.e., both tag and index are the same) or the same cache block (i.e., the index is the same).

Because of the need to work in both single and dual-board configurations, the AF array always includes bit 16 in the tag and includes both bits 5 and 16 in the index. Control inputs to the arrays will indicate in which of the two modes a given array is operating and for which half of the address the array has responsibility. The array which contains bit 16 of the address will enable or disable the inclusion of that bit in any index comparison, depending on the mode of operation, in order to be able to perform such comparisons correctly.

A single main memory address input register DMBA-DRIN and XCVR are shared by both quadrants on the same cache board. The sharing of the output drivers is facilitated by the fact that any given CP cache board will not drive a new main memory address onto the bus more often than every fourth cycle. The AF arrays for a quadrant which is about to place an address on the bus are enabled to drive the inputs of the bus drivers during the cycle before the bus itself is to be driven. The delay to the enabling of the data onto the main memory address bus will thus depend solely on the enabling of the output drivers at the start of the next cycle, and not on any delays introduced by the gate arrays themselves.

D. Handling Multiple Accesses

The cache quadrants have the ability to continue accepting CE accesses even after a cache miss or similar event has prevented them from immediately completing an access. Each quadrant has the capability of simultaneously working on three pending CE accesses.

There are a number of reasons besides a cache miss for a quadrant being unable to complete an access immediately: e.g., the data store may be temporarily inaccessible because it is being used for a higher priority activity; the CE may be unable to accept the data accessed as the result of an earlier access not having been completed (CEs may overlap cache accesses, but they must receive data transfers in order).

Each cache quadrant keeps track of pending CE accesses using one address register and two address latches, and corresponding status registers (see below). The address register and latches are located in the AF array. They are the CE address register CEREG and two miss latches MISSA, MISSB. The CEREG register receives the address for the most current CE access: the 12-bit tag store index (equivalent to CADR(16:5)) from the TSIDX register and the 12-bit tag (equivalent to CADR(27:16)) from the TAG register.

If a CE cache access is completed immediately by the quick-work logic (described below; the memory location is found in the cache and data is transferred in the fourth cycle following the CSTRTL assertion), the contents of CEREG is simply replaced by the address of the next CE access. If, on the other hand, the CE access cannot be handled immediately (and CWAITL is asserted to the CE), the contents of CEREG are held by the MISSA or MISSB latches, whichever is free. When both the MISSA and MISSB latches are full, and the access corresponding to the current contents of CEREG cannot be completed immediately, the clock to CEREG is halted to thereby temporarily store the address it contains, and the cache quadrant is alerted to refuse any further CE accesses (it asserts CBUSYL to all contenders). Thus, as many as three accesses may be simultaneously worked on by each cache quadrant. Normally, each cache quadrant accepts new accesses every 85 nanoseconds. After both miss registers are full, the speed is halved to provide enough time for the quadrant to determine, before accepting a new access, whether the current access (for which the address is stored in CEREG) will be completed immediately.

CE accesses are initially controlled by quick-work logic 322 (FIG. 20), which controls the tag store lookup, data store read and write, and so on (as well as the interface with the CE). When an access cannot be immediately handled, control of it shifts to pending-status logic 324. As many as three pending accesses in each quadrant can be under the control of the pending-status logic at any one time. The pending-status logic controls address register CEREG and address latches MISSA, MISSB in each quadrant, assigns to them addresses received from the quick-work logic, and maintains and updates a status code for each. Status codes are initially generated by the INITSTAT programmable logic array (PLA), and stored in initial-status register INIT (FIG. 21). From there they can be updated by three next-status PLAs (NEXTSTATC, NEXTSTATA, NEXTSTATB) and held in three next-status registers NEXTC, NEXTB, NEXTA.

When it is determined that an access cannot be handled immediately by the quick-work logic, the access becomes a "pending" access, and control of it is transferred to the pending-status logic. A four-bit state encoding and a three-bit substate encoding is generated by INITSTAT and assigned to the access. The state/substate combination identifies the reasons why the access could not be completed immediately and indicates the path that must be taken to resolve whatever conflicts are preventing completion of the access.

At the same time as the state and substate encodings are made, initial values of an S bit and a WB bit are set for that access. The S bit, when set, indicates that the completion of the access must be delayed until after a previous operation requested by the same CE has been completed, irrespective of whatever other constraints may or may not be placed on that access by its state or substate. The WB bit is used to track the state of the MODIFIED bit for the block which will be replaced if it should be necessary to bring a new data block in from memory in order to complete the access. The WB bit indicates whether or not a write-back operation is to be performed as part of the miss resolution.

The determination of the initial state and substate is based upon the type of access requested and upon the results of the tag comparison and the state of the MODIFIED bit, along with other information, such as the status of other CE accesses still pending and the results of address comparisons performed within the AF array.

The initial status (state, substate, S bit, and WB bit) is loaded, along with the CEOP specification for the access and the CEID of the requesting CE, from the INIT register into one of the next-status registers. If either NEXTA or NEXTB is empty, the status is loaded via the associated next-status PLA into the empty register. If both NEXTA and NEXTB are already full, the output of INIT is loaded only into NEXTC via the NEXTSTATC PLA. NEXTC is only used when CEREG is called upon to temporarily store the address of a third pending access. When the number of pending accesses is reduced to two or less, the contents of NEXTC (if its access has not already been completed) is transferred to either NEXTA or NEXTB. The choice of NEXTA or NEXTB as the destination for the output of INIT is governed by multiplexers 340, 342. During the transfer of INIT the output of NEXTC (which is coupled to the output of INIT via three-state logic not shown) is not enabled.

The status codes of pending accesses are redetermined each cycle by the next-status PLA to which the access is assigned. The PLAs determine a new status each cycle based on the old status (which is either fed back from the PLA's own next-status register or (as discussed above) transferred from the NEXTC register), inputs from the AF array indicating the results of address comparisons, and other inputs indicating the status of other activity occurring in the cache.

When the pending-status logic recognizes that address latches MISSA, MISSB in the AF array are full, it instructs the quick-work logic to accept CE accesses at a slower rate. When it recognizes that a third access has become pending (with its address stored in CEREG), it notifies the quick-work logic to stop accepting accesses, by asserting CBUSY to all contending CEs.

To complete pending accesses, the pending-status logic relies on either the memory-interface logic 326 or the unpended work logic 328. To complete an access by accessing the required data block from memory, the pending-status logic communicates with the memory-nterface logic by asserting one of four memory-access signals ARBNXTI, ARBNXTC, ARBNXTA, ARBNXTB, to inform the memory-interface logic that it should access from memory the data block having the address stored in the corresponding register (CEREG ARBNXTC, MISSA for ARBNXTA, and MISSB for ARBNXTB; ARBNXTI is asserted before it is known in which register or latch the access address will be held). Also supplied to the memory-interface logic is the CE operation code CEOP and the CE identity CEID.

The memory-interface logic accomplishes two tasks. First, it completes the requested memory access, by instructing the AF array to assert the required block address on the DMBADR OUT bus and by instructing the DMBINA (or DMBINB, depending on the quadrant) register to accept data from the main memory bus. Second, it completes the cache access assigned to it by the pending-status logic. To complete the cache access, it must obtain the use of the data paths from the DMBINA register to the data store and ECC array and to the address paths from the AF array to the tag store, paths normallY controlled by the quick-work logic. To do so, the memory-interface logic asserts SRQ (data store request) and TSRQ (tag store request) to the quick-work logic. Assertion of these signals may prevent the quick-work logic from completing accesses, and may result in accesses being transferred to the pending-status logic, but the memory-interface logic is given priority so that data accessed from memory reaches the data store without delay. Once it has control of the paths, the memory-interface logic instructs the AF array to transfer the index portion from the RDADR latch (which contains the address of data accessed from main memory) to the paths to the tag and data stores, and it causes data to be moved across the CDIO bus to the ECC array and data store. When the memory-interface logic has completed an access assigned to it, it informs the quick-work logic to clear the CWAIT corresponding t.o the completed access.

Pending accesses not completed by the memory-interface logic are completed by the unpended-work logic 328. Only CE accesses that initiate a memory access are completed by the memory-interface logic. Those that can be completed without a memory access are handled by the unpended-work logic. Examples of accesses completed by the unpended-work logic include ones caused not by misses but by resource conflicts and ones for which the desired quadword is read from memory as the result of another pending access. The pending-status logic transfers accesses to the unpended-work logic by asserting one or more UNPEND signals (AUNPEND, BUNPEND, CUNPEND, one for each of the three possible pending accesses), as well as the CE operation code CEOP and the CE identity CEID. The UNPEND signals constitute one bit of the status code stored in the next-status registers, and are updated by the next-status PLAs with each change in the state/substate of an access; they represent a decoding of the specific state encoding (UNPEND) that indicates whether an access has a status appropriate for completion by the unpended-work logic. The unpended-work logic constantly checks to see if the resources are available to complete accesses assigned to it. When they are, it will control the AF array, ECC array, data store, and tag store as necessary to complete the access.

When the unpended-work logic completes an access, it informs the pending-status logic of that fact by asserting the appropriate EMPTY line (EMPTYA, EMPTYB, or EMPTYC), which causes the corresponding status and address registers and latches to be cleared, and it instructs the quick-work logic to clear the corresonding CWAIT signal.

In summary, there are three ways in which a cache access is completed: by the quick-work logic if completion can be done immediately, by the memory-interface logic if the cache access initiates a memory access, and by the unpended-work logic if the cache access can be completed without initiating a memory access.

Priority for access to the data store and related resources is always given to the memory-interface logic, as it cannot be required to hold up transfers from memory. Ordinarily the quick-work logic has the next highest priority, as it is ordinarily better to avoid creating new pending accesses than to complete those already pending. The unpended-logic may, however, take priority by asserting STOP to the quick-work logic, instructing it to assert CBUSY to all contending CEs. The quick-work logic, in turn, ihstructs the unpended-work logic whether it will be using the resources in the next cycle (e.g., if it will be accepting an address transfer for the last access it accepted) by asserting RISTRT. If RISTRT is asserted, the unpended-work logic waits until the following cycle, when it is assured of use of the resources.

The pending-status logic relies on the results of address comparisons made in the AF array to update the status of pending accesses. These comparisons are primarily of two types. First, addresses stored in CEREG, MISSA, and MISSB are compared to every address DMBIN received by the AF array from the main memory address bus DMBADR. Second, the address CEIN of the most current CE access (which may become a pending access) is compared to not only the current address DMBIN being received from memory but also to addresses received from memory in several prior cycles. The prior-received addresses are stored in a pipeline in the AF array and include register ADRIN and latches PDADR, RDADR.

A successful comparison between CEIN and the contents of addresses in the incoming address pipeline (e.g., PDADR, RDADR) may cause the pending-status logic (the INITSTAT PLA) to generate an initial status indicating that the current access is pending on another miss (POOM), i.e., that the data needed to complete the new access is on its way to the data store from the main memory bus. On the other hand, a successful comparison between only the index (and not the tag) of CEIN and an address of data being read in from main memory causes the pending-status logic to generate an initial status indicating that, even though the data required might presently be in the data store, it is about to be replaced by other data, and that, if the access cannot be immediately completed by the quick-work logic, the access must be given a status that requires it not initiate another memory access until after an interval long enough for completion of the access that caused the new data to be transferred from memory.

In summary, the address comparisons performed to determine how the status of a pending access should be updated (e.g., to a status indicating that the access can be completed by the memory-interface or unpended-work logic) comprise (1) comparisons of each new access address transferred by a CE to all addresses for main memory accesses still in progress (i.e., those for which the data has not already been stored in the data store) and (2) comparisons of each new memory access address to the addresses of each pending access.

The address comparisons made by the AF array include ones that assure that if both a read and a write to the same data are pending, the read is not completed if it came later until the earlier write has been completed.

The two cache quadrants on the same cache board share common main memory address buses (as shown in FIG. 19 for quadrants W, X). The DMBADR IN lines from the AF array of each quadrant are tied together, as are the DMBADR OUT lines. In this manner, the address of a data block being accessed by one quadrant is read by the other quadrant, which will be receiving half of the data block. Cache quadrants alternate in accessing main memory.

The CP cache may be provided with hardware for maintaining coherency between data in its own data stores and data stored in other subsystems (e.g., other caches) having access to memory. For example, the hardware monitors the main memory bus to detect whether other subsytems (e.g., other caches) are about to modify data of which the CP cache presently has a copy. The CP cache must immediately invalidate any such data (by setting the VALID bit low). Furthermore, if the CP cache has a modified copy of that data (which is necessarily the only such modified copy because other subsystems have invalidated any copies they have upon learning that the CP cache was modifiying its copy), and another subsystem wants a coPy of the data, the cache must transfer the data onto the main memory bus so that it is available to the other subsystem. Another example of a function performed by such data-coherency hardware is informing other subsystems when the CP cache is about to modify its copy of data. Such data coherency hardware increases the complexity of the state/substate status coding. Such data coherency hardware is discussed in Yen et al., "Data Coherence Problem in a Multicache System", *IEEE Transactions on Computers*, Vol. C34, No. 1 (January 1985), which is incorporated by reference.

E. Cache Interleaving

The preferred interleaving is shown in Table 12:

TABLE 12

| ADR(5:3) | ADR4X3 | Cache Quadrant | Cache Board |
|---|---|---|---|
| 0 0 0 | 0 | W | 0 |
| 0 0 1 | 1 | X | 0 |
| 0 1 0 | 1 | X | 0 |
| 0 1 1 | 0 | W | 0 |
| 1 0 0 | 0 | Y | 1 |
| 1 0 1 | 1 | Z | 1 |
| 1 1 0 | 1 | Z | 1 |
| 1 1 1 | 0 | Y | 1 |

The interleaving scheme provides excellent cache accessing efficiency (i.e., a minimum of wasted cache access cycles due to more than one CE attempting to access the same cache) when a plurality of CEs (each assigned a fixed priority ranking) are concurrently processing a program that accesses memory in strides of one and two quadwords (as well as larger strides that are divisible by two but not by four; e.g., strides of six and ten quadwords). A memory stride is the address spacing between successive memory accesses by software operating on the system. Scientific and engineering software, for which the present system is best suited, typically accesses memory with strides of both one and two (stride of ten is also relatively common).

To understand the advantages of the preferred interleaving it is helpful to examine other, less desirable schemes. Some schemes have poor performance for either a stride of one or a stride of two. For example, the interleaving scheme shown in Table 13 works well for stripes of one, but poorly for strides of two, wherein no cache accesses whatsoever would be made to half of the cache quadrants (because they only contain memory locations skipped over in a stride of two).

TABLE 13

| ADR(5:3) | Cache Quadrant | Cache Board |
|---|---|---|
| 0 0 0 | W | 0 |
| 0 0 1 | X | 0 |
| 0 1 0 | Y | 1 |
| 0 1 1 | Z | 1 |
| 1 0 0 | W | 0 |
| 1 0 1 | X | 0 |
| 1 1 0 | Y | 1 |
| 1 1 1 | Z | 1 |

The interleaving scheme of Table 14 works well for a stride of two, but poorly for a stripe of one.

TABLE 14

| ADR(5:3) | Cache Quadrant | Cache Board |
|---|---|---|
| 0 0 0 | W | 0 |
| 0 0 1 | W | 0 |
| 0 1 0 | X | 0 |

TABLE 14-continued

| ADR(5:3) | Cache Quadrant | Cache Board |
|---|---|---|
| 0 1 1 | X | 0 |
| 1 0 0 | Y | 1 |
| 1 0 1 | Y | 1 |
| 1 1 0 | Z | 1 |
| 1 1 1 | Z | 1 |

The reason for the difficulty with a stride of one can be seen by examining the cache access patterns for four CEs all concurrently processing a program with a memory-access stride of one. As shown in Table 15, a phase relationship between the access patterns can result in which the fourth CE (with the lowest priority) is locked out of accesses (indicated by a #) most of the time.

TABLE 15

| CE | | | | | | | | | | | | | | | |
|---|---|---|---|---|---|---|---|---|---|---|---|---|---|---|---|
| 1 | W | W | X | X | Y | Y | Z | Z | W | W | X | X | Y | Y | Z | Z |
| 2 | Y | Z | Z | W | W | X | X | Y | Y | Z | Z | W | W | X | X | Y |
| 3 | X | X | Y | Y | Z | Z | W | W | X | X | Y | Y | Z | Z | W | W |
| 4 | # | # | W | # | # | W | # | X | # | # | # | # | X | # | Y | # |

In this phase relationship, each of the first three CEs is offset from the next higher priority CE by an odd number of cycles (specifically three in this instance).

There is another phase relationship, shown in Table 16, for the Table 14 interleaving scheme at a stride of one. In this phase relationship, in which each CE is offset from the next higher priority CE by an even number of cycles (specifically two in this instance), access lock-out of CE4 does not result. The difficulty, however, is that there is nothing about the interleaving of Table 14 that will force the CEs to adopt the more efficient even-offset of Table 16 rather than the less-efficient odd-offset of Table 15, and thus performance will degrade on the average for a stride of one.

TABLE 16

| CE | | | | | | | | | | | | | | | |
|---|---|---|---|---|---|---|---|---|---|---|---|---|---|---|---|
| 1 | W | W | X | X | Y | Y | Z | Z | W | W | X | X | Y | Y | Z | Z |
| 2 | Z | Z | W | W | X | X | Y | Y | Z | Z | W | W | X | X | Y | Y |
| 3 | Y | Y | Z | Z | W | W | X | X | Y | Y | Z | Z | W | W | X | X |
| 4 | X | X | Y | Y | Z | Z | W | W | X | X | Y | Y | Z | Z | W | W |

What is advantageous about the interleaving scheme of Table 12 is that it produces a stride-of-one access pattern (WXXWYZZY) that forces the CEs into a phase relationship in which there are a minimum of (and ideally no) wasted cache accesses. Table 17 shows the initial cache accesses in the four CEs for a stride of one.

TABLE 17

| CE | | | | | | | | | | | | | | |
|---|---|---|---|---|---|---|---|---|---|---|---|---|---|---|
| 1 | W | X | X | W | Y | Z | Z | Y | W | X | X | W | Y | Z | Z | Y |
| 2 | # | W | # | X | X | W | Y | Z | Z | Y | W | X | X | W | Y | Z |
| 3 | # | # | W | # | # | X | X | W | Y | Z | Z | Y | W | X | X | W |
| 4 | # | # | # | # | W | # | # | X | X | W | Y | Z | Z | Y | W | X |

In the hypothetical shown, the four CEs initially attempt to access the same cache quadrant in the first cycle (something approximating what could occur at initiation of vector concurrent processing; see below). Access conflicts force CE2, CE3, and CE4 to delay some accesses until each reaches a phase relationship in which no further conflicts arise, wherein each CE's access pattern is offset by an even number of cycles from that of the CE with the next highest priority. This phase relationship will be reached by all the CEs no matter what the initial phase relationship.

The cache accessing sequence shown in Table 17 actually shows only half of the accesses that occur during a typical initiation of vector-concurrent processing on an eight-CE system (with all eight CEs participating in the concurrency complex). The sequence of Table 17 depicts the accessing occurring every other 85 nanosecond cache cycle for four of the eight CEs; the same accessing pattern occurs during the other cycles for the other four CEs. Assuming for simplicity that all eight CEs initially contend for the same cache quadrant, those that lose on the first cycle will contend on the very next cache cycle (not shown in the Table 17 sequence). One CE will win during that cycle, and the remaining ones will contend during the third cache cycle (the second cycle shown in Table 17). One by one the eight CEs will find a niche on one or the other of the alternating cache cycles, with the result that four will access the cache on odd cache cycles, and another four on even cycles (with the resulting assignment to odd or even cycles being random). The superior performance of the preferred interleaving is most pronounced when seven to eight CEs are part of the concurrency complex.

The general procedure for choosing an efficient interleaving is as follows. For each stride of interest, the desired offset between the access patterns of the contending CEs is determined. In general, the desired offset is equal to the quotient (or any multiple thereof) of the length of the pattern and the number N of available cache sections (the generality of this expression for offsets greater than four is believed to be accurate, but has not been investigated):

OFFSET=(LENGTH/N)

The stride-of-one pattern for the preferred interleaving of Table 12 (WXXWYZZY) has a length of eight, and thus the desired offset (and multiples thereof) for four processors is 2, 4, 6, 8, and so on—i.e., any even number.

If an interleaving is efficient for a particular stride, it is also efficient for all odd multiples thereof. Thus, for example, the interleaving that produces the desirable eight-bit pattern WXXWYZZY for a stride of one also produces the same desirable pattern (except for irrelevant interchanges of cache section identities) for strides of three and five, and so for all odd strides. And the desirable pattern (WXYZ) for a stride of two also results for strides of 6, 10, and all other odd multiples of 2.

In general the length of a pattern equals the number of cache sections multiplied by the largest power of two stride that the pattern accommodates. For example, in the WXXWYZZY example, the length of 8 equals 4 cache quadrants multiplied by a largest power-of-two offset of 2.

Once the desired offset is known, the access pattern must be inspected to determine whether it will tolerate such an offset without conflicts arising. This inspection is easily carried out by determining whether the same cache section (e.g., W,X,Y,Z in the present case) appears in the pattern at any interval equal to the desired offset or a multiple thereof. If the same cache section does appear at such intervals, it means a conflict can result, making the pattern undesirable. Inspection of the stride-of-one patterns (WXXWYZZY and WWXXYYZZ) for the interleaving schemes of Tables 12 and 14 shows no conflicts at the desired offset of 2 nor at multiples of that offset. This accounts for the ability of the Table 14 interleaving to achieve the phase relationship shown in FIG. 16. Although these two access patterns will tolerate an offset of two, there are obviously patterns that will not (e.g., WXWXYZYZ).

After it has been determined that the pattern has no conflicts at the desired offset (or at multiples thereof), it is necessary to provide some means of forcing the contending processors to fall into the desired offset. With the contending CEs having a fixed priority ranking (e.g., based on their physical locations in the backplane), it is possible to force the desired offset simply by judicious selection of the interleaving itself. The interleaving is chosen so that the resulting access pattern generates at least one conflict at all of the undesired offsets. In the case of a desired offset of 2 (and also 4, 6, and 8), the access pattern must have at least one conflict at offsets of 1, 3, 5, and 7 (although the conflicts at 5 and 7 necessarily arise if conflicts are present at 1 and 3). As shown in Table 18 below, the stride-of-one access pattern for the Table 12 interleaving (repeated twice below) has the necessary odd-offset conflicts.

TABLE 18

```
    -1-           ------7------
  W X X W Y Z Z Y W X X W Y Z Z Y
  ---3---         ----5----
```

By contrast, the stride-of-one pattern for the Table 14 interleaving does not have the necessary conflicts. As shown in Table 19, it lacks the conflicts for an offset of 3 (and 5), having only conflicts at offsets of 1 (and 7).

TABLE 19

```
            -1-
    W W X X Y Y Z Z W W X X Y Y Z Z
            ------7------
```

This procedure can be applied to any number of cache sections (and processors) and to any stride. (The number of cache sections must, for practical purposes, be a power of two because of the binary memory addressing.) For example, if eight (instead of four) cache sections are provided, the offset for a sixteen cycle access pattern (which is needed to accommodate strides of 1 and 2) is

OFFSET = L/N = 16/8 = 2

A desirable sixteen-cycle pattern is shown in Table 20 (in which the cache sections are denoted A through H). As required, it has no conflicts at all even offsets, and at least one conflict at all odd offsets (exemplary odd-offset conflicts are shown for offsets of 1, 3, 5, and 7).

TABLE 20

```
         -1-         ----5---
    A B C D D C B A E F G H H G F E
         ---3---         ------7------
```

Other interleaving schemes than the one shown in Table 12 can be used. Schemes could be used that produce either of the eight-cycle access patterns shown in Table 21. Both patterns have the required absence of even-offset conflicts and presence of at least one conflict at all odd offsets (exemplary odd-offset conflicts are shown for offsets of 1 and 3).

TABLE 21

```
         -1-
    W X X W Y Y Z Z
         ---3---

-1-
    W W X Z Y X Z Y
         ---3---
```

The interleaving schemes corresponding to these patterns (which are for a stride of one; stride of two produces the desirable pattern WXYZ) do not have the implementational simplicity of the interleaving scheme of Table 12, which permits the cache sections to be realized as two identical boards, each with identical quadrants.

Another interleaving scheme that could be used in place of Table 12 is one that provides the sixteen-cycle stride-of-one pattern shown in Table 22.

TABLE 22

```
    W W X X X X W W Y Y Z Z Z Z Y Y
```

It has the advantage of performing well not only at a stride of one (the pattern above) but also at strides of two (WXXWYZZY pattern) and four (WXYZ pattern). It has the disadvantage, however, of requiring a longer concurrency startup, the interval shown in Table 17 during which numerous cache access cycles are wasted in forcing the necessary phase relationships between CEs. The interleaving required to produce the Table 22 pattern can be achieved by interleaving at the two-quadword level (using the exclusive-OR of ADR5 and ADR4 to choose the quadrant, ADR6 to choose the board, and ADR3 and ADR4 to choose the word within the quadrant) rather than, as preferred, at the one-quadword level. This interleaving might be advantageous in circumstances wherein the performance for a stride of four outweighed the loss of concurrency startup speed.

Other embodiments of the invention are within the following claims.

APPENDIX A

Description of Concurrency Instructions

Pseudo-code Syntax expression operators:

```
+       plus (unsigned integer, carries discarded)
-       minus (unsigned integer, borrows discarded)
=       equal to
>       greater than
<       less than
>=      greater than or equal to
=<      less than or equal to
<>      not equal to
or      disjunction
and     conjunction
not     negation
``` conditional statements:

```
if exp1 then
    block
else if exp2 then
    block
else
    block
```

"else if ... then" and "else" are optional.
exp1 and exp2 are logical expressions.
A block is one or more statements.
Statements are terminated with semicolons.
The "continue" statement is a dummy statement.
Since there is no "end if" statement,
formatting is semantically significant:
an "else if ... then" and "else" statement
goes with the immediately preceding "if ... then" statement
that starts in the same column.
If a block consists of exactly one statement,
that statement may appear on the same line
as the "if ... then" or "else":

```
if exp then statement1;
else statement2;
``` assignment statements:

```
exp --> loc;
``` exp is an arithmetic expression.
loc is a location.
(x) means "contents of x", where x is a location.
For example,

```
(d0) + 1 --> d1,d2;
``` means "one is added to the contents of location d0
and the result is copied into locations d1 and d2."

INSTRUCTION GLOSSARY
cadvance

MNEMONIC:      cadvance

OPERATION:     advance synchronization counter

ASSEMBLER
SYNTAX:        cadvance  cs<x>

DESCRIPTION:   If (inloop)=0 then
                   Take concurrency protocol-error trap;
               If (cs<x>)[3]=0 & (nested)=0 & (detached)=0 then
                   Wait until (ccurro)[2-0] = (cs<x>)[2-0];
                   1 --> cs<x>[3];
                   (cs<x>)[2-0] + 1 --> all cs<x>[2-0];
               Else
                   Continue;

INSTRUCTION GLOSSARY
cawait

MNEMONIC:      cawait

OPERATION:     await synchronization counter advance

ASSEMBLER
SYNTAX:        cawait    cs<x>, #<offset>

DESCRIPTION:   If (inloop)=0 then
                   Take concurrency protocol-error trap;
               If (cs<x>)[3]=0 & (nested)=0 & (detached)=0 then
                   Wait until (ccurro)[2-0] - (cs<x>)[2-0]
                   =< offset;
               Else
                   Continue;

INSTRUCTION GLOSSARY
cidle

MNEMONIC:      cidle

OPERATION:     do nothing

ASSEMBLER
SYNTAX:        cidle

DESCRIPTION:   The CE remains idle until a cstart, cstartst,
               cvector, or cvectorst instruction (executed in
               another CE) or an interrupt activates it.

INSTRUCTION GLOSSARY
cmove

MNEMONIC:      cmove

OPERATION:     read/write CCU status register

ASSEMBLER      cmove     cstat, <ea>
SYNTAX:        cmove     <ea>, cstat

ATTRIBUTES:   size = (long); privileged (write only)

DESCRIPTION:  The CCU status register is moved to/from the long word at the effective address.

INSTRUCTION GLOSSARY
cnest

MNEMONIC:     cnest

OPERATION:    store cstat, ccurr, cmax, and cgsp

ASSEMBLER
SYNTAX:       cnest    <ea>

ATTRIBUTES:   size = (long)

DESCRIPTION:  cstat, ccurr, cmax, and cgsp are stored at the effective address in that order unless predecrement addressing is used, in which case the reverse order is used. Afterwards,

```
0 --> ccurr;
If (inloop)=1 then 1 --> nested;
```

INSTRUCTION GLOSSARY
cquit

MNEMONIC:     cquit

OPERATION:    quit concurrent loop

ASSEMBLER
SYNTAX:       cquit

DESCRIPTION:  
```
If (inloop)=0 then
   Take concurrency protocol-error trap;
Else if (nested)=1 then
   Continue;
Else if (detached)=1 then
   0 --> sertrap, vector, inloop;
   If (enable)=1 then
      Take leaving do-across trap;
Else
   Force all other CEs idle;
   0 --> sertrap, vector, inloop;
   If (enable)=1 then
      Take leaving do-across trap;
```

NOTES:        All other CEs become idle as follows:

```
If (detached)=0 then
   0 --> sertrap, vector, nested, inloop;
   (cipc) --> pc;
```

Only one cquit may be executed per concurrent loop. Either a cawait must precede each occurrence of cquit, or cquit must be used as follows:

```
<label>:  tas    <ea>
          bmis   <label>
          cquit
``` where <ea> is a byte constant whose most significant bit has been cleared prior to loop entry.

INSTRUCTION GLOSSARY
crepeat

MNEMONIC: crepeat

OPERATION: branch if more iterations

ASSEMBLER SYNTAX: crepeat  <label>

ATTRIBUTES: size = (word, long)

DESCRIPTION:
```
If (inloop)=0 then
    Take concurrency protocol-error trap;
Else if (nested)=1 then
    If (ccurr) < (max) then
        (ccurr) + 1 --> ccurr, d7;
        (pc) + disp --> pc;
    Else
        Continue;
Else if (detached)=1 then
    If (ccurr) < (max) then
        (ccurr) + 1 --> ccurr, ccurro, d7;
        (pc) + disp --> pc;
    Else
        0 --> sertrap, vector, inloop;
        If (enable)=1 then
            Take leaving do-across trap;
Else
    If (ccurr) < (max) then
        If (sertrap)=1 and (cs0)[3]=0 then
            Wait until (cs0)[2-0] = (ccurro)[2-0];
            (cs0)[2-0] + 1 --> all cs0[2-0];
        0 --> cs0[3], cs1[3], . . . cs7[3];
        (cnext) + nrp --> all cnext;
        (cnext) + nhp --> ccurr, ccurro, d7;
        If (ccurr) > (max) then (cipc) --> pc;
        Else (pc) + disp --> pc;
    Else
        Wait until all other CEs are idle;
        0 --> sertrap, vector, inloop;
        If (enable)=1 then
            Take leaving do-across trap;
```

NOTES: In the above algorithm ALL means every CE in the concurrency complex. MAX is cmax if (vector)=0, num if (vector)=1 and (nested)=0, and zero if (vector)=1 and (nested)=1. The comparisons between ccurr and max are unsigned integer comparisons. NRP is the number of CEs in the CE complex requesting an iteration on this cycle, and NHP is the number of these CEs which have higher priority than this CE. VPN is the virtual processor number and NUM is the largest VPN in the concurrency complex. These are determined by the CCU during the execution of non-nested cstart(st) and cvector(st) instructions. VPN and NUM are zero for detached CEs and appear to be zero in a nested loop when the vector-concurrent instructions VIH, VLH, VLV, VOH, and VOV request them.

INSTRUCTION GLOSSARY
crestore

MNEMONIC:        crestore

OPERATION:       restore CCU state

ASSEMBLER
SYNTAX:          crestore  <ea>

ATTRIBUTES:      privileged

DESCRIPTION:     The CCU state is loaded from the effective address
                 in the following order:

ccurr      Current iteration register
                     cnext      Next outer iteration register
                     csync      Synchronization registers
                     cstat      CCU status register
                     cmax       Maximum iteration register
                     cgsp       Global stack pointer register
                     ccsp       Base-of-cactus-stack pointer register
                     cipc       Idle instruction address register
                     cgpc       Global program counter register
                     cgfp       Global frame pointer register INSTRUCTION GLOSSARY
csave MNEMONIC:        csave OPERATION:       save CCU state ASSEMBLER
SYNTAX:          csave     <ea>

ATTRIBUTES:      privileged

DESCRIPTION:     The CCU state is stored at the effective address
                 in the following order unless predecrement
                 addressing is used, in which case the reverse order
                 is used:

ccurr      Current iteration register
                     cnext      Next outer iteration register
                     csync      Synchronization registers
                     cstat      CCU status register
                     cmax       Maximum iteration register
                     cgsp       Global stack pointer register
                     ccsp       Base-of-cactus-stack pointer register
                     cipc       Idle instruction address register
                     cgpc       Global program counter register
                     cgfp       Global frame pointer register INSTRUCTION GLOSSARY
cstart, cstartst, cvector, cvectorst MNEMONICS:       cstart, cstartst, cvector, cvectorst OPERATION:       start concurrent loop

| | | |
|---|---|---|
| ASSEMBLER SYNTAX: | cstart <ea> | Start concurrent loop |
| | cstartst <ea> | Start concurrent loop and serialize traps |
| | cvector | Start vector-concurrent loop |
| | cvectorst | Start vector-concurrent loop and serialize traps |

ATTRIBUTES: size = (long)

DESCRIPTION:
```
If (nested)=1 then
    (a7) --> cgsp;
    (a6) --> cgfp;
    (pc) --> cgpc;
    If cstart or cstartst then ((<ea>)) --> cmax;
    If cvector or cvectorst then 1 --> vector;
    Else 0 --> vector;
    0 --> ccurr, d7;
Else if (detached)=1 then
    (a7) --> cgsp;
    (a6) --> cgfp;
    (pc) --> cgpc;
    If cstart or cstartst then ((<ea>)) --> cmax;
    If cstartst or cvectorst then 1 --> sertrap;
    Else 0 --> sertrap;
    If cvector or cvectorst then 1 --> vector;
    Else 0 --> vector;
    1 --> inloop;
    (ccsp) --> a7;
    0 --> num, vpn, ccurr, ccurro, d7;
Else
    Wait until all other CEs are idle;
    (my a7) --> all cgsp;
    (my a6) --> all cgfp;
    (my pc) --> all cgpc;
    If cstart or cstartst then ((<ea>)) --> all cmax;
    If cstartst or cvectorst then 1 --> all sertrap;
    Else 0 --> all sertrap;
    If cvector or cvectorst then 1 --> all vector;
    Else 0 --> all vector;
    1 --> all inloop;
    0 --> all cs0, cs1, . . . cs7;
    (each ccsp) --> its a7;
    (each cgfp) --> its a6;
    (each cgpc) --> its pc;
    each nhp --> its vpn, ccurr, ccurro, d7;
    nrp --> all cnext;
    nrp - 1 --> all num;
    If (ccurr) > (max) then
        (cipc) --> pc;
```

NOTES: In the above algorithm ALL means every CE in the concurrency complex. MAX is cmax if (vector)=0, num if (vector)=1 and (nested)=0, and zero if (vector)=1 and (nested)=1. The comparisons between ccurr and max are unsigned integer comparisons. NRP is the number of CEs in the CE complex requesting an iteration on this cycle, and NHP is the number of these CEs which have higher priority than this CE. VPN is the virtual processor number and NUM is the largest VPN in the concurrency complex. These are determined by the CCU during the execution of non-nested cstart(st) and cvector(st) instructions. VPN and NUM are zero for detached CEs and appear to be zero in a nested loop when the vector-concurrent instructions VIH, VLH, VLV, VOH, and VCV request them.

Since the iterations in an n-iteration loop are numbered 0, 1, ... n-1, at least one iteration will always occur.

cstartst and cvectorst are used to serialize traps in loops that can exit via the cquit instruction. Traps are serialized as follows: when a trap occurs in a cstartst or cvectorst loop, the CE will wait until $$(cs0)[2-0] = (ccurro)[2-0]$$

before taking the trap. This test assures that the processor taking the trap is executing the lowest current (outermost) iteration. crepeat advances cs0 in a cstartst or cvectorst loop if it has not already been advanced in a given iteration. For this test to work correctly, cs0 must not be INSTRUCTION GLOSSARY
cstart, cstartst, cvector, cvectorst cadvanced prematurely (i.e., prior to the last possible trap in the loop).

cvector and cvectorst initiate loops in which the iteration count is equal to the number of processors in the complex. In such a loop each processor performs exactly one iteration.

INSTRUCTION GLOSSARY
cunnest

MNEMONIC: cunnest

OPERATION: load cstat, ccurr, cmax, and cgsp

ASSEMBLER SYNTAX: cunnest <ea>

ATTRIBUTES: size = (long)

DESCRIPTION: cstat (sertrap, vector, nested, and inloop only), ccurr, cmax, and cgsp are loaded from the effective address in that order.

APPENDIX B

Boolean Equations for CCU Programmable Logic Arrays

Programmable Logic Array (PLA) Equation Files

Syntax:

An equation file is a header followed by zero or more equations.
A header is zero or more comments followed by an input statement
followed by an output statement.
A comment is a semicolon followed by any string followed by a carriage return.
An input statement is the word input followed by a colon
followed by one or more identifiers separated by commas
followed by one or more comments.
An output statement is the word output followed by a colon
followed by one or more identifiers separated by commas
followed by one or more comments.
An identifier is any alphanumeric string.
An equation is an identifier followed by an equal sign
followed by an expression followed by one or more comments.
An expression is one or more terms separated by exclamation points.
A term is one or more factors separated by ampersands.
A factor is an identifier or an identifier followed by a tilde.

Semantics:

A PLA equation file is a list of Boolean equations.
An exclamation point signifies disjuction,
an ampersand signifies conjunction, and a tilde signifies negation.
For example, the equation

```
          FOO      = A  & C~ & D
                   ! A  & B~ & C~
                   ! B  & C~ & D~   ;
``` means "FOO is true if A and D are true and C is false,
or if A is true and B and C are false;
or if B is true and C and D are false."
FOO, A, B, C, and D are identifiers.
FOO is an output or an intermediate.
A, B, C, and D are inputs or intermediates.
The expression to which FOO is equal contains three terms
of three factors each.
Note the use of a null comment to delimit the equation.
Disjunction may be implicit.
For example,

```
          FOO      = A  & B~ & C   ;
          FOO      = A~ & D  & E~  ;
``` is equivalent to

```
          FOO      = A  & B~ & C  ! A~ & D  & E~  ;
```

Intermediate variables may be be used.
For example,

```
          TEMP     = A  & B~          ;
``` followed by

```
          FOO      = TEMP & C         ;
          BLETCH   = TEMP & E~ & F    ;
          FOO      = A~ & D  & E~     ;
``` is equivalent to

```
          FOO      = A  & B~ & C            ;
          FOO      = A~ & D  & E~           ;
          BLETCH   = A  & B~ & E~ & F       ;
```

;
;                    CONTROL PLA
;
;     This PLA generates internal CCU control signals.
;     For modelling purposes, it should be evaluated during C3.
;
INPUT:  RSEL0, RSEL1, RSEL2, RSEL3,
        WR,
        DO,

DETACHED,
        SERTRAP,
        VECTOR,
        NESTED,
        INLOOP,

CC10, CC11,
        CSTARTI3, CSTARTI1,
        CQUITI3, CQUITI1,

EQMAX,
        GTMAX,
        CSTARTI,

```
            CQUITI,
            CWRI,
            SELI0, SELI1,
            PI8, PI9, PI10, PI11,
            MYQUIT;

OUTPUT: KWIT,
        CEREAL,

LDMAX, LDGPC, LDGSP, LDGFP, LCCSP, LDIPC,

RSTNEXT,         ADDNEXT,         CLRNEXT,
        RSTCURR,         ADDCURR,         CLRCURR,

RSTSTAT,
        RSTSYNC,
        CLRSYNC,
        CLRPAST,

SETSERTRAP,      CLRSERTRAP,
        SETVECTOR,       CLRVECTOR,
        SETNESTED,       CLRNESTED,
        SETINLOOP,       CLRINLOOP,

ADDCURRO,        CLRCURRO,
        ADDNUM,          CLRNUM,

RESTORE;

;
;                   ******* INPUTS *******
;
;   RSEL<3:0>     READ OPERATION          WRITE OPERATION
;   ---------     --------------          ---------------
;   0 0 0 0       CMAX                    CMAX
;   0 0 0 1       CGPC                    CGPC
;   0 0 1 0       CGSP                    CGSP
;   0 0 1 1       CGFP                    CGFP
;   0 1 0 0       CCURR                   CCURR
;   0 1 0 1       CNEXT                   CNEXT
;   0 1 1 0       CCSP                    CCSP
;   0 1 1 1       CIPC                    CIPC
;   1 0 0 0       CMAX                    CAMAX   (global)
;   1 0 0 1       CGPC                    CAGPC   (global)
;   1 0 1 0       CGSP                    CAGSP   (global)
;   1 0 1 1       CGFP                    CAGFP   (global)
;   1 1 0 0       CSYNC                   CSYNC
;   1 1 0 1       CSTAT                   CSTAT
;   1 1 1 0       CVSP                    CNEST   (S,V,N,I bits of CSTAT only)
;   1 1 1 1       *** Reserved ***        *** Reserved ***
;
;       Local writes, as in CRESTORE, CUNNEST, and CMOVE to CSTAT.
;
LDMAX        = WR & RSEL3~ & RSEL2~ & RSEL1~ & RSEL0~                  ;
LDGPC        = WR & RSEL3~ & RSEL2~ & RSEL1~ & RSEL0                   ;
LDGSP        = WR & RSEL3~ & RSEL2~ & RSEL1  & RSEL0~                  ;
LDGFP        = WR & RSEL3~ & RSEL2~ & RSEL1  & RSEL0                   ;
RSTCURR      = WR & RSEL3~ & RSEL2  & RSEL1~ & RSEL0~                  ;
RSTNEXT      = WR & RSEL3~ & RSEL2  & RSEL1~ & RSEL0                   ;
LDCSP        = WR & RSEL3~ & RSEL2  & RSEL1  & RSEL0~                  ;
LDIPC        = WR & RSEL3~ & RSEL2  & RSEL1  & RSEL0                   ;
RSTSYNC      = WR & RSEL3  & RSEL2  & RSEL1~ & RSEL0~                  ;
RSTSTAT      = WR & RSEL3  & RSEL2  & RSEL1~ & RSEL0                   ;
;
;       CUNNEST only.
;
SETINLOOP    = WR & RSEL3  & RSEL2  & RSEL1  & RSEL0~ & PI8            ;
CLRINLOOP    = WR & RSEL3  & RSEL2  & RSEL1  & RSEL0~ & PI8~           ;
SETNESTED    = WR & RSEL3  & RSEL2  & RSEL1  & RSEL0~ & PI9            ;
CLRNESTED    = WR & RSEL3  & RSEL2  & RSEL1  & RSEL0~ & PI9~           ;
SETVECTOR    = WR & RSEL3  & RSEL2  & RSEL1  & RSEL0~ & PI10           ;
CLRVECTOR    = WR & RSEL3  & RSEL2  & RSEL1  & RSEL0~ & PI10~          ;
SETSERTRAP   = WR & RSEL3  & RSEL2  & RSEL1  & RSEL0~ & PI11           ;
CLRSERTRAP   = WR & RSEL3  & RSEL2  & RSEL1  & RSEL0~ & PI11~          ;
;
;       Global writes, as in CSTART(ST) and CVECTOR(ST).
;
WRCAMAX      = WR & RSEL3  & RSEL2~ & RSEL1~ & RSEL0~                  ;
WRCAGPC      = WR & RSEL3  & RSEL2~ & RSEL1~ & RSEL0                   ;
WRCAGSP      = WR & RSEL3  & RSEL2~ & RSEL1  & RSEL0~                  ;
WRCAGFP      = WR & RSEL3  & RSEL2~ & RSEL1  & RSEL0                   ;
;
;
```

```
; RSEL<3:0>     "DO" OPERATION
;  ----------   ---------------
;  0 0 0 0      CVECTOR      Wait, then wake up complex; set VECTOR
;  0 0 0 1      CVECTORST    Wait, then wake up complex; set VECTOR, SERTRAP
;  0 0 1 0      *** Reserved ***
;  0 0 1 1      *** Reserved ***
;  0 1 0 0      CNEST        Set NESTED and clear VECTOR if INLOOP
;  0 1 0 1      *** Reserved ***
;  0 1 1 0      *** Reserved ***
;  0 1 1 1      CREPEAT      Do the right thing
;  1 0 0 0      CSTART       Wait, then wake up complex
;  1 0 0 1      CSTARTST     Wait, then wake up complex; set SERTRAP
;  1 0 1 0      CTEST        Microdiagnostic function
;  1 0 1 1      CADVANCE     Wait, then advance sync counter
;  1 1 0 0      CQUIT1       Assert CCLITC; wait
;  1 1 0 1      CQUIT2       Clear SERTRAP, VECTOR, INLOOP
;  1 1 1 0      CIDLE1       Clear SERTRAP, VECTOR, NESTED, INLOOP
;  1 1 1 1      CIDLE2       Stop asserting ACTO; wait
;
;              Perform the desired operation:
;
DOCVECTOR     = DO & RSEL3- & RSEL2- & RSEL1- & RSEL0-      ;
DOCVECTORST   = DO & RSEL3- & RSEL2- & RSEL1- & RSEL0       ;
;
DOCNEST       = DO & RSEL3- & RSEL2  & RSEL1- & RSEL0-      ;
;
DOCREPEAT     = DO & RSEL3- & RSEL2  & RSEL1  & RSEL0       ;
DOCSTART      = DO & RSEL3  & RSEL2- & RSEL1- & RSEL0-      ;
DOCSTARTST    = DO & RSEL3  & RSEL2- & RSEL1- & RSEL0       ;
DOCADVANCE    = DO & RSEL3  & RSEL2- & RSEL1  & RSEL0       ;
DOCQUIT1      = DO & RSEL3  & RSEL2  & RSEL1- & RSEL0-      ;
DOCQUIT2      = DO & RSEL3  & RSEL2  & RSEL1- & RSEL0       ;
DOCIDLE1      = DO & RSEL3  & RSEL2  & RSEL1  & RSEL0-      ;
DOCIDLE2      = DO & RSEL3  & RSEL2  & RSEL1  & RSEL0       ;
;
ANYSTART      = DO          & RSEL2- & RSEL1- ; CSTART(ST) or CVECTOR(ST)

;                ******* OUTPUTS *******
;
;              CSTART, CSTARTST, CVECTOR, CVECTORST instructions
;
;              First, the non-detached, non-nested case.
;
RESTORE       = DETACHED          ; Load from CCU bus only if a global write
RESTORE       = CWRI-             ; occurs while not detached
;
LDMAX         = DETACHED- & CWRI & SELI1- & SELI0-    ; Optional--this won't
                                                      ; happen on CVECTOR(ST)
LDGPC         = DETACHED- & CWRI & SELI1- & SELI0     ;
LDGSP         = DETACHED- & CWRI & SELI1  & SELI0-    ;
LDGFP         = DETACHED- & CWRI & SELI1  & SELI0     ;
;
;              1st cycle: initialize things.
;
CLRSYNC       = DETACHED- & CSTARTI3              ;
CLRPAST       = DETACHED- & CSTARTI3              ;
CLRNEXT       = DETACHED- & CSTARTI3              ;
CLRCURR       = DETACHED- & CSTARTI3              ;
SETINLOOP     = DETACHED- & CSTARTI3              ;
SETSERTRAP    = DETACHED- & CSTARTI3 & CC11       ;
CLRSERTRAP    = DETACHED- & CSTARTI3 & CC11-      ;
SETVECTOR     = DETACHED- & CSTARTI3 & CC10       ;
CLRVECTOR     = DETACHED- & CSTARTI3 & CC10-      ;
;
;              2nd cycle: get an iteration.
;
ADDNUM        = DETACHED- & CSTARTI1              ; Sets up NUM and VPN
ADDCURR0      = DETACHED- & CSTARTI1              ; Copy of CCURR lo bits
                                                  ; in outer loop
ADDCURR       = DETACHED- & CSTARTI1              ;
;
;              Now, the detached non-nested case.
;
LDMAX         = DETACHED & NESTED- & WRCAMAX      ; Optional--this won't
                                                  ; happen on CVECTOR(ST)
LDGPC         = DETACHED & NESTED- & WRCAGPC      ;
LDGSP         = DETACHED & NESTED- & WRCAGSP      ;
```

```
LOGFP              = DETACHED  & NESTED- & WRCAGFP           ;

;                  Analogous to the 1st cycle above:
;
CLRCURR            = DETACHED  & NESTED- & ANYSTART          ;
SETINLOOP          = DETACHED  & NESTED- & ANYSTART          ;
CLRSERTRAP         = DETACHED  & NESTED- & DOCSTART          ;
CLRVECTOR          = DETACHED  & NESTED- & DOCSTART          ;
SETSERTRAP         = DETACHED  & NESTED- & DOCSTARTST        ;
CLRVECTOR          = DETACHED  & NESTED- & DOCSTARTST        ;
CLRSERTRAP         = DETACHED  & NESTED- & DOCVECTOR         ;
SETVECTOR          = DETACHED  & NESTED- & DOCVECTOR         ;
SETSERTRAP         = DETACHED  & NESTED- & DOCVECTORST       ;
SETVECTOR          = DETACHED  & NESTED- & DOCVECTORST       ;
;
;                  Analogous to the 2nd cycle above:
;
CLRNUM             = DETACHED  & NESTED- & ANYSTART          ; Sets up NUM and VPN
CLRCURRO           = DETACHED  & NESTED- & ANYSTART          ; Copy of CCURR lc bits
                                                             ; in outer loop
;
;                  Finally, the nested case.
;
LDMAX              =           NESTED  & WRCAMAX             ; Optional--this won't
;                                                            ; happen on CVECTCR(ST)
LOGPC              =           NESTED  & WRCAGPC             ;
LDGSP              =           NESTED  & WRCAGSP             ;
LDGFP              =           NESTED  & WRCAGFP             ;
;
;                  Analogous to the 1st cycle above:
;
CLRCURR            =           NESTED  & ANYSTART            ;
CLRVECTOR          =           NESTED  & DOCSTART            ;
CLRVECTOR          =           NESTED  & DOCSTARTST          ;
SETVECTOR          =           NESTED  & DOCVECTOR           ;
SETVECTOR          =           NESTED  & DOCVECTORST         ;
;
;                  CREPEAT instruction
;
;                  Looping back:
;
CLRPAST            = INLOOP & NESTED- & EQMAX- & DOCREPEAT ;
ADDCURR            = INLOOP           & EQMAX- & DOCREPEAT ;
ADDCURRO           = INLOOP & NESTED- & EQMAX- & DOCREPEAT ;
;
;                  Going serial:
;
CLRINLOOP          = INLOOP & NESTED- & EQMAX  & DOCREPEAT ;
CLRVECTOR          = INLOOP           & EQMAX  & DOCREPEAT ;
CLRSERTRAP         = INLOOP & NESTED- & EQMAX  & DOCREPEAT ;
;
;                  CQUIT instruction
;
CLRINLOOP          = INLOOP & NESTED- & DOCQUIT2   ;
CLRVECTOR          = INLOOP           & DOCQUIT2   ;
CLRSERTRAP         = INLOOP & NESTED- & DOCQUIT2   ;
;
;                  CIDLE instruction
;
CLRINLOOP          = DOCIDLE1    ;
CLRNESTED          = DOCIDLE1    ;
CLRVECTOR          = DOCIDLE1    ;
CLRSERTRAP         = DOCIDLE1    ;
;
;                  CNEST instruction
;
SETNESTED          = INLOOP & DOCNEST        ; Set the nested bit if already inloop
CLRVECTOR          = INLOOP & DOCNEST        ;
;
;                  Random stuff
;
KWIT               = INLOOP & DETACHED- & CQUITI3  ;
KWIT               = INLOOP & GTMAX                ;
CEREAL             = INLOOP & EQMAX                ;
;
ADDNEXT            = DETACHED       ; Yep--all the time:
ADDNEXT            = DETACHED-      ; CLRNEXT and RSTNEXT override
```

```
;                       DECODER PLA
;
;       This PLA generates CCU bus control signals.
;       For modelling purposes, it should be evaluated during C1.
;
INPUT:  RSEL0, RSEL1, RSEL2, RSEL3,
        WR,
        DO,

DETACHED,
        SERTRAP,
        VECTOR,
        NESTED,
        INLOOP,

CSTARTI1,
        CQUITI1,

PAST0, PAST1, PAST2, PAST3, PAST4, PAST5, PAST6, PAST7,
        SSEL0, SSEL1, SSEL2;

OUTPUT: SEL00, SEL01,
        CCO10, CCO11,

CSTARTO,
        CQUITO,
        CWRO,

ACTO,
        RDYO,

ADV00, ADV01, ADV02, ADV03, ADV04, ADV05, ADV06, ADV07;
;
;
;                       ******* INPUTS *******
;
;   RSEL<3:0>       "DO" OPERATION
;   ---------       --------------
;   0 0 0 0         CVECTOR     Wait, then wake up complex; set VECTOR
;   0 0 0 1         CVECTORST   Wait, then wake up complex; set VECTOR, SERTRAP
;   0 0 1 0         *** Reserved ***
;   0 0 1 1         *** Reserved ***
;   0 1 0 0         CNEST       Set NESTED and clear VECTOR if INLOOP
;   0 1 0 1         *** Reserved ***
;   0 1 1 0         *** Reserved ***
;   0 1 1 1         CREPEAT     Do the right thing
;   1 0 0 0         CSTART      Wait, then wake up complex
;   1 0 0 1         CSTARTST    Wait, then wake up complex; set SERTRAP
;   1 0 1 0         CTEST       Microdiagnostic function
;   1 0 1 1         CADVANCE    Wait, then advance sync counter
;   1 1 0 0         CQUIT1      Assert CQUITO; wait
;   1 1 0 1         CQUIT2      Clear SERTRAP, VECTOR, INLOOP
;   1 1 1 0         CIDLE1      Clear SERTRAP, VECTOR, NESTED, INLOOP
;   1 1 1 1         CIDLE2      Stop asserting ACTO; wait
;
;       CCU instructions must cause the CE to broadcast
;       only if the CE is neither nested nor detached.
;
BCASTCK         = NESTED~ & DETACHED~    ;
;       Perform the desired operation:
;
DOCVECTOR       = DO & RSEL3~ & RSEL2~ & RSEL1~ & RSEL0~     ;
DOCVECTORST     = DO & RSEL3~ & RSEL2~ & RSEL1~ & RSEL0      ;
;
;
DOCNEST         = DO & RSEL3~ & RSEL2  & RSEL1~ & RSEL0~     ;
;
;
DOCREPEAT       = DO & RSEL3~ & RSEL2  & RSEL1  & RSEL0      ;
DOCSTART        = DO & RSEL3  & RSEL2~ & RSEL1~ & RSEL0~     ;
DOCSTARTST      = DO & RSEL3  & RSEL2~ & RSEL1~ & RSEL0      ;
DOCADVANCE      = DO & RSEL3  & RSEL2~ & RSEL1  & RSEL0      ;
DOCQUIT1        = DO & RSEL3  & RSEL2  & RSEL1~ & RSEL0~     ;
DOCQUIT2        = DO & RSEL3  & RSEL2  & RSEL1~ & RSEL0      ;
DOCIDLE1        = DO & RSEL3  & RSEL2  & RSEL1  & RSEL0~     ;
DOCIDLE2        = DO & RSEL3  & RSEL2  & RSEL1  & RSEL0      ;
;
ANYSTART        = DO          & RSEL2~ & RSEL1~ ; CSTART(ST) or CVECTOR(ST)
;
;       Select the desired sync counter:
;
SELECT7         = SSEL2 & SSEL1  & SSEL0    ;
SELECT6         = SSEL2 & SSEL1  & SSEL0~   ;
```

```
SELECT5        = SSEL2  & SSEL1~ & SSEL0   ;
SELECT4        = SSEL2  & SSEL1~ & SSEL0~  ;
SELECT3        = SSEL2~ & SSEL1  & SSEL0   ;
SELECT2        = SSEL2~ & SSEL1  & SSEL0~  ;
SELECT1        = SSEL2~ & SSEL1~ & SSEL0   ;
SELECT0        = SSEL2~ & SSEL1~ & SSEL0~  ;
;
;
;              ******* OUTPUTS *******
;
;              CSTART, CSTARTST, CVECTOR, CVECTORST
;
CWRO    = BCASTOK & WR & RSEL3 & RSEL2~ ;
;
;       Qualifying SEL0(1:0) with CWRO accomplishes nothing,
;       since SEL0(1:0) is irrelevant unless CWRO,
;       and since idle processors do not WR their CCUs during CSTARTs.
;
SEL01   = BCASTOK & WR & RSEL1          ;
SEL00   = BCASTOK & WR & RSEL0          ;
;
CSTART0 = BCASTOK & ANYSTART            ;
;
;       Note that the CCU data bus is not enabled unless CSTART0 | CWRO,
;       and that CC0(11:10) is not selected unless CWRO~.
;       Therefore, it is unnecessary to qualify CC0(11:10) with CSTART0.
;
;CC011  = BCASTOK & DOCSTARTST          ;
;CC011  = BCASTOK & DOCVECTORST         ;
CC011   = RSEL0                         ;
;
;CC010  = BCASTOK & DOCVECTOR           ;
;CC010  = BCASTOK & DOCVECTORST         ;
CC010   = RSEL3~                        ;
;
ROY0    = BCASTOK & CSTARTI1            ; All processors simultaneously bid
                                        ; for first iterations.
;              CADVANCE
;
;       Advances are not performed if not in concurrency,
;       if nested, if detached, or if the specified counter
;       has already been advanced this iteration.
;
ADV00   = INLOOP & BCASTOK & DOCADVANCE & SELECT0 & PAST0~   ;
ADV01   = INLOOP & BCASTOK & DOCADVANCE & SELECT1 & PAST1~   ;
ADV02   = INLOOP & BCASTOK & DOCADVANCE & SELECT2 & PAST2~   ;
ADV03   = INLOOP & BCASTOK & DOCADVANCE & SELECT3 & PAST3~   ;
ADV04   = INLOOP & BCASTOK & DOCADVANCE & SELECT4 & PAST4~   ;
ADV05   = INLOOP & BCASTOK & DOCADVANCE & SELECT5 & PAST5~   ;
ADV06   = INLOOP & BCASTOK & DOCADVANCE & SELECT6 & PAST6~   ;
ADV07   = INLOOP & BCASTOK & DOCADVANCE & SELECT7 & PAST7~   ;
;
;              CREPEAT
;
ADV00   = INLOOP & BCASTOK & DOCREPEAT & SERTRAP & PAST0~    ;
ROY0    = INLOOP & BCASTOK & DOCREPEAT                       ;
;
;              CQUIT
;
CQUIT0  = INLOOP & BCASTOK & DOCQUIT1   ;
;
;              CIDLE
;
;       A detached (or missing) processor is treated as idle.
;
ACT0    = DETACHED~ & DOCIDLE2~ ;
;                              WAIT PLA
;
;       This PLA determines when the CE should WAIT,
;       whether by micro-branch or SNISTALL.
;       For modelling purposes, it should be evaluated during E4.
;
INPUT:  DETACHED,
        SERTRAP,
        VECTOR,
        NESTED,
        INLOOP,

AWTOK,
        ADVOK,
        ADVOKO,

ANYACT,
```

```
        CSTARTI,
        EQMAX;
OUTPUT: CSTART,
        CAWAIT,
        CADVANCE,
        CQUIT,
        CIDLE,
        CREPEAT,
        OKTOTRAP;
;
;                       ******* OUTPUTS *******
;
CSTART          = NESTED~ & DETACHED~ & ANYACT   ; wait until rest idle
;                                                ; unless detached or nested
;
CREPEAT         = INLOOP & NESTED~ & DETACHED~ & SERTRAP & ADVOK0~        ;
CREPEAT         = INLOOP & NESTED~ & DETACHED~ & EQMAX & ANYACT           ;
;               ; wait until lowest iteration if serializing traps
;               ; or until rest idle if going serial,
;               ; unless detached, nested, or not inloop
;
CQUIT           = INLOOP & NESTED~ & DETACHED~ & ANYACT   ; wait until rest idle
;                                                         ; unless detached,
;                                                         ; nested,
;                                                         ; or not inloop
;
CAWAIT          = INLOOP & NESTED~ & DETACHED~ & AWTOK~   ; wait until OK to go
;                                                         ; unless detached,
;                                                         ; nested,
;                                                         ; or not inloop
;
CADVANCE        = INLOOP & NESTED~ & DETACHED~ & ADVCK~   ; wait until OK to go
;                                                         ; unless detached,
;                                                         ; nested,
;                                                         ; or not inloop
;
CIDLE           = CSTARTI~        ; wait until kissed by charming Prince,
CIDLE           = DETACHED        ; or forever if detached
;
OKTOTRAP        = DETACHED        ; OK to trap unless attached,
OKTOTRAP        = INLOOP~         ; inloop,
OKTOTRAP        = SERTRAP~        ; serializing traps,
OKTOTRAP        = ADVCK0          ; and not the lowest iteration
;
;                       PIDEC PLA
;
; Modifies RSEL(3:0) so that when virtual stack pointer (VSP) is requested,
; PI bus gets base-of-cactus-stack pointer register (CSP) if not nested,
; global stack pointer register (GSP) if nested.
INPUT:  RSEL3, RSEL2, RSEL1, RSEL0, NESTED;
OUTPUT: PISEL3, PISEL2, PISEL1, PISEL0;

PISEL3  = RSEL3 & RSEL1~  ;

PISEL2  = RSEL3 & RSEL2 & RSEL1 & RSEL0~ & NESTED~
        | RSEL2 & RSEL3~
        | RSEL2 & RSEL1~
        | RSEL2 & RSEL0          ;

PISEL1  = RSEL1 ;

PISEL0  = RSEL0 ;
;               RIDLE (Rest of Complex Idle) PLA
;
IM0     = BDID2~ & BDID1~ & BDID0~;
IM1     = BDID2~ & BDID1~ & BDID0 ;
IM2     = BDID2~ & BDID1  & BDID0~;
IM3     = BDID2~ & BDID1  & BDID0 ;
IM4     = BDID2  & BDID1~ & BDID0~;
IM5     = BDID2  & BDID1~ & BDID0 ;
IM6     = BDID2  & BDID1  & BDID0~;
IM7     = BDID2  & BDID1  & BDID0 ;
;
RIDLE   = IM0 & ACT7~ & ACT6~ & ACT5~ & ACT4~ & ACT3~ & ACT2~ & ACT1~
        | IM1 & ACT7~ & ACT6~ & ACT5~ & ACT4~ & ACT3~ & ACT2~         & ACT0~
        | IM2 & ACT7~ & ACT6~ & ACT5~ & ACT4~ & ACT3~         & ACT1~ & ACT0~
        | IM3 & ACT7~ & ACT6~ & ACT5~ & ACT4~         & ACT2~ & ACT1~ & ACT0~
        | IM4 & ACT7~ & ACT6~ & ACT5~         & ACT3~ & ACT2~ & ACT1~ & ACT0~
        | IM5 & ACT7~ & ACT6~         & ACT4~ & ACT3~ & ACT2~ & ACT1~ & ACT0~
        | IM6 & ACT7~         & ACT5~ & ACT4~ & ACT3~ & ACT2~ & ACT1~ & ACT0~
        | IM7         & ACT6~ & ACT5~ & ACT4~ & ACT3~ & ACT2~ & ACT1~ & ACT0~;
```

What is claimed is:

1. A digital computer comprising
   a plurality of memory elements, said memory elements being interleaved (i.e., each is assigned memory addresses on the basis of a low order portion of the memory address),
   a plurality of processors connected in parallel, said processors each having means for intiating an access of data from any of said memory elements simultaneously with accesses of other said processors,
   said memory elements each being capable of accepting an access from just one of said processors during a given cycle,
   said memory elements being interleaved and said interleaving being characterized by access patterns generated by said processors when accessing data at particular strides,
   said interleaving being selected so that the access patterns generated at a stride of one and a stride of two each meet the conditions that (1) the pattern will tolerate being offset with respect to an identical pattern by a particular OFFSET and any multiple of said OFFSET (wherein tolerating means that no memory access conflicts arise, i.e., more than one processor simultaneously attempting to access the same memory element) and (2) the pattern includes sufficient conflicts at offsets other than said particular OFFSET to force said processors to assume a relationship wherein said particular OFFSET is achieved, so that each said processor is able to access a different said memory element simultaneously without creating access conflicts.

2. The digital computer of claim 1 wherein there are four said memory elements W,X,Y,Z and said memory elements are interleaved so that at a stride of one the access pattern is WXXWYZZY and at a stride of two the pattern is WXYZ.

3. The digital computer of claim 1 wherein there are four said memory elements W,X,Y,Z and said memory elements are interleaved so that at a stride of one the access pattern is WXXWYYZZ and at a stride of two the pattern is WXYZ.

4. The digital computer of claim 1 wherein there are four said memory elements W,X,Y,Z and said memory elements are interleaved so that at a stride of one the access pattern is WWXZYXZY and at a stride of two the pattern is WXYZ.

5. The digital computer of claim 1 wherein there are four said memory elements W,X,Y,Z and said memory elements are interleaved so that at a stride of one the access pattern is WWXXXXWWYYZZZZYY, at a stride of two the pattern is WWXZYXZY, and at a stride of four the pattern is WXYZ.

6. The digital computer of claim 1 wherein there are eight said memory elements A,B,C,D,E,F,G,H and said memory elements are interleaved so that at a stride of one the access pattern is ABCDDCBAEFGHHGFE, at a stride of two the pattern is ACDBEGHF.

7. The digital computer of claim 1 wherein there are at least four said memory elements.

8. The digital computer of claim 7 wherein said particular OFFSET is equal to the length of said access pattern divided by the number of said memory elements.

9. The digital computer of claim 1 or 2 wherein said memory elements are sections of a cache and said digital computer further comprises a main memory to which said cache is connected.

10. The digital computer of claim 9 wherein said memory elements each include means for choosing among processors simultaneously contending for access on the basis of a fixed processor priority ranking.

11. The digital computer of claim 1 or 2 wherein said processors include means for concurrently processing the same instructions and data, wherein said data is accessed from said memory elements.

12. The digital computer of claim 11 wherein said memory elements each include means for choosing among processors simultaneously contending for access on the basis of a fixed processor priority ranking.

13. The digital computer of claim 11 wherein said processors include means for concurrently processing different iterations of the same iterative construct.

14. The digital computer of claim 13 wherein said memory elements are sections of a cache and said digital computer further comprises a main memory to which said cache is connected.

15. The digital computer of claim 14 wherein said memory elements each include means for choosing among processors simultaneously contending for access on the basis of a fixed processor priority ranking.

16. A digital computer comprising
    a main memory for storing data,
    a cache for storing copies of said data, said cache being connected to said main memory,
    a plurality of parallel processors connected to said cache,
    said cache comprising a plurality of cache sections,
    each said processor having means for accessing the same memory locations of each said cache section,
    means for a plurality of said processors to simultaneously access a plurality of said cache sections,
    said cache sections are interleaved (i.e., each cache section is assigned memory addresses on the basis of a low order portion of the memory address),
    said cache sections include means for accessing blocks of data from said main memory and means for dividing each said block between cache sections.

17. The digital computer of claim 16 wherein
    two or more of said cache sections each include means for driving a common memory address bus with the block address of the block of data to be accessed in memory, and
    said two or more cache sections each include means for concurrently reading said block address from said common memory address bus.

18. The digital computer of claim 17 further comprising
    two or more main memory data buses, one said data bus connected to each of said two or more cache sections, and
    means in said main memory for transferring across any one said data bus only those portions of said data block with addresses assigning them to the cache section to which said data bus is connected.

19. The digital computer of claim 18 wherein there are four said memory elements W,X,Y,Z and said memory elements are interleaved so that at a stride of one the access pattern is WXXWYZZY and at a stride of two the pattern is WXYZ,
    said blocks are defined by the highest bit of the address bits used to define said interleaving, and
    said blocks are divided between pairs of said cache sections.

20. The digital computer of claim 19 wherein said three address bits on which interleaving is based are the fifth through the third bits of the byte-level address in said cache sections.

21. The digital computer of claim 19 wherein said pairs of cache sections share a common circuit board and each of said circuit boards are identical, thereby enhancing implementational simplicity.

22. The digital computer of claim 19 wherein said memory elements each include means for choosing among processors simultaneously contending for access on the basis of a fixed processor priority ranking.

23. A digital computer comprising a main memory for storing data, a cache for storing copies of said data, said cache connected to said main memory, a plurality of parallel processors connected to said cache, means for permitting each of said processors to access the same memory locations of said cache, wherein said processors include means for concurrently processing the same instructions and data, wherein said data is read from and written to said cache.

24. The digital computer of claim 23 wherein said processors include means for concurrently processing different iterations of the same iterative construct.

* * * * *